US012260818B2

(12) United States Patent
Jung et al.

(10) Patent No.: US 12,260,818 B2
(45) Date of Patent: Mar. 25, 2025

(54) SENSING CIRCUIT, DISPLAY DEVICE INCLUDING SENSING CIRCUIT, AND METHOD OF DRIVING SENSING CIRCUIT

(71) Applicant: Samsung Display Co., LTD., Yongin-si (KR)

(72) Inventors: Hayong Jung, Hwaseong-si (KR); Wook Lee, Hwaseong-si (KR); Sung Hwan Kim, Yongin-si (KR); Jaehoon Shin, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/195,684

(22) Filed: May 10, 2023

(65) Prior Publication Data

US 2024/0038168 A1 Feb. 1, 2024

(30) Foreign Application Priority Data

Jul. 27, 2022 (KR) ........................ 10-2022-0093071

(51) Int. Cl.
*G09G 3/32* (2016.01)
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ......... G09G 3/3233; G09G 2300/0819; G09G 2300/0842; G09G 2300/08; G09G 2320/029; G09G 2330/12; G09G 3/3291; G09G 3/32; G09G 3/3208; G09G 3/36; G09G 3/3225; G09G 3/006; G09G 2310/0297; G09G 2310/08;
(Continued)

(56) References Cited

U.S. PATENT DOCUMENTS

2015/0130780 A1* 5/2015 Kwon .................. G09G 3/3233 345/82
2015/0253926 A1* 9/2015 Ota ....................... G06F 3/0412 345/174
2018/0004353 A1* 1/2018 Shin ...................... G02F 1/1343

FOREIGN PATENT DOCUMENTS

KR 1020180045937 A 5/2018
KR 102075920 B1 2/2020
(Continued)

*Primary Examiner* — Stephen G Sherman
(74) *Attorney, Agent, or Firm* — CANTOR COLBURN LLP

(57) ABSTRACT

A sensing circuit includes a first line selection switch which connects a first sensing line to a sensing channel in a first sub-sensing period, a first noise selection switch which connects the first sensing line to a reference channel in a second sub-sensing period, a second line selection switch which connects a second sensing line to the sensing channel in the second sub-sensing period, and a second noise selection switch which connects the second sensing line to the reference channel in the first sub-sensing period. The sensing channel samples a first sensing voltage and noise of the first sensing line and the reference channel samples noise of the second sensing line in a first sampling period, and the sensing channel samples a second sensing voltage and noise of the second sensing line and the reference channel samples noise of the first sensing line in a second sampling period.

20 Claims, 33 Drawing Sheets

(52) U.S. Cl.
CPC ... *G09G 2310/08* (2013.01); *G09G 2320/029* (2013.01); *G09G 2330/12* (2013.01)

(58) Field of Classification Search
CPC ... G09G 2320/0233; G09G 2320/0285; G09G 2320/0295; G09G 2320/045
See application file for complete search history.

(56) References Cited

FOREIGN PATENT DOCUMENTS

| | | |
|---|---|---|
| KR | 1020210021256 A | 2/2021 |
| KR | 1020210080105 A | 6/2021 |

* cited by examiner

SLIP1(ODD SP)

SLIP1&CIP1(ODD SP)

ADCP2(EVEN SP)

SENSING CIRCUIT, DISPLAY DEVICE INCLUDING SENSING CIRCUIT, AND METHOD OF DRIVING SENSING CIRCUIT

This application claims priority to Korean Patent Application No. 10-2022-0093071, filed on Jul. 27, 2022, and all the benefits accruing therefrom under 35 U.S.C. § 119, the content of which in its entirety is herein incorporated by reference.

BACKGROUND

1. Field

Embodiments relate to a sensing circuit and a display device. More particularly, embodiments relate to a sensing circuit, a display device including the sensing circuit, and a method of driving the sensing circuit.

2. Description of the Related Art

A flat panel display device is widely used in various fields due to desired characteristics such as light weight, thin thickness, etc. Representative examples of the flat panel display device include a liquid crystal display device, an organic light emitting display device, a quantum-dot display device, or the like.

The display device may include pixels, and each of the pixels may include a driving transistor, a switching transistor, a storage capacitor, a light emitting element, or the like. A threshold voltage and an electron mobility of the driving transistor, a turn-on voltage of the light emitting element, or the like may determine driving characteristics of the pixel, and such driving characteristics of the pixel may be desired to be the same in each pixel. However, driving characteristics between pixels may vary due to reasons such as process characteristics, deterioration characteristics, or the like. This difference in driving characteristics causes a luminance deviation, which is a limitation in realizing a desired image. In order to compensate a luminance deviation between the pixels, the driving characteristics of the pixels may be sensed by a sensing circuit, and input image data may be compensated based on a sensing result. However, sensing data may be distorted because noises are also sensed in the process of sensing the driving characteristics of the pixels by the sensing circuit.

SUMMARY

Embodiments provide a sensing circuit.

Embodiments provide a display device including a sensing circuit.

Embodiments provide a method of driving a sensing circuit.

A sensing circuit of a display device according to embodiments includes a first line selection switch which connects a first sensing line to a sensing channel in a first sub-sensing period in a first sensing period, a first noise selection switch which connects the first sensing line to a reference channel in a second sub-sensing period in a second sensing period, a second line selection switch which connects a second sensing line to the sensing channel in the second sub-sensing period, and a second noise selection switch which connects the second sensing line to the reference channel in the first sub-sensing period. In such embodiments, in a first sampling period in the first sub-sensing period, the sensing channel may sample a first sensing voltage and a noise of the first sensing line, and the reference channel may sample a noise of the second sensing line. In such embodiments, in a second sampling period in the second sub-sensing period, the sensing channel may sample a second sensing voltage and a noise of the second sensing line, and the reference channel may sample a noise of the first sensing line.

In an embodiment, the first sensing line and the second sensing line may be connected to a first pixel and a second pixel, respectively. In such an embodiment, each of the first and second pixels may include a first switching transistor which is turned-on in response to a scan signal and a second switching transistor which is turned-on in response to a sensing signal. In such an embodiment, in the first sampling period, each of the first and second switching transistors included in the first pixel may be turned-on, the first switching transistor included in the second pixel may be turned-off, and the second switching transistor included in the second pixel may be turned-on. In such an embodiment, in the second sampling period, the first switching transistor included in the first pixel may be turned-off, the second switching transistor included in the first pixel may be turned-on, and each of the first and second switching transistors included in the second pixel may be turned-on.

In an embodiment, the sensing circuit may further include a sensing line initialization circuit which simultaneously initializes the first sensing line and the second sensing line in the first sub-sensing period and the second sub-sensing period.

In an embodiment, the sensing line initialization circuit may include a first sensing line initialization switch which applies an initialization voltage to the first sensing line in response to a sensing line initialization signal, and a second sensing line initialization switch which applies the initialization voltage to the second sensing line in response to the sensing line initialization signal.

In an embodiment, the sensing channel may include a sampling capacitor including a first electrode and a second electrode, a first sampling switch which connects the first and second line selection switches to the first electrode of the sampling capacitor in response to a sampling signal, and a first reference switch which applies a reference voltage to the second electrode of the sampling capacitor in response to a reference signal.

In an embodiment, the reference channel may include a reference capacitor including a first electrode and a second electrode, an initialization switch which provides the initialization voltage to a first node in response to an initialization signal, a second sampling switch which connects the first node to the first electrode of the reference capacitor and applies the initialization voltage to the first electrode of the reference capacitor in response to the sampling signal, and a second reference switch which applies the reference voltage to the second electrode of the reference capacitor in response to the reference signal.

In an embodiment, the sensing circuit may further include a channel connection switch which connects the sensing channel to the reference channel. In such an embodiment, the channel connection switch may connect the first electrode of the sampling capacitor to the first electrode of the reference capacitor in response to a channel connection signal.

In an embodiment, the sensing circuit may further include an analog-to-digital converter, and a switch matrix which connects the sensing channel and the reference channel to the analog-to-digital converter.

In an embodiment, the first sensing period may include the first sub-sensing period in which a sensing operation on a first pixel connected to the first sensing line is performed by the sensing channel and a sensing operation on a second pixel connected to the second sensing line is performed by the reference channel, and a first data output period in which first sensing data corresponding to the first sensing voltage is output. In such an embodiment, the second sensing period may include the second sub-sensing period in which a sensing operation on the second pixel connected to the second sensing line is performed by the sensing channel and a sensing operation on the first pixel connected to the first sensing line is performed by the reference channel, and a second data output period in which second sensing data corresponding to the second sensing voltage is output.

In an embodiment, the first sub-sensing period may include a first sensing line initialization period in which the first sensing line and the second sensing line are simultaneously initialized, a first capacitor initialization period in which the sampling capacitor and the reference capacitor are initialized, the first sampling period in which a first sensing voltage and a noise of the first sensing line and a noise of the second sensing line are sampled, and a first analog-to-digital conversion period in which the first sensing voltage of the first sensing line is converted to the first sensing data by offsetting the noise of the first sensing line and the noise of the second sensing line. In such an embodiment, the second sub-sensing period may include a second sensing line initialization period in which the first sensing line and the second sensing line are simultaneously initialized, a second capacitor initialization period in which the sampling capacitor and the reference capacitor are initialized, the second sampling period in which a second sensing voltage and a noise of the second sensing line and a noise of the first sensing line are sampled, and a second analog-to-digital conversion period in which the second sensing voltage of the second sensing line is converted to the second sensing data by offsetting the noise of the second sensing line and the noise of the first sensing line.

In an embodiment, the sensing line initialization signal may have an activation level in the first and second sensing line initialization periods. In such an embodiment, the sensing line initialization circuit may apply the initialization voltage to the first sensing line and the second sensing line in response to the sensing line initialization signal having the activation level.

In an embodiment, each of the sampling signal, the reference signal, the initialization signal, and the channel connection signal may have an activation level in the first and second capacitor initialization periods. In such an embodiment, the initialization switch may be turned-on in response to the initialization signal having the activation level, the second sampling switch may be turned-on in response to the sampling signal having the activation level, and the channel connection switch may be turned-on in response to the channel connection signal having the activation level, such that the initialization voltage may be applied to the first electrode of the reference capacitor through the initialization switch and the second sampling switch, and the initialization voltage may be applied to the first electrode of the sampling capacitor through the initialization switch, the second sampling switch, and the channel connection switch. In such an embodiment, the first reference switch and the second reference switch may be turned-on in response to the reference signal having the activation level, such that the reference voltage may be applied to the second electrode of the sampling capacitor through the first reference switch, and the reference voltage may be applied to the second electrode of the reference capacitor through the second reference switch.

In an embodiment, the first capacitor initialization period may overlap the first sensing line initialization period, and the second capacitor initialization period may overlap the second sensing line initialization period.

In an embodiment, in the first sampling period, each of a first line selection signal, a second noise selection signal, the sampling signal, and the reference signal may have an activation level, and each of a second line selection signal, a first noise selection signal, the initialization signal, and the channel connection signal may have an inactivation level. In such an embodiment, the first line selection switch may be turned-on in response to the first line selection signal having the activation level, the second noise selection switch may be turned-on in response to the second noise selection signal having the activation level, and the first sampling switch and the second sampling switch may be turned-on in response to the sampling signal having the activation level, such that a first sensing voltage and a noise of the first sensing line may be applied to the first electrode of the sampling capacitor through the first line selection switch and the first sampling switch, and a noise of the second sensing line may be applied to the first electrode of the reference capacitor through the second noise selection switch and the second sampling switch. In such an embodiment, the first reference switch and the second reference switch may be turned-on in response to the reference signal having the activation level, such that the reference voltage may be applied to the second electrode of the sampling capacitor through the first reference switch, and the reference voltage may be applied to the second electrode of the reference capacitor through the second reference switch.

In an embodiment, the channel connection signal may have an inactivation level in the first analog-to-digital conversion period. In such an embodiment, the switch matrix may connect the second electrode of the sampling capacitor and the second electrode of the reference capacitor to the analog-to-digital converter, and the analog-to-digital converter may convert the first sensing voltage obtained by subtracting the noise of the second sensing line from the first sensing voltage and the noise of the first sensing line to the first sensing data.

In an embodiment, in the second sampling period, each of a second line selection signal, a first noise selection signal, the sampling signal, and the reference signal may have an activation level, and each of a first line selection signal, a second noise selection signal, the initialization signal, and the channel connection signal may have an inactivation level. In such an embodiment, the second line selection switch may be turned-on in response to the second line selection signal having the activation level, the first noise selection switch may be turned-on in response to the first noise selection signal having the activation level, and the first sampling switch and the second sampling switch may be turned-on in response to the sampling signal having the activation level, such that a second sensing voltage and a noise of the second sensing line may be applied to the first electrode of the sampling capacitor through the second line selection switch and the second sampling switch, and a noise of the first sensing line may be applied to the first electrode of the reference capacitor through the first noise selection switch and the second sampling switch. In such an embodiment, the first reference switch and the second reference switch may be turned-on in response to the reference signal having the activation level, such that the reference voltage may be applied to the second electrode of the sampling capacitor through the first reference switch, and the reference voltage may be applied to the second electrode of the reference capacitor through the second reference switch.

In an embodiment, the channel connection signal may have an inactivation level in the second analog-to-digital conversion period. In such an embodiment, the switch matrix may connect the second electrode of the sampling capacitor and the second electrode of the reference capacitor to the analog-to-digital converter, and the analog-to-digital converter may convert the second sensing voltage obtained by subtracting the noise of the first sensing line from the second sensing voltage and the noise of the second sensing line to the second sensing data.

In an embodiment, a display panel of the display device may include N odd-numbered sensing lines including the first sensing line and N even-numbered sensing lines including the second sensing line, where N is an integer greater than or equal to 1. In such an embodiment, the sensing circuit may include N sensing channels which include the sensing channel, N reference channels which include the reference channel, N first line selection switches which connect the N odd-numbered sensing lines to the N sensing channels in the first sub-sensing period, and include the first line selection switch, N second noise selection switches which connect the N even-numbered sensing lines to the N reference channels in the first sub-sensing period, and include the second noise selection switch, N second line selection switches which connect the N even-numbered sensing lines to the N sensing channels in the second sub-sensing period, and include the second line selection switch, N first noise selection switches which connect the N odd-numbered sensing lines to the N reference channels in the second sub-sensing period, and include the first noise selection switch, an analog-to-digital converter, and a switch matrix which sequentially connects the N sensing channels and the N reference channels to the analog-to-digital converter in a first analog-to-digital conversion period in the first sub-sensing period, and sequentially connects the N sensing channels and the N reference channels to the analog-to-digital converter in a second analog-to-digital conversion period in the second sub-sensing period. In such an embodiment, the analog-to-digital converter may sequentially convert N first sensing voltages of the N odd-numbered sensing lines to N first sensing data by offsetting N noises of the N odd-numbered sensing lines and N noises of the N even-numbered sensing lines in the first analog-to-digital conversion period, and may sequentially convert N second sensing voltages of the N even-numbered sensing lines to N second sensing data by offsetting N noises of the N even-numbered sensing lines and N noises of the N odd-numbered sensing lines in the second analog-to-digital conversion period.

In an embodiment, the sensing circuit may further include a data output unit which sequentially stores the N first sensing data in the first analog-to-digital conversion period, sequentially stores the N second sensing data in the second analog-to-digital conversion period, and outputs the N first sensing data and the N second sensing data in a data output period in the sensing period. In such an embodiment, the data output unit may rearrange the N first sensing data and the N second sensing data in a way such that each of the N second sensing data is disposed between adjacent two of the N first sensing data.

A display device according to embodiments includes a display panel which includes a plurality of pixels, a scan driver which provides a scan signal and a sensing signal to each of the plurality of pixels, a data driver which provides a data signal to each of the plurality of pixels, a sensing circuit connected to the plurality of pixels through a plurality of sensing lines, and a controller which controls the scan driver, the data driver, and the sensing circuit. The sensing circuit may include a first line selection switch which connects a first sensing line to a sensing channel in a first sub-sensing period in a first sensing period, a first noise selection switch which connects the first sensing line to a reference channel in a second sub-sensing period in a second sensing period, a second line selection switch which connects a second sensing line to the sensing channel in the second sub-sensing period, and a second noise selection switch which connects the second sensing line to the reference channel in the first sub-sensing period. In such an embodiment, in a first sampling period in the first sub-sensing period, the sensing channel may sample a first sensing voltage and a noise of the first sensing line, and the reference channel may sample a noise of the second sensing line. In such an embodiment, in a second sampling period in the second sub-sensing period, the sensing channel may sample a second sensing voltage and a noise of the second sensing line, and the reference channel may sample a noise of the first sensing line.

A sensing circuit of a display device according to embodiments includes N sensing channels, where N is an integer greater than or equal to 1, N reference channels, N first line selection switches which connect N odd-numbered sensing lines to the N sensing channels, N second noise selection switches which connect N even-numbered sensing lines to the N reference channels, N second line selection switches which connect the N even-numbered sensing lines to the N sensing channels, N first noise selection switches which connect the N odd-numbered sensing lines to the N reference channels, an analog-to-digital converter which generates sensing data, and a switch matrix which includes a first multiplexer which connects one sensing channel selected thereby from the N sensing channels to the analog-to-digital converter and a second multiplexer which connects one reference channel selected thereby from the N reference channels to the analog-to-digital converter.

In an embodiment, when the N first line selection switches and the N second noise selection switches are turned-on, a first sensing line selected from the N odd-numbered sensing lines may provide a first sensing voltage and a first noise to a sensing channel of the N sensing channels connected to the first sensing line, and a second sensing line selected from the N even-numbered sensing lines may provide a second noise to a reference channel of the N reference channels connected to the second sensing line.

In an embodiment, each of pixels connected to the first and second sensing lines may include a first switching transistor which is turned-on in response to a scan signal and a second switching transistor which is turned-on in response to a sensing signal. In such an embodiment, each of the first and second switching transistors included in a pixel connected to the first sensing line may be turned-on, the first switching transistor included in a pixel connected to the second sensing line may be turned-off, and the second switching transistor included in the pixel connected to the second sensing line may be turned-on.

In an embodiment, when the N second line selection switches and the N first noise selection switches are turned-on, a second sensing line selected from the N even-numbered sensing lines may provide a second sensing voltage and a second noise to a sensing channel of the N sensing channels connected to the second sensing line, and a first sensing line selected from the N odd-numbered sensing lines may provide a first noise to a reference channel of the N reference channels connected to the first sensing line.

In an embodiment, each of pixels connected to the first and second sensing lines may include a first switching transistor which is turned-on in response to a scan signal and a second switching transistor which is turned-on in response to a sensing signal. In such an embodiment, each of the first and second switching transistors included in a pixel connected to the second sensing line may be turned-on, the first switching transistor included in a pixel connected to the first sensing line may be turned-off, and the second switching transistor included in the pixel connected to the first sensing line may be turned-on.

In an embodiment, the sensing circuit may further include a memory which stores the sensing data. In such an embodiment, a first sensing voltage and a first noise may be provided to a first terminal of the analog-to-digital converter from the one sensing channel selected by the first multiplexer from the N sensing channels, a second noise may be provided to a second terminal of the analog-to-digital converter from a reference channel selected by the second multiplexer from the N reference channels, and the analog-to-digital converter may generate first sensing data corresponding to a value obtained by subtracting the second noise from the first sensing voltage and the first noise. In such an embodiment, the first sensing data may be stored in the memory.

In an embodiment, the first sensing voltage and the first noise may be provided to the first terminal of the analog-to-digital converter from the one sensing channel selected by the first multiplexer from the N sensing channels, a third noise may be provided to the second terminal of the analog-to-digital converter from another reference channel selected by the second multiplexer from the N reference channels, and the analog-to-digital converter may generate second sensing data corresponding to a value obtained by subtracting the third noise from the first sensing voltage and the first noise.

In an embodiment, the sensing circuit may further include a calculation unit which generates an average sensing data based on the first sensing data and the second sensing data.

A sensing circuit of a display device according to embodiments includes N sensing channels, where N is an integer greater than or equal to 1, N reference channels, N first line selection switches which connect N odd-numbered sensing lines to the N sensing channels, N second noise selection switches which connect N even-numbered sensing lines to the N reference channels, N second line selection switches which connect the N even-numbered sensing lines to the N sensing channels, N first noise selection switches which connect the N odd-numbered sensing lines to the N reference channels, an analog-to-digital converter which generates sensing data and includes a first terminal and a second terminal, a first switch matrix which includes a first multiplexer which connects one sensing channel selected thereby from the N sensing channels to the first terminal of the analog-to-digital converter, a summing amplifier which connects an output terminal thereof to the second terminal of the analog-to-digital converter, and a second switch matrix which includes a second multiplexer which connects one reference channel selected thereby from the N reference channels to a first terminal of the summing amplifier, a third multiplexer which connects one sensing channel selected from the N sensing channels to the first terminal of the summing amplifier, and a second multiplexer which connects one reference channel selected thereby from the N reference channels to the first terminal of the summing amplifier.

In an embodiment, the first multiplexer may receive a first sensing voltage and a first noise from a sensing channel selected thereby from the N sensing channels. In such an embodiment, the second multiplexer may receive a second noise from a reference channel selected thereby from the N reference channels. In such an embodiment, the third multiplexer may receive a third noise from a sensing channel selected f thereby rom the N sensing channels. In such an embodiment, the fourth multiplexer may receive a fourth noise from a reference channel selected thereby from the N reference channels.

In an embodiment, the second to fourth multiplexers may simultaneously receive the second to fourth noises, respectively, and the second to fourth noises may be simultaneously provided to the first terminal of the summing amplifier.

In an embodiment, the summing amplifier may output a summed noise, which is an average of the second to fourth noises, and the summed noise may be provided to the second terminal of the analog-to-digital converter.

In an embodiment, a pixel connected to the sensing channel and a pixel connected to the reference channel each may include a first switching transistor which is turned-on in response to a scan signal and a second switching transistor which is turned-on in response to a sensing signal. In such an embodiment, each of the first and second switching transistors included in the pixel connected to the sensing channel providing the first sensing voltage and the first noise may be turned-on, the first switching transistor included in the pixel connected to the reference channel providing the second noise may be turned-off, the second switching transistor included in the pixel connected to the reference channel providing the second noise may be turned-on, the first switching transistor included in the pixel connected to the sensing channel providing the third noise may be turned-off, the second switching transistor included in the pixel connected to the sensing channel providing the third noise may be turned-on, the first switching transistor included in the pixel connected to the reference channel providing the fourth noise may be turned-off, and the second switching transistor included in the pixel connected to the reference channel providing the fourth noise may be turned-on.

In an embodiment, the second switch matrix may further include first to $N^{th}$ resistors connected between the second multiplexer and the N reference channels, respectively, first to $N^{th}$ resistors connected between the third multiplexer and the N sensing channels, and first to $N^{th}$ resistors connected between the fourth multiplexer and the N reference channels, respectively.

In an embodiment, the second noise provided to a reference channel selected from the N reference channels may be provided to the second multiplexer through a second resistor of the first to $N^{th}$ resistors. In such an embodiment, the third noise provided to a sensing channel selected from the N sensing channels may be provided to the third multiplexer through a third resistor of the first to $N^{th}$ resistors. In such an embodiment, the fourth noise provided to a reference channel selected from the N reference channels may be provided to the fourth multiplexer through a fourth resistor of the first to $N^{th}$ resistors.

In an embodiment, the sensing circuit may further include a variable resistor connected between the first terminal and the output terminal of the summing amplifier.

In an embodiment, a resistance of the variable resistor may be equal to a sum of resistances of the second to fourth resistors.

A method of driving a sensing circuit of a display device according to embodiments includes simultaneously initializing a first sensing line connected to a first pixel and a second sensing line connected to a second pixel, connecting the first sensing line and the second sensing line to a sensing channel and a reference channel, respectively, sampling a first sensing voltage and a noise of the first sensing line and a noise of the second sensing line, and outputting first sensing data corresponding to the first sensing voltage of the first sensing line by offsetting the noise of the first sensing line and the noise of the second sensing line.

In an embodiment, the method may further include simultaneously initializing the first sensing line and the second sensing line, connecting the second sensing line and the first sensing line to the sensing channel and the reference channel, respectively, sampling a second sensing voltage and a noise of the second sensing line and a noise of the first sensing line, and outputting second sensing data corresponding to the second sensing voltage of the second sensing line by offsetting the noise of the second sensing line and the noise of the first sensing line.

In a display device including a sensing circuit according to embodiments, in a first sensing period, a sensing channel may sense a first sensing voltage and noise of a first sensing line, a reference channel may sense noise of a second sensing line adjacent to the first sensing line, and the noises may be offset by an analog-to-digital converter. Accordingly, the sensing circuit may output first sensing data that does not include the noise. In such embodiments, in a second sensing period, the sensing channel may sense a second sensing voltage and noise of the second sensing line, a reference channel may sense noise of the first sensing line adjacent to the second sensing line, and the noises may be offset by the analog-to-digital converter. Accordingly, the sensing circuit may output second sensing data that does not include the noise. The sensing circuit may output the first and second sensing data that do not include the noise, so that the display device may accurately compensate input image data based on the first and second sensing data.

In a display device including a sensing circuit according to embodiments, after sensing noises of pixels adjacent to a pixel to be sensed with a sensing voltage, a plurality of sensing data may be sensed, and a calculation unit may generate average sensing data that is an average of the plurality of sensing data. Accordingly, the sensing circuit may generate the relatively more precise average sensing data, and the display device including the sensing circuit may more precisely compensate image data.

In a display device including a sensing circuit according to embodiments, after sensing noises of pixels adjacent to a pixel to be sensed with a sensing voltage, a summed noise of noises may be generated using a summing amplifier, and an analog-to-digital converter may generate sensing data based on the summed noise. Accordingly, the sensing circuit may generate the relatively more precise sensing data, and the display device including the sensing circuit may more precisely compensate image data.

BRIEF DESCRIPTION OF THE DRAWINGS

Illustrative, non-limiting embodiments will be more clearly understood from the following detailed description taken in conjunction with the accompanying drawings.

DETAILED DESCRIPTION

Figure 1:
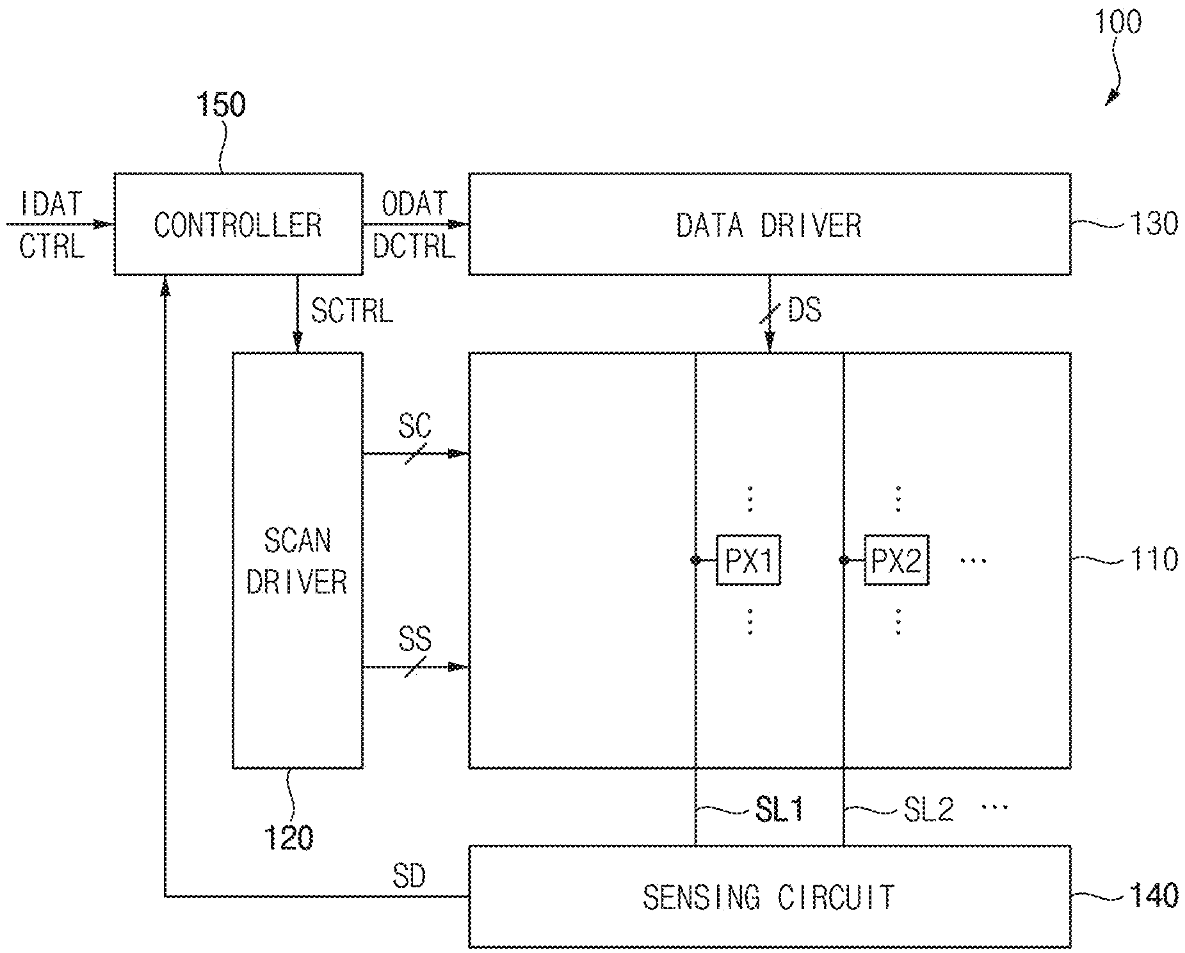
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, sensing circuits, display devices, and methods of driving sensing circuits according to embodiments will be described in detail with reference to the accompanying drawings. The same or similar reference numerals will be used for the same elements in the accompanying drawings.

Figure 2:
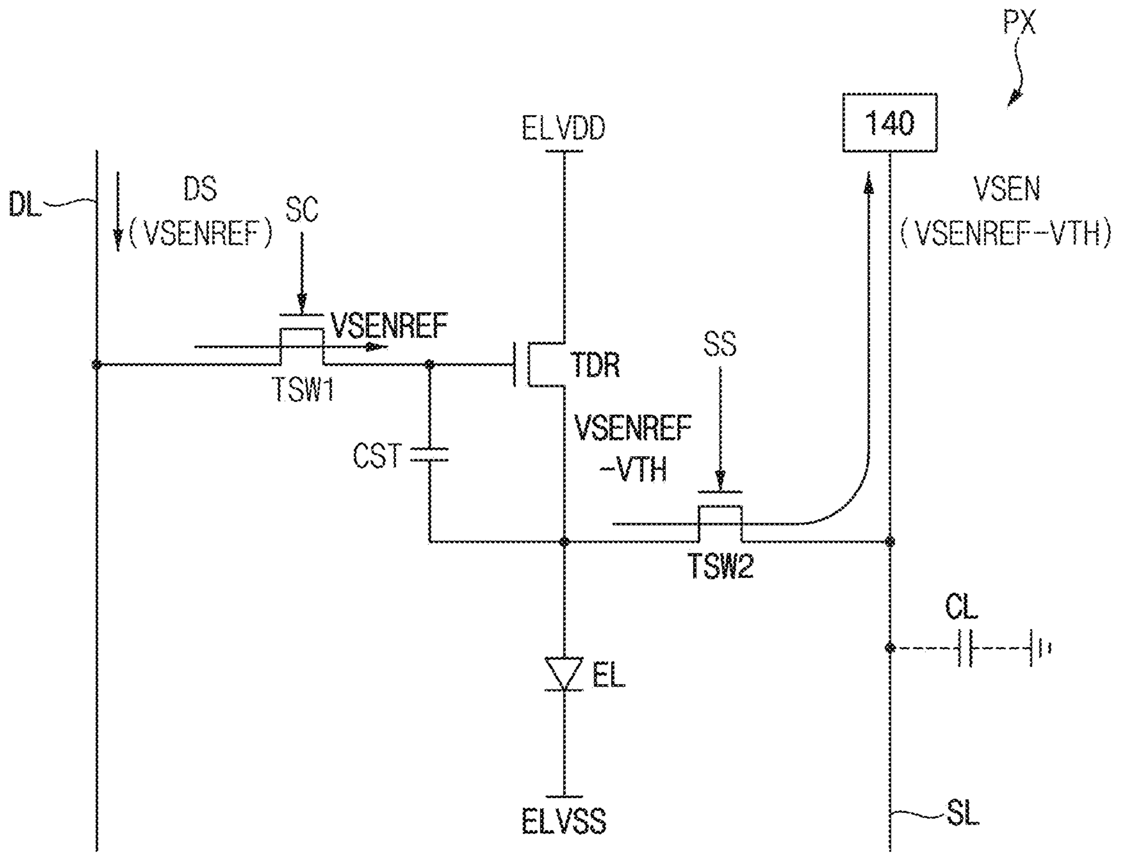
FIG. 2 is a circuit diagram illustrating a pixel included in the display device in FIG. 1.
Figure 3:
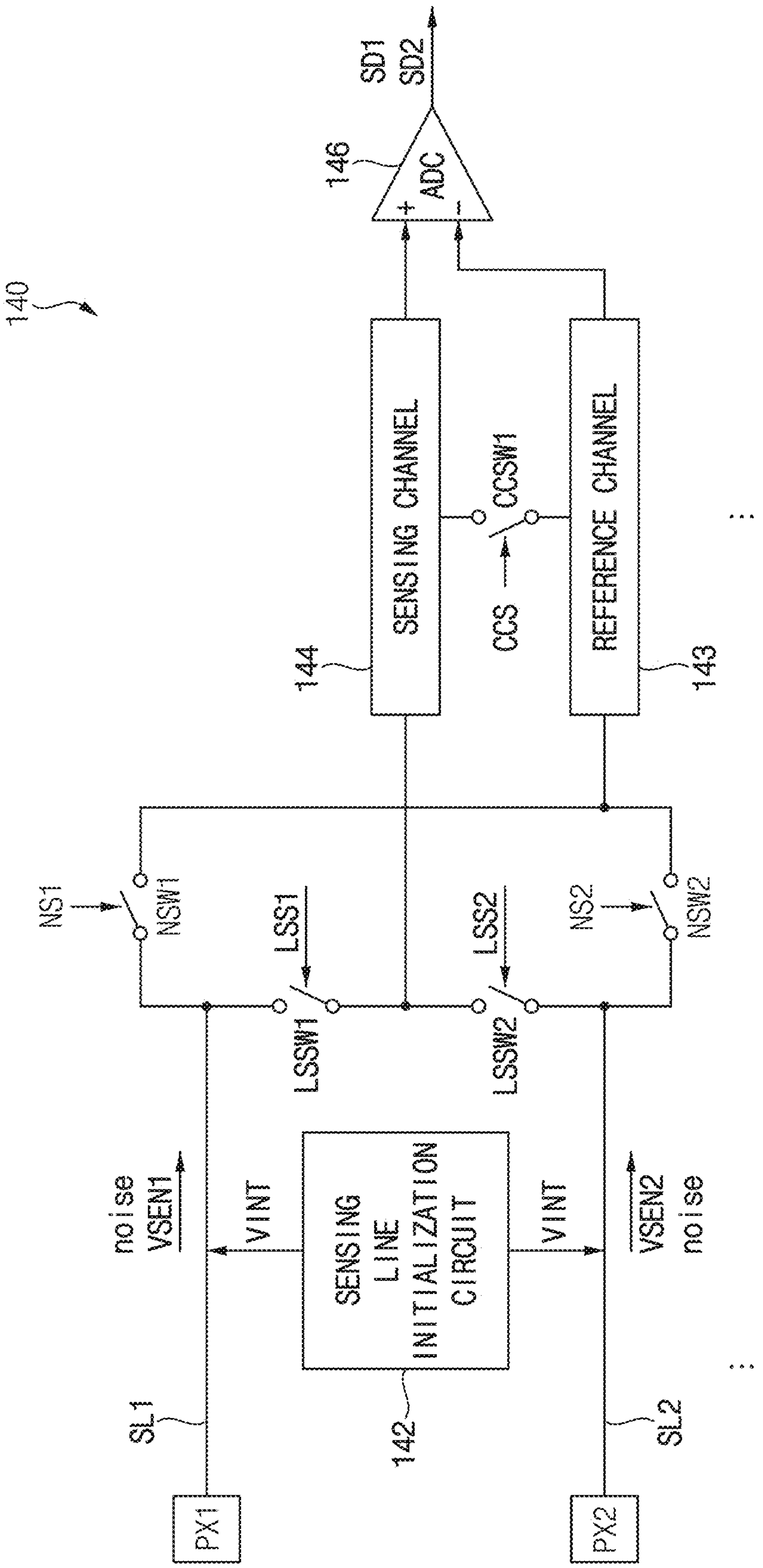
FIG. 3 is a block diagram illustrating a sensing circuit included in the display device in FIG. 1.

FIG. 1 is a block diagram illustrating a display device according to an embodiment. FIG. 2 is a circuit diagram illustrating a pixel included in the display device in FIG. 1. FIG. 3 is a block diagram illustrating a sensing circuit included in the display device in FIG. 1.

Referring to FIG. 1, a display device 100 according to an embodiment may include a display panel 110 including a plurality of pixels PX1 and PX2, a scan driver 120 for providing a scan signal SC and a sensing signal SS to each of the plurality of pixels PX1 and PX2, a data driver 130 for providing a data signal DS to each of the plurality of pixels PX1 and PX2, a sensing circuit 140 connected to the plurality of pixels PX1 and PX2 through a plurality of sensing lines SL1 and SL2, and a controller 150 for controlling the scan driver 120, the data driver 130, and the sensing circuit 140.

The display panel 110 may include a plurality of data lines, a plurality of scan lines, a plurality of sensing signal lines, the plurality of sensing lines SL1 and SL2, and the plurality of pixels PX1 and PX2 connected thereto. In an embodiment, each of the plurality of pixels PX1 and PX2 may include a light emitting element, and the display panel 110 may be a light emitting display panel. In an embodiment, for example, the light emitting element may be an organic light emitting diode ("OLED"), and the display panel 110 may be an OLED display panel. In an alternative embodiment, the light emitting element may be a nano light emitting diode ("NED"), a quantum dot ("QD") light emitting diode, a micro light emitting diode, an inorganic light emitting diode, or any other suitable light emitting element.

In an embodiment, for example, as illustrated in FIG. 2, each pixel PX may include a first switching transistor TSW1 that transmits the data signal DS (or a sensing reference voltage VSENREF) of the data line DL to a storage capacitor CST in response to the scan signal SC, the storage capacitor CST that stores the data signal DS transmitted by the first switching transistor TSW1, a driving transistor TDR that generates a driving current based on the data signal DS stored in the storage capacitor CST, a light emitting element EL that emits light based on the driving current flowing from a first power voltage ELVDD to a second power voltage ELVSS, and a second switching transistor TSW2 that connects one terminal (e.g., a source) of the driving transistor TDR to the sensing line SL in response to the sensing signal SS. The sensing line SL may have a parasitic capacitor CL.

In a sensing period, as shown in FIG. 2, the scan driver 120 may provide the scan signal SC and the sensing signal SS to each pixel PX of a selected pixel row, and the data driver 130 may provide the sensing reference voltage VSENREF to each pixel PX of the selected pixel row. The first switching transistor TSW1 may transmit the sensing reference voltage VSENREF to a gate of the driving transistor TDR in response to the scan signal SC. When the sensing reference voltage VSENREF is applied to the gate of the driving transistor TDR, a voltage of one terminal (e.g., the source) of the driving transistor TDR may be saturated with a voltage VSENREF-VTH obtained by subtracting a threshold voltage VTH of the driving transistor TDR from the sensing reference voltage VSENREF. The second switching transistor TSW2 may transmit the voltage VSENREF-VTH of the terminal of the driving transistor TDR to the sensing line SL in response to the sensing signal SS, and the sensing circuit 140 may sense the voltage VSENREF-VTH obtained by subtracting the threshold voltage VTH of the driving transistor TDR from the sensing reference voltage VSENREF as a sensing voltage VSEN of the sensing line SL.

Although FIG. 2 illustrates an embodiment of the pixel PX, the pixel PX of the display device 100 according to an embodiment is not limited to that shown in FIG. 2. Further, the display panel 110 is not limited to the light emitting display panel, and may be any display panel.

Referring back to FIG. 1, the scan driver 120 may generate scan signals SC and sensing signals SS based on a scan control signal SCTRL received from the controller 150, and may sequentially provide the scan signals SC and the sensing signals SS to the plurality of pixels PX1 and PX2 in a unit of a pixel row or on a pixel row-by-pixel row basis. In an embodiment, the scan control signal SCTRL may include a scan start signal and a scan clock signal, but is not limited thereto. In an embodiment, the scan driver 120 may be integrated or formed on a peripheral area of the display panel 110. In an alternative embodiment, the scan driver 120 may be implemented as one or more integrated circuits.

The data driver 130 may generate data signals DS based on output image data ODAT and a data control signal DCTRL received from the controller 150, and may provide the data signals DS to the plurality of pixels PX1 and PX2. In an embodiment, as described above with reference to FIG. 2, the data driver 130 may provide the sensing reference voltage VSENREF to the pixels PX1 and PX2 of the selected pixel row in the sensing period. In an embodiment, the data control signal DCTRL may include a horizontal start signal, an output data enable signal, a load signal, or the like, but is not limited thereto. In an embodiment, the data driver 130 may be implemented as one or more integrated circuits. In an alternative embodiment, the data driver 130 and the controller 150 may be implemented as a single integrated circuit, and the integrated circuit may be referred to as a timing controller embedded data driver ("TED").

The sensing circuit 140 may sense characteristics (e.g., the threshold voltage VTH and/or mobility of the driving transistor TDR) of a plurality of pixels PX1 and PX2 of the selected pixel row through the plurality of sensing lines SL1 and SL2. The sensing circuit 140 may provide sensing data SD generated by sensing the plurality of pixels PX1 and PX2 to the controller 150. In an embodiment, the sensing circuit 140 may be implemented as an integrated circuit separate from the integrated circuit of the data driver 130. In an alternative embodiment, the data driver 130 and the sensing circuit 140 may be implemented as a single integrated circuit.

The controller (e.g., a timing controller) 150 may receive input image data IDAT and a control signal CTRL from an external host processor (e.g., a graphics processing unit ("GPU"), an application processor ("AP"), or a graphics card). In an embodiment, the control signal CTRL may include a vertical synchronization signal, a horizontal synchronization signal, an input data enable signal, a master clock signal, or the like, but is not limited to. The controller 150 may generate the output image data ODAT by compensating the input image data IDAT based on the sensing data SD. Further, the controller 150 may generate the data control signal DCTRL and the scan control signal SCTRL based on the control signal CTRL. The controller 150 may control the scan driver 120 by providing the scan control signal SCTRL to the scan driver 120, and may control the data driver 130 by providing the output image data ODAT and the data control signal DCTRL to the data driver 130.

In the display device 100 according to an embodiment, the sensing circuit 140 may perform a sensing operation on the pixels PX1 and PX2 of the pixel row selected in each sensing period. The sensing circuit 140 may perform the sensing operation when the display device 100 is powered-off. In an embodiment, for example, when the display device 100 is powered-off, the sensing circuit 140 may sequentially perform sensing operations on a plurality of pixel rows of the display panel 110 in a plurality of sensing periods. In an alternative embodiment, the sensing circuit 140 may perform the sensing operation during a driving of the display device 100. In an embodiment, for example, when the display device 100 is being driven, the sensing circuit 140 may perform a sensing operation on at least one pixel row in at least one sensing period within a vertical blank period. However, a period in which the sensing operation is performed (that is, the sensing period) is not limited to the power-off period or the vertical blank period.

In an embodiment, the sensing circuit 140 may perform a sensing operation on two or more sensing lines SL1 and SL2 in a time division manner using one sensing channel. In an embodiment, for example, the sensing period may include a first sensing period for sensing an odd-numbered sensing line and a second sensing period for sensing an even-numbered sensing line. The first sensing period may include a first sub-sensing period, and the second sensing period may include a second sub-sensing period. The sensing circuit 140 may perform a sensing operation on the first sensing line SL1 using one sensing channel in the first sub-sensing period, and may perform a sensing operation on the second sensing line SL2 using the one sensing channel in the second sub-sensing period. Accordingly, the size of the sensing circuit 140 may be reduced compared to a sensing circuit including one sensing channel for each sensing line, that is, two sensing channel for the sensing operation on the first sensing line SL1 and the sensing operation on the second sensing line SL2. However, noise may also be sensed when the sensing circuit 140 senses the first sensing line SL1, and noise may also be sensed when the sensing circuit 140 senses the second sensing line SL2. In an embodiment, for example, the noise may be common noise of the display panel 110 or power supply noise.

In an embodiment, the sensing circuit 140 may perform a noise sensing operation on two or more sensing lines SL1 and SL2 in a time division manner using one reference channel. In an embodiment, for example, while the sensing circuit 140 performs a sensing operation on the first sensing line SL1 using the one sensing channel in the first sub-sensing period, the sensing circuit 140 may sense noise on the second sensing line SL2 using one reference channel. In this case, each of the first switching transistor TSW1 and the second switching transistor TSW2 included in the first pixel PX1 connected to the first sensing line SL1 may be turned-on (i.e., turned on), the first switching transistor TSW1 included in the second pixel PX2 connected to the second sensing line SL2 may be turned-off (i.e., turned off), and the second switching transistor TSW2 included in the second pixel PX2 may be turned-on. In an embodiment, for example, in the first pixel PX1, a voltage of about 3 volts (V) to about 5 V may be applied to the gate of the driving transistor TDR, and a source-gate voltage (Vgs) of the driving transistor TDR may be greater than about 0 V and less than a voltage for the light emitting element EL to emit light. That is, the driving transistor TDR of the first pixel PX1 may be turned-off, and the light emitting element EL of the first pixel PX1 may not emit light. In the second pixel PX2, a voltage of about 1 V to about 2 V may be applied to the gate of the driving transistor TDR, and a source-gate voltage (Vgs) of the driving transistor TDR may be less than 0 V. That is, the driving transistor TDR of the second pixel PX2 may be turned-off, and the light emitting element EL of the second pixel PX2 may not emit light.

In the first sub-sensing period, the noise on the first sensing line SL1 sensed by one sensing channel during the sensing operation on the first sensing line SL1 through an analog-to-digital converter may be offset with the noise on the second sensing line SL2 sensed by one reference channel during the sensing operation on the second sensing line SL2. Accordingly, the sensing circuit 140 may output sensing data that does not include noise (or sensing data in which noise is removed or offset). Further, while the sensing circuit 140 performs a sensing operation on the second sensing line SL2 using one sensing channel in the second sub-sensing period, the sensing circuit 140 may sense noise on the first sensing line SL1 using the reference channel. In this case, the first switching transistor TSW1 included in the first pixel PX1 connected to the first sensing line SL1 may be turned-off, the second switching transistor TSW2 included in the first pixel PX1 may be turned-on, and each of the first switching transistor TSW1 and the second switching transistor TSW2 included in the second pixel PX2 connected to the second sensing line SL2 may be turned-on. In an embodiment, for example, in the second pixel PX2, a voltage of about 3 V to about 5 V may be applied to the gate of the driving transistor TDR, and a source-gate voltage (Vgs) of the driving transistor TDR may be greater than about 0 V and less than a voltage for the light emitting element EL to emit light. That is, the driving transistor TDR of the second pixel PX2 may be turned-off, and the light emitting element EL of the second pixel PX2 may not emit light. In the first pixel PX1, a voltage of about 1 V to about 2 V may be applied to the gate of the driving transistor TDR, and a gate-source voltage (Vgs) of the driving transistor TDR may be less than 0 V. That is, the driving transistor TDR of the second pixel PX2 may be turned-off, and the light emitting element EL of the second pixel PX2 may not emit light.

In the second sub-sensing period, the noise on the second sensing line SL2 sensed by one sensing channel during the sensing operation on the second sensing line SL2 through the analog-to-digital converter may be offset with the noise on the first sensing line SL1 sensed by one reference channel during the sensing operation on the first sensing line SL1. Accordingly, the sensing circuit 140 may output sensing data that does not include noise.

In an embodiment, as illustrated in FIG. 3, the sensing circuit 140 may include a sensing line initialization circuit 142, first and second line selection switches LSSW1 and LSSW2, first and second noise selection switches NSW1 and NSW2, a channel connection switch CCSW1, a sensing channel 144, a reference channel 143, and an analog-to-digital converter ("ADC") 146. Although FIG. 3 illustrates an embodiment including two sensing lines SL1 and SL2, one sensing channel 144, and one reference channel 143 for convenience of description, the number of sensing lines SL1 and SL2, the number of sensing channels 144, and the number of reference channels 143 are not limited to those shown in FIG. 3.

The sensing line initialization circuit 142 may substantially simultaneously initialize the first sensing line SL1 and the second sensing line SL2 in the first sub-sensing period of each first sensing period. In an embodiment, for example, the sensing line initialization circuit 142 may provide an initialization voltage VINT to the first sensing line SL1 and the second sensing line SL2 in a sensing line initialization period of the first sub-sensing period to initialize the first sensing line SL1 and the second sensing line SL2.

The first line selection switch LSSW1 may connect the first sensing line SL1 to the sensing channel 144 in the first sub-sensing period, and the second line selection switch LSSW2 may connect the second sensing line SL2 to the sensing channel 144 in the second sub-sensing period. In an embodiment, for example, a first line selection signal LSS1 may have an activation level (e.g., high level HIGH shown in FIG. 4) in at least a portion of the first sub-sensing period, and the first line selection switch LSSW1 may connect the first sensing line SL1 to the sensing channel 144 in response to the first line selection signal LSS1 having the activation level. Further, a second line selection signal LSS2 may have an activation level (e.g., high level HIGH shown in FIG. 4) in at least a portion of the second sub-sensing period, and the second line selection switch LSSW2 may connect the second sensing line SL2 to the sensing channel 144 in response to the second line selection signal LSS2 having the activation level.

The second noise selection switch NSW2 may connect the second sensing line SL2 to the reference channel 143 in the first sub-sensing period, and the first noise selection switch NSW1 may connect the first sensing line SL1 to the reference channel 143 in the second sub-sensing period. In an embodiment, for example, a second noise selection signal NS2 may have an activation level (e.g., high level HIGH shown in FIG. 4) in at least a portion of the first sub-sensing period, and the second noise selection switch NSW2 may connect the second sensing line SL2 to the reference channel 143 in response to the second noise selection signal NS2 having the activation level. Further, a first noise selection signal NS1 may have an activation level (e.g., high level HIGH shown in FIG. 4) in at least a portion of the second sub-sensing period, and the first noise selection switch NSW1 may connect the first sensing line SL1 to the reference channel 143 in response to the first noise selection signal NS1 having the activation level.

The channel connection switch CCSW1 may connect the reference channel 143 and the sensing channel 144 to each other in the first sub-sensing period. In an embodiment, for example, a connection signal CCS may have an activation level in at least a portion of the first sub-sensing period, and the channel connection switch CCSW1 may connect the reference channel 143 and the sensing channel 144 to each other in response to the connection signal CCS having the activation level.

The sensing channel 144 may sample a first sensing voltage VSEN1 and noise of the first sensing line SL1, that is, a first sensing voltage VSEN1 and noise with respect to the first pixel PX1 connected to the first sensing line SL1, in a first sampling period of the first sub-sensing period. The reference channel 143 may sample noise of the second sensing line SL2, that is, noise with respect to the second pixel PX2 connected to the second sensing line SL2, in the first sampling period of the first sub-sensing period. During the first sampling period of the first sub-sensing period, each of the first switching transistor TSW1 and the second switching transistor TSW2 included in the first pixel PX1 connected to the first sensing line SL1 may be turned-on, the first switching transistor TSW1 included in the second pixel PX2 connected to the second sensing line SL2 may be turned-off, and the second switching transistor TSW2 included in the second pixel PX2 may be turned-on. In an embodiment, for example, in the first pixel PX1, a voltage of about 3 V to about 5 V may be applied to the gate of the driving transistor TDR, and a source-gate voltage (Vgs) of the driving transistor TDR may be greater than about 0 V and less than a voltage for the light emitting element EL to emit light. That is, the driving transistor TDR of the first pixel PX1 may be turned-off, and the light emitting element EL of the first pixel PX1 may not emit light. In the second pixel PX2, a voltage of about 1 V to about 2 V may be applied to the gate of the driving transistor TDR, and a source-gate voltage (Vgs) of the driving transistor TDR may be less than 0 V. That is, the driving transistor TDR of the second pixel PX2 may be turned-off, and the light emitting element EL of the second pixel PX2 may not emit light.

In a first analog-to-digital conversion period of the first sub-sensing period, a first terminal of the ADC 146 may receive the first sensing voltage VSEN1 and the noise, and the second terminal of the ADC 146 may receive the noise. The ADC 146 may offset the noise received through the first terminal and the noise received through the second terminal, and may convert the first sensing voltage VSEN1 received through the first terminal to first sensing data SD1. The sensing circuit 140 may provide the first sensing data SD1 to the controller 150 in a data output period of the first sensing period.

Further, the sensing channel 144 may sample a second sensing voltage VSEN2 and noise of the second sensing line SL2, that is, a second sensing voltage VSEN2 and noise with respect to the second pixel PX2 connected to the second sensing line SL2, in a second sampling period of the second sub-sensing period. The reference channel 143 may sample noise of the first sensing line SL1, that is, noise with respect to the first pixel PX1 connected to the first sensing line SL1, in the second sampling period of the second sub-sensing period. During the second sampling period of the second sub-sensing period, each of the first switching transistor TSW1 and the second switching transistor TSW2 included in the second pixel PX2 connected to the second sensing line SL2 may be turned-on, the first switching transistor TSW1 included in the first pixel PX1 connected to the first sensing line SL1 may be turned-off, and the second switching transistor TSW2 included in the first pixel PX1 may be turned-on. In an embodiment, for example, in the second pixel PX2, a voltage of about 3V to about 5V may be applied to the gate of the driving transistor TDR, and a source-gate voltage (Vgs) of the driving transistor TDR may be greater than about 0V and less than a voltage for the light emitting element EL to emit light. That is, the driving transistor TDR of the second pixel PX2 may be turned-off, and the light emitting element EL of the second pixel PX2 may not emit light. In the first pixel PX1, a voltage of about 1 V to about 2 V may be applied to the gate of the driving transistor TDR, and a source-gate voltage (Vgs) of the driving transistor TDR may be less than 0 V. That is, the driving transistor TDR of the first pixel PX1 may be turned-off, and the light emitting element EL of the first pixel PX1 may not emit light.

In a second analog-to-digital conversion period of the second sub-sensing period, the first terminal of the ADC 146 may receive the second sensing voltage VSEN2 and the noise, and the second terminal of the ADC 146 may receive the noise. The ADC 146 may offset the noise received through the first terminal and the noise received through the second terminal, and may convert the second sensing voltage VSEN2 received through the first terminal to second sensing data SD2. The sensing circuit 140 may provide the second sensing data SD2 to the controller 150 in a data output period of the second sensing period.

In the sensing circuit 140 according to an embodiment, in the first sensing period, the sensing channel 144 may sense the first sensing voltage VSEN1 and the noise of the first sensing line SL1, the reference channel 143 may sense the noise of the second sensing line SL2 adjacent to the first sensing line SL1, and the noises may be offset through the ADC 146. Accordingly, the sensing circuit 140 may output the first sensing data SD1 that does not include noise.

in such an embodiment, in the second sensing period, the sensing channel 144 may sense the second sensing voltage VSEN2 and the noise of the second sensing line SL2, the reference channel 143 may sense the noise of the first sensing line SL1 adjacent to the second sensing line SL2, and the noises may be offset through the ADC 146. Accordingly, the sensing circuit 140 may output the second sensing data SD2 that does not include noise.

Figure 4:
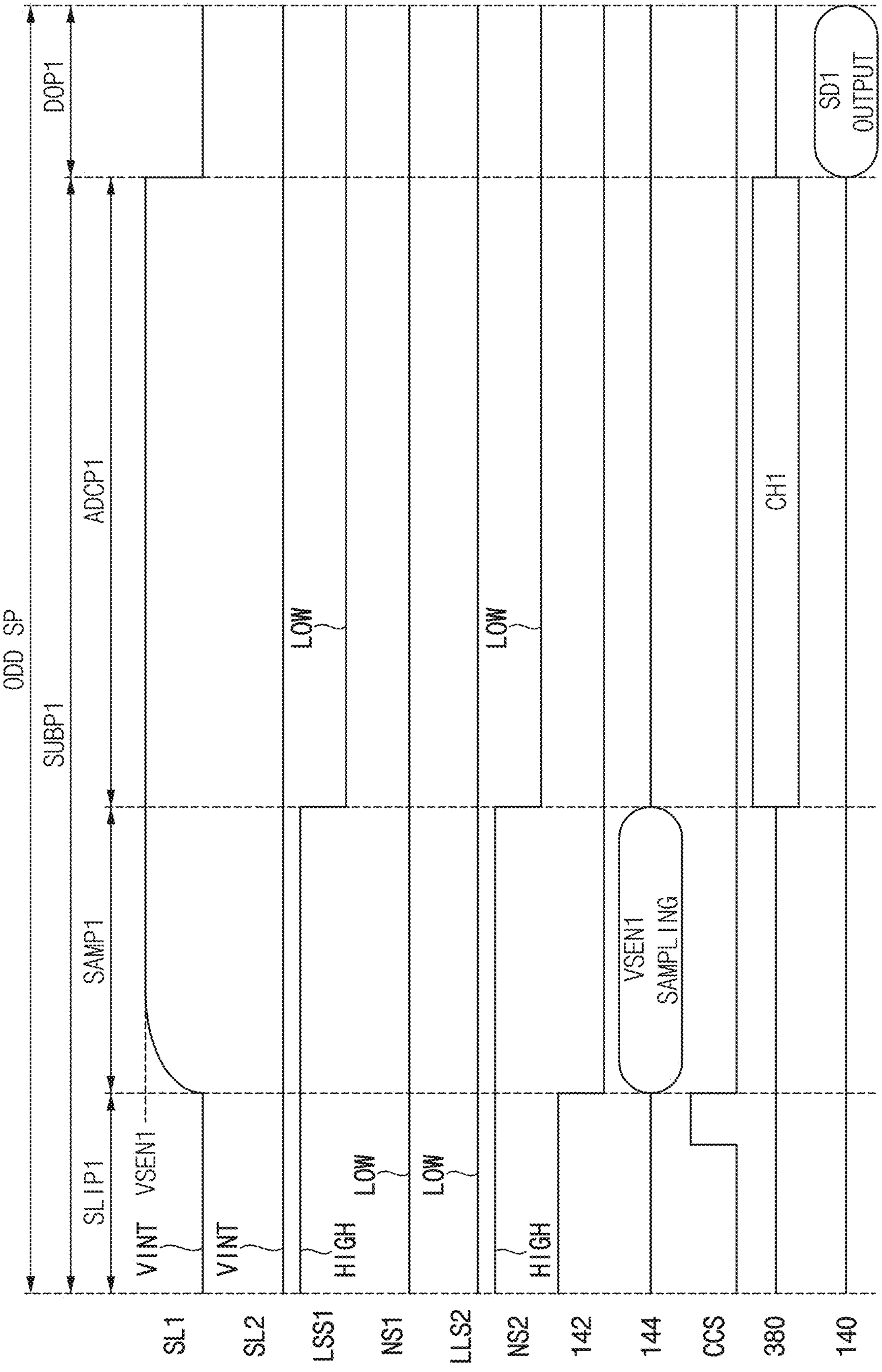
FIGS. 4 and 5 are timing diagrams for describing an operation of the sensing circuit in FIG. 3.
Figure 5:
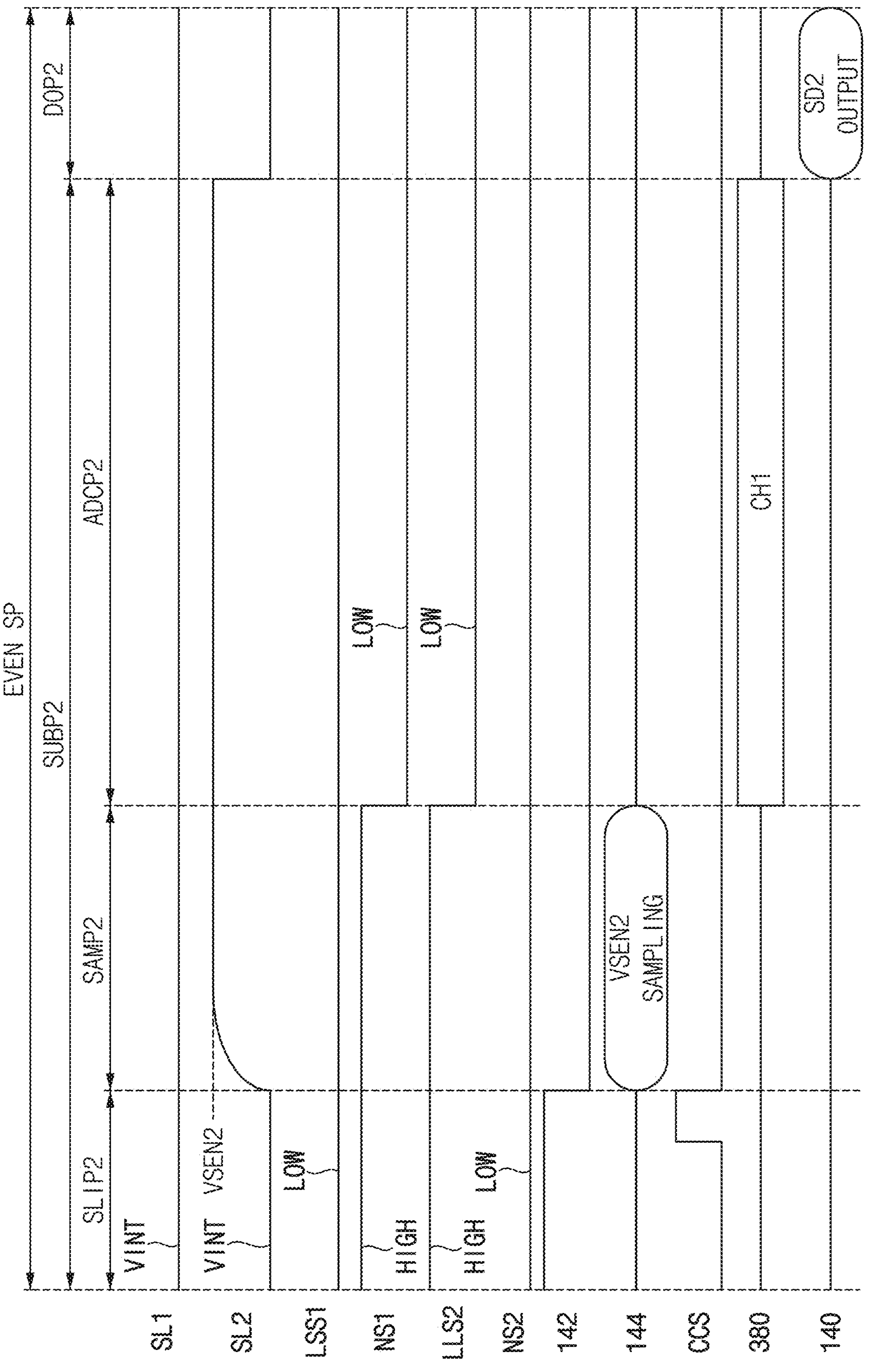
Figure 6:
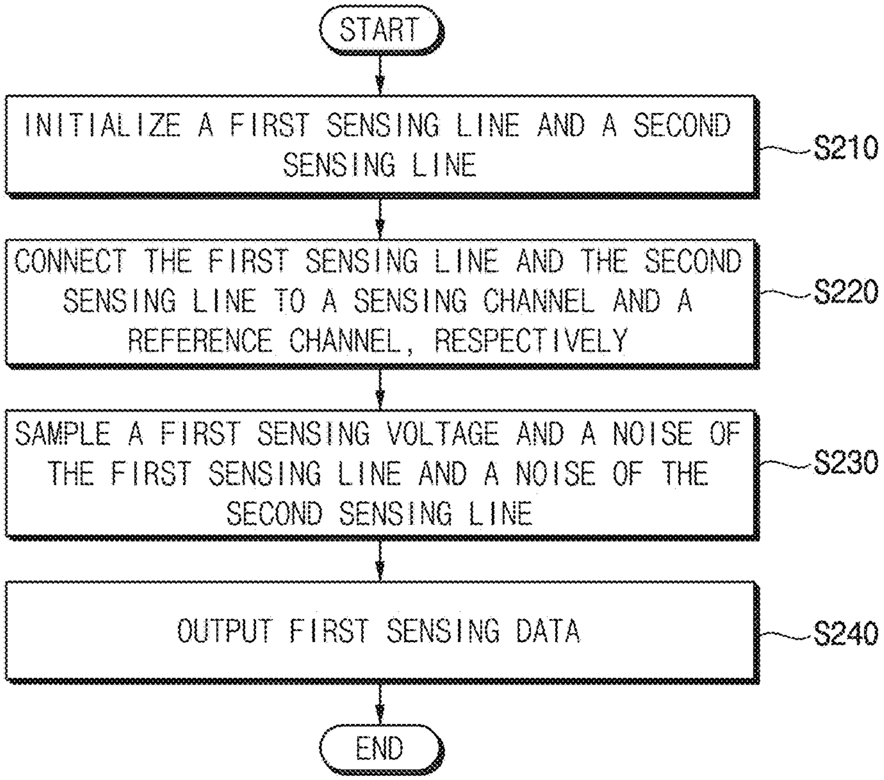
FIGS. 6 and 7 are flow charts illustrating a method of driving the sensing circuit in FIG. 3.
Figure 7:
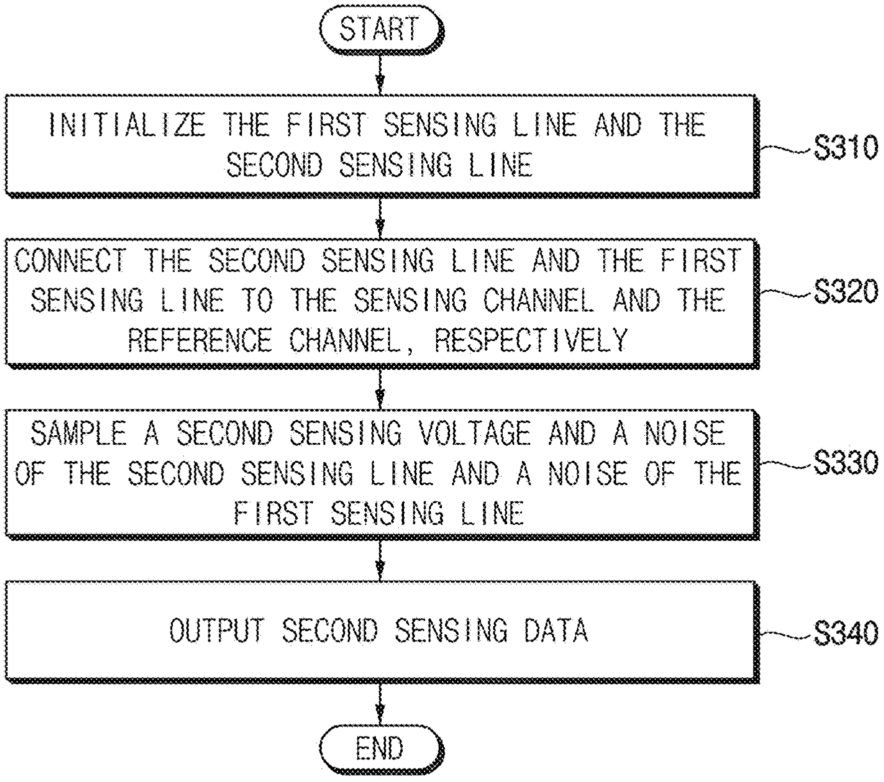

FIGS. 4 and 5 are timing diagrams for describing an operation of the sensing circuit in FIG. 3. FIGS. 6 and 7 are flow charts illustrating a method of driving the sensing circuit in FIG. 3.

Referring to FIGS. 4 and 6, a method of driving the sensing circuit 140 according to an embodiment may include initializing the first sensing line SL1 and the second sensing line SL2 (S210), connecting the first sensing line SL1 and the second sensing line SL2 to the sensing channel 144 and the reference channel 143, respectively (S220), sampling the first sensing voltage VSEN1 and the noise of the first sensing line SL1 and the noise of the second sensing line SL2 (S230), and outputting the first sensing data SD1 (S240).

The first sensing period ODD SP may include the first sub-sensing period SUBP1, in which a sensing operation on the first sensing line SL1 and a sensing operation on the second sensing line SL2 are performed, and a first data output period DOP1, in which the first sensing data SD1 is output. Further, the first sub-sensing period SUBP1 may include the first sensing line initialization period SLIP1, the first sampling period SAMP1, and the first analog-to-digital conversion period ADCP1.

In the first sensing line initialization period SLIP1 of the first sub-sensing period SUBP1, the sensing line initialization circuit 142 may substantially simultaneously initialize the first sensing line SL1 and the second sensing line SL2. In an embodiment, for example, the sensing line initialization circuit 142 may provide the initialization voltage VINT to the first sensing line SL1 and the second sensing line SL2 in the first sensing line initialization period SLIP1, and the first sensing line SL1 and the second sensing line SL2 may be initialized based on the initialization voltage VINT.

In the first sensing line initialization period SLIP1 of the first sub-sensing period SUBP1, the channel connection switch CCSW1 may connect the reference channel 143 and the sensing channel 144 to each other. In an embodiment, for example, in a portion of the first sensing line initialization period SLIP1, the connection signal CCS may have an activation level, and the channel connection switch CCSW1 may connect the reference channel 143 and the sensing channel 144 to each other in response to the connection signal CCS having the activation level.

In the first sub-sensing period SUBP1, the first line selection switch LSSW1 may connect the first sensing line SL1 to the sensing channel 144. In an embodiment, for example, in the first sensing line initialization period SLIP1 and the first sampling period SAMP1 of the first sub-sensing period SUBP1, the first line selection signal LSS1 may have an activation level, and the first line selection switch LSSW1 may connect the first sensing line SL1 to the sensing channel 144 in response to the first line selection signal LSS1 having the activation level.

In the first sampling period SAMP1 of the first sub-sensing period SUBP1, a voltage of the first sensing line SL1 may be saturated with the first sensing voltage VSEN1 for the first pixel PX1 connected to the first sensing line SL1, and the sensing channel 144 may sample the first sensing voltage VSEN1 and the noise of the first sensing line SL1. In an embodiment, for example, the sensing channel 144 may include a sampling capacitor, and may store the first sensing voltage VSEN1 and the noise of the first sensing line SL1 in the sampling capacitor. During the first sampling period SAMP1 of the first sub-sensing period SUBP1, each of the first switching transistor TSW1 and the second switching transistor TSW2 included in the first pixel PX1 connected to the first sensing line SL1 may be turned-on.

In the first sub-sensing period SUBP1, the second noise selection switch NSW2 may connect the second sensing line SL2 to the reference channel 143. In an embodiment, for example, in the first sensing line initialization period SLIP1 and the first sampling period SAMP1 of the first sub-sensing period SUBP1, the second noise selection signal NS2 may have an activation level, and the second noise selection switch NSW2 may connect the second sensing line SL2 to the reference channel 143 in response to the second noise selection signal NS2 having the activation level.

In the first sampling period SAMP1 of the first sub-sensing period SUBP1, the reference channel 143 may sample the noise of the second sensing line SL2. In an embodiment, for example, the reference channel 143 may include a reference capacitor, and may store the noise of the second sensing line SL2 in the reference capacitor. During the first sampling period SAMP1 of the first sub-sensing period SUBP1, the first switching transistor TSW1 included in the second pixel PX2 connected to the second sensing line SL2 may be turned-off, and the second switching transistor TSW2 included in the second pixel PX2 may be turned-on.

The first sensing voltage VSEN1 and the noise sampled by the sensing channel 144, that is, the first sensing voltage VSEN1 and the noise stored in the sampling capacitor, may be provided to the first terminal of the ADC 146, and the noise sampled by the reference channel 143, that is, the noise stored in the reference capacitor, may be provided to the second terminal of the ADC 146. The ADC 146 may offset the noise provided to the first terminal and the noise provided to the second terminal. In the first analog-to-digital conversion period ADCP1, the ADC 146 may convert the first sensing voltage VSEN1 to the first sensing data SD1.

In the first data output period DOP1, the sensing circuit 140 may output the first sensing data SD1 to the controller. The controller may compensate the input image data based on the first sensing data SD1.

Referring to FIGS. 5 and 7, a method of driving the sensing circuit 140 according to an embodiment may include initializing the first sensing line SL1 and the second sensing line SL2 (S310), connecting the second sensing line SL2 and the first sensing line SL1 to the sensing channel 144 and the reference channel 143, respectively (S320), sampling the second sensing voltage VSEN2 and the noise of the second sensing line SL2 and the noise of the first sensing line SL1 (S330), and outputting the second sensing data SD2 (S340).

The second sensing period EVEN SP may include the second sub-sensing period SUBP2, in which a sensing operation on the second sensing line SL2 is performed, and a second data output period DOP2, in which the second sensing data SD2 is output. Further, the second sub-sensing period SUBP2 may include the second sensing line initialization period SLIP2, the second sampling period SAMP2, and the second analog-to-digital conversion period ADCP2.

In the second sensing line initialization period SLIP2 of the second sub-sensing period SUBP2, the sensing line initialization circuit 142 may substantially simultaneously initialize the first sensing line SL1 and the second sensing line SL2. In an embodiment, for example, the sensing line initialization circuit 142 may provide the initialization voltage VINT to the first sensing line SL1 and the second sensing line SL2 in the second sensing line initialization period SLIP2, and the first sensing line SL1 and the second sensing line SL2 may be initialized based on the initialization voltage VINT.

In the second sensing line initialization period SLIP2 of the second sub-sensing period SUBP2, the channel connection switch CCSW1 may connect the reference channel 143 and the sensing channel 144 to each other. In an embodiment, for example, in a portion of the second sensing line initialization period SLIP2, the connection signal CCS may have an activation level, and the channel connection switch CCSW1 may connect the reference channel 143 and the sensing channel 144 to each other in response to the connection signal CCS having the activation level.

In the second sub-sensing period SUBP2, the second line selection switch LSSW2 may connect the second sensing line SL2 to the sensing channel 144. In an embodiment, for example, in the second sensing line initialization period SLIP2 and the second sampling period SAMP2 of the second sub-sensing period SUBP2, the second line selection signal LSS2 may have an activation level, and the second line selection switch LSSW2 may connect the second sensing line SL2 to the sensing channel 144 in response to the second line selection signal LSS2 having the activation level.

In the second sampling period SAMP2 of the second sub-sensing period SUBP2, a voltage of the second sensing line SL2 may be saturated with the second sensing voltage VSEN2 for the second pixel PX2 connected to the second sensing line SL2, and the sensing channel 144 may sample the second sensing voltage VSEN2 and the noise of the second sensing line SL2. In an embodiment, for example, the sensing channel 144 may include the sampling capacitor, and may store the second sensing voltage VSEN2 and the noise of the second sensing line SL2 in the sampling capacitor. During the second sampling period SAMP2 of the second sub-sensing period SUBP2, each of the first switching transistor TSW1 and the second switching transistor TSW2 included in the second pixel PX2 connected to the second sensing line SL2 may be turned-on.

In the second sub-sensing period SUBP2, the first noise selection switch NSW1 may connect the first sensing line SL1 to the reference channel 143. In an embodiment, for example, in the second sensing line initialization period SLIP2 and the second sampling period SAMP2 of the second sub-sensing period SUBP2, the first noise selection signal NS1 may have an activation level, and the first noise selection switch NSW1 may connect the first sensing line SL1 to the reference channel 143 in response to the first noise selection signal NS1 having the activation level.

In the second sampling period SAMP2 of the second sub-sensing period SUBP2, the reference channel 143 may sample the noise of the first sensing line SL1. In an embodiment, for example, the reference channel 143 may include the reference capacitor, and may store the noise of the first sensing line SL1 in the reference capacitor. During the second sampling period SAMP2 of the second sub-sensing period SUBP2, the first switching transistor TSW1 included in the first pixel PX1 connected to the first sensing line SL1 may be turned-off, and the second switching transistor TSW2 included in the first pixel PX1 may be turned-on.

The second sensing voltage VSEN2 and the noise sampled by the sensing channel 144, that is, the second sensing voltage VSEN2 and the noise stored in the sampling capacitor, may be provided to the first terminal of the ADC 146, and the noise sampled by the reference channel 143, that is, the noise stored in the reference capacitor, may be provided to the second terminal of the ADC 146. The ADC 146 may offset the noise provided to the first terminal and the noise provided to the second terminal. In the second analog-to-digital conversion period ADCP2, the ADC 146 may convert the second sensing voltage VSEN2 to the second sensing data SD2.

In the second data output period DOP2, the sensing circuit 140 may output the second sensing data SD2 to the controller. The controller may compensate the input image data based on the second sensing data SD2.

In the method of driving the sensing circuit 140 according to an embodiment, in the first sensing period ODD SP, the sensing channel 144 may sense the first sensing voltage VSEN1 and the noise of the first sensing line SL1, the reference channel 143 may sense the noise of the second sensing line SL2 adjacent to the first sensing line SL1, and the noises may be offset through the ADC 146. Accordingly, the sensing circuit 140 may output the first sensing data SD1 that does not include noise, so that the display device 100 may accurately compensate the input image data based on the first sensing data SD1.

In such an embodiment, in the second sensing period EVEN SP, the sensing channel 144 may sense the second sensing voltage VSEN2 and the noise of the second sensing line SL2, the reference channel 143 may sense the noise of the first sensing line SL1 adjacent to the second sensing line SL2, and the noises may be offset through the ADC 146. Accordingly, the sensing circuit 140 may output the second sensing data SD2 that does not include noise, so that the display device 100 may accurately compensate the input image data based on the second sensing data SD2.

Figure 8:
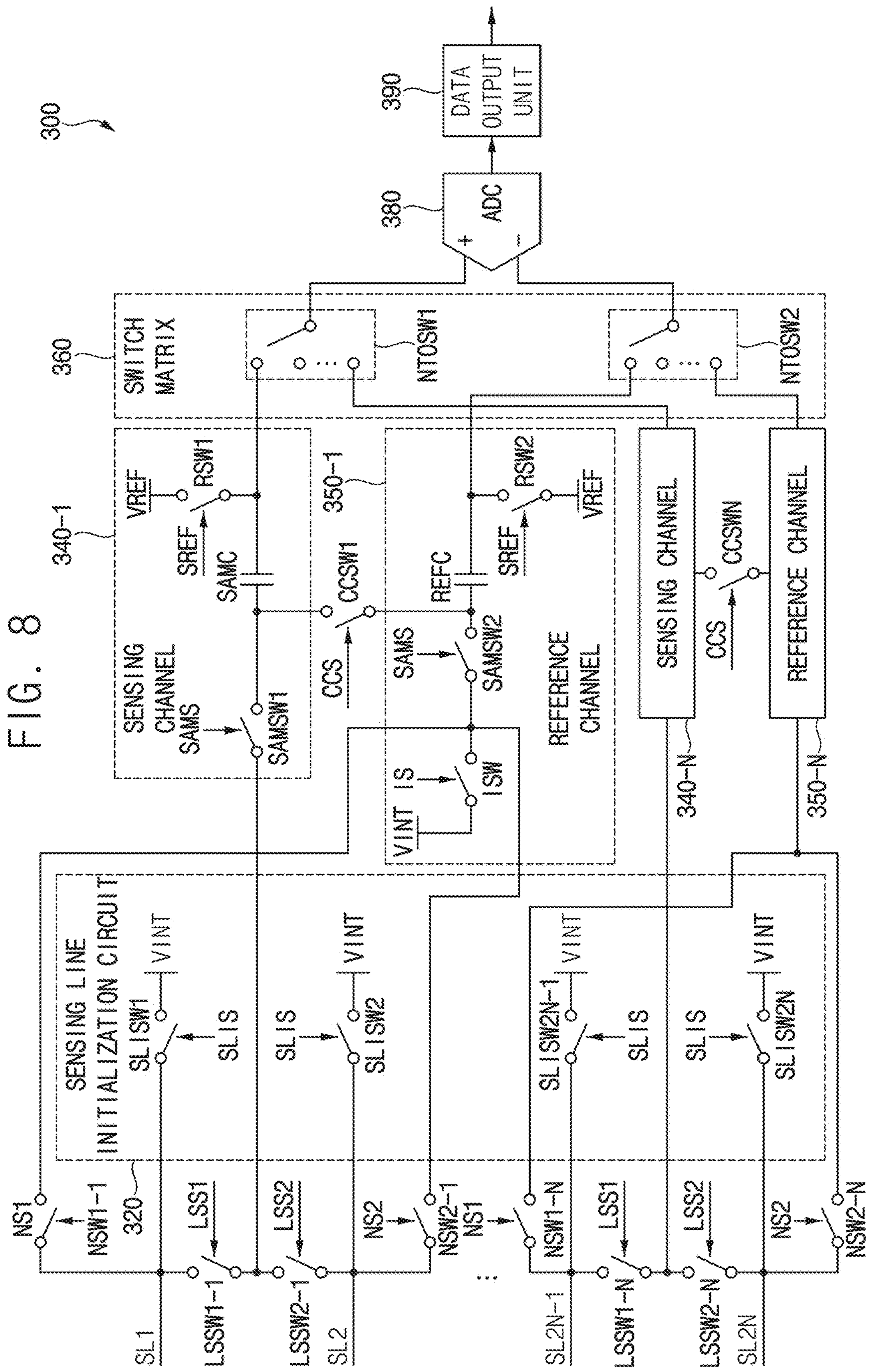
FIG. 8 is a diagram illustrating a sensing circuit according to an alternative embodiment.

FIG. 8 is a diagram illustrating a sensing circuit according to an alternative embodiment.

Referring to FIG. 8, an embodiment of a display device including a sensing circuit 300 may include 2N sensing lines SL1, SL2, . . . , SL2N−1, SL2N (N is an integer greater than or equal to 1), and the sensing circuit 300 may include N first line selection switches LSSW1-1, . . . , LSSW1-N, N second line selection switches LSSW2-1, . . . , LSSW2-N, N first noise selection switches NSW1-1, . . . , NSW1-N, N second noise selection switches NSW2-1, . . . , NSW2-N, a sensing line initialization circuit 320, N sensing channels 340-1, . . . , 340-N, N reference channels 350-1, . . . , 350-N, N channel connection switches CCSW1, . . . , CCSWN, a switch matrix 360, an ADC 380, and a data output unit 390.

The N first line selection switches LSSW1-1, . . . , LSSW1-N may connect odd-numbered sensing lines SL1, . . . , SL2N−1 to the N sensing channels 340-1, . . . , 340-N, respectively, in the first sub-sensing period of the first sensing period. In an embodiment, for example, the first line selection signal LSS1 may have an activation level in at least a portion of the first sub-sensing period, and the N first line selection switches LSSW1-1, LSSW1-N may connect the odd-numbered sensing lines SL1, . . . , SL2N−1 to the N sensing channels 340-1, . . . , 340-N, respectively, in response to the first line selection signal LSS1 having the activation level.

The N second line selection switches LSSW2-1, . . . , LSSW2-N may connect even-numbered sensing lines SL2, . . . , SL2N to the N sensing channels 340-1, . . . , 340-N, respectively, in the second sub-sensing period of the second sensing period. In an embodiment, for example, the second line selection signal LSS2 may have an activation level in at least a portion of the second sub-sensing period, and the N second line selection switches LSSW2-1, . . . , LSSW2-N may connect the even-numbered sensing lines SL2, . . . , SL2N to the N sensing channels 340-1, . . . , 340-N, respectively, in response to the second line selection signal LSS2 having the activation level.

The N second noise selection switches NSW2-1, . . . , NSW2-N may connect the even-numbered sensing lines SL2, . . . , SL2N to the N reference channels 350-1, . . . , 350-N, respectively, in the first sub-sensing period of the first sensing period. In an embodiment, for example, the second noise selection signal NS2 may have an activation level in at least a portion of the first sub-sensing period, and the N second noise selection switches NSW2-1, . . . , NSW2-N may connect the even-numbered sensing lines SL2, . . . , SL2N to the N reference channels 350-1, . . . , 350-N, respectively, in response to the second noise selection signal NS2 having the activation level.

The N first noise selection switches NSW1-1, . . . , NSW1-N may connect the odd-numbered sensing lines SL1, . . . , SL2N−1 to the N reference channels 350-1, . . . , 350-N, respectively, in the second sub-sensing period of the second sensing period. In an embodiment, for example, the first noise selection signal NS1 may have an activation level in at least a portion of the second sub-sensing period, and the N first noise selection switches NSW1-1, . . . , NSW1-N may connect the odd-numbered sensing lines SL1, . . . , SL2N−1 to the N reference channels 350-1, . . . , 350-N, respectively, in response to the first noise selection signal NS1 having the activation level.

The sensing line initialization circuit 320 may initialize the 2N sensing lines SL1 to SL2N. In an embodiment, the sensing line initialization circuit 320 may include 2N sensing line initialization switches SLISW1, SLISW2, . . . , SLISW2N−1, SLISW2N for initializing the 2N sensing lines SL1 to SL2N. In an embodiment, for example, the first sensing line initialization switch SLISW1 may apply the initialization voltage VINT to the first sensing line SL1 in response to the sensing line initialization signal SLIS, the second sensing line initialization switch SLISW2 may apply the initialization voltage VINT to the second sensing line SL2 in response to the sensing line initialization signal SLIS, the $(2N-1)^{th}$ sensing line initialization switch SLISW2N−1 may apply the initialization voltage VINT to the $(2N-1)^{th}$ sensing line SL2N−1 in response to the sensing line initialization signal SLIS, and the $2N^{th}$ sensing line initialization switch SLISW2N may apply the initialization voltage VINT to the $2N^{th}$ sensing line SL2N in response to the sensing line initialization signal SLIS. The 2N sensing lines SL1 to SL2N may be initialized based on the initialization voltage VINT.

The N sensing channels 340-1, . . . , 340-N may respectively sample N first sensing voltages and noises of the N odd-numbered sensing lines SL1, . . . , SL2N−1 in the first sampling period of the first sub-sensing period, and may respectively sample N second sensing voltages and noises of the N even-numbered sensing lines SL2, . . . , SL2N in the second sampling period of the second sub-sensing period. In an embodiment, as shown in FIG. 8, each of the N sensing channels 340-1, . . . , 340-N may include a sampling capacitor SAMC, a first sampling switch SAMSW1, and a first reference switch RSW1. In an embodiment, for example, the sampling capacitor SAMC may include a first electrode and a second electrode. The first sampling switch SAMSW1 may connect corresponding first and second line selection switches LSSW1-1 and LSSW2-1 to the first electrode of the sampling capacitor SAMC in response to a sampling signal SAMS. The first reference switch RSW1 may apply the reference voltage VREF to the second electrode of the sampling capacitor SAMC in response to a reference signal SREF. In an embodiment, the reference voltage VREF may have a voltage level (e.g., about 2 V) equal to the initialization voltage VINT, but is not limited thereto. In an alternative embodiment, the reference voltage VREF may have a voltage level different from the initialization voltage VINT.

The N reference channels 350-1, . . . , 350-N may store N noises sampled by the N reference channels 350-1, . . . , 350-N with respect to the N first sensing voltages and the noises sampled by the N sensing channels 340-1, . . . , 340-N or the N second sensing voltages and the noises sampled by the N sensing channels 340-1, . . . , 340-N, such that the ADC 380 performs analog-to-digital conversion operations on voltage differences between voltages output from the N sensing channels 340-1, . . . , 340-N and voltages output from the reference channels 350-1, . . . , 350-N. In an embodiment, as shown in FIG. 8, each of the N reference channels 350-1, . . . , 350-N may include an initialization switch ISW, a reference capacitor REFC, a second sampling switch SAMSW2, and a second reference switch RSW2. In an embodiment, for example, the reference capacitor REFC may include a first electrode and a second electrode. The second sampling switch SAMSW2 may connect corresponding first and second noise selection switches NSW1-1 and NSW2-1 to the first electrode of the reference capacitor REFC in response to the sampling signal SAMS. Further, the second sampling switch SAMSW2 may connect a corresponding initialization switch ISW to the first electrode of the reference capacitor REFC in response to the sampling signal SAMS. The initialization switch ISW may apply the initialization voltage VINT to the first electrode of the reference capacitor REFC in response to an initialization signal IS.

In an embodiment, for example, the initialization switch ISW and the second sampling switch SAMSW2 may be connected at a first node, the initialization switch ISW may provide the initialization voltage VINT to the first node in response to the initialization signal IS, and the second sampling switch SAMSW2 may provide the initialization voltage VINT provided to the first node to the first electrode of the reference capacitor REFC in response to the sampling signal SAMS. Further, the first node may be connected to the first and second noise selection switches NSW1-1 and NSW2-1.

The second reference switch RSW2 may apply the reference voltage VREF to the second electrode of the reference capacitor REFC in response to the reference signal SREF. Although FIG. 8 illustrates an embodiment in which the second sampling switch SAMSW2 applies the initialization voltage VINT to the first electrode of the reference capacitor REFC, however, the voltage applied to the reference capacitor REFC by the second sampling switch SAMSW2 is not limited to the initialization voltage VINT. In an alternative embodiment, for example, the second sampling switch SAMSW2 may apply a ground voltage to the first electrode of the reference capacitor REFC.

The N channel connection switches CCSW1, . . . , CCSWN may connect the first electrodes of the sampling capacitors SAMC of the N sensing channels 340-1, . . . , 340-N to the first electrodes of the reference capacitors REFC of the N reference channels 350-1, . . . , 350-N, respectively, in response to the channel connection signal CCS. In an embodiment, for example, the first channel connection switch CCSW1 may connect the first electrode of the sampling capacitor SAMC of the first sensing channel 340-1 to the first electrode of the reference capacitor REFC of the first reference channel 350-1 in response to the channel connection signal CCS, and the $N^{th}$ channel connection switch CCSWN may connect the first electrode of the sampling capacitor SAMC of the $N^{th}$ sensing channel 340-N to the first electrode of the reference capacitor REFC of the $N^{th}$ reference channel 350-N in response to the channel connection signal CCS.

The switch matrix 360 and the ADC 380 may sequentially convert the N first sensing voltages and the noises of the N odd-numbered sensing lines SL1, . . . , SL2N−1 sampled by the N sensing channels 340-1, . . . , 340-N and the N noises of the N even-numbered sensing lines SL2, . . . , SL2N sampled by the N reference channels 350-1, . . . , 350-N to N first sensing data, and may sequentially convert the N second sensing voltages and the noises of the N even-numbered sensing lines SL2, . . . , SL2N sampled by the N sensing channels 340-1, . . . , 340-N and the N noises of the N odd-numbered sensing lines SL1, . . . , SL2N−1 sampled by the N reference channels 350-1, . . . , 350-N to N second sensing data. In an embodiment, for example, in the first analog-to-digital conversion period of the first sub-sensing period, the switch matrix 360 may sequentially connect the N sensing channels 340-1, . . . , 340-N to the ADC 380, the switch matrix 360 may sequentially connect the N reference channels 350-1, . . . , 350-N to the ADC 380, and the ADC 380 may sequentially convert the N first sensing voltages of the N odd-numbered sensing lines SL1, . . . , SL2N−1 to the N first sensing data. In this process, the ADC 380 may offset each of the N noises of the N odd-numbered sensing lines SL1, . . . , SL2N−1 sampled by the N sensing channels 340-1, . . . , 340-N and each of the N noises of the N even-numbered sensing lines SL2, . . . , SL2N sampled by the N reference channels 350-1, . . . , 350-N.

In such an embodiment, in the second analog-to-digital conversion period of the second sub-sensing period, the switch matrix 360 may sequentially connect the N sensing channels 340-1, . . . , 340-N to the ADC 380, the switch matrix 360 may sequentially connect the N reference channels 350-1, . . . , 350-N to the ADC 380, and the ADC 380 may sequentially convert the N second sensing voltages and the noises of the N even-numbered sensing lines SL2, . . . , SL2N and the N noises of the N odd-numbered sensing lines SL1, . . . , SL2N−1 to the N second sensing data. In this process, the ADC 380 may offset each of the N noises of the N even-numbered sensing lines SL2, . . . , SL2N sampled by the N sensing channels 340-1, . . . , 340-N and each of the N noises of the N odd-numbered sensing lines SL1, . . . , SL2N−1 sampled by the N reference channels 350-1, . . . , 350-N.

In an embodiment, the switch matrix 360 may include a first multiplexer NTOSW1 that connects one of the N sensing channels 340-1, . . . , 340-N to a first input terminal (e.g., a positive input terminal) of the ADC 380 and a second multiplexer NTOSW2 that connects one of the N reference channels 350-1, . . . , 350-N to a second input terminal (e.g., a negative input terminal) of the ADC 380. In an embodiment, for example, the first multiplexer NTOSW1 may be a switch that connects one signal among N signals, and the second multiplexer NTOSW2 may be a switch that connects one signal among N signals.

Although FIG. 8 illustrates an embodiment in which analog-to-digital conversion operations are sequentially performed by a single ADC 380, but is not limited thereto. Alternatively, the sensing circuit 300 may a plurality of ADCs or further include two to N ADCs that substantially simultaneously perform the analog-to-digital conversion operations.

The data output unit 390 may sequentially store the N first sensing data in the first analog-to-digital conversion period, may sequentially store the N second sensing data in the second analog-to-digital conversion period, and may output the N first sensing data and the N second sensing data in a data output period of each of the first and second sensing periods. In an embodiment, the data output unit 390 may rearrange the N first sensing data and the N second sensing data such that each of the N second sensing data is disposed between two adjacent first sensing data among the N first sensing data. In an embodiment, for example, the data output unit 390 may rearrange the N first sensing data and the N second sensing data in a way such that 2N sensing data for the first to $2N^{th}$ sensing lines SL1 to SL2N are sequentially output.

Hereinafter, an operation of the sensing circuit 300 according to an embodiment will be described with reference to FIGS. 8 to 18.

Figure 9:
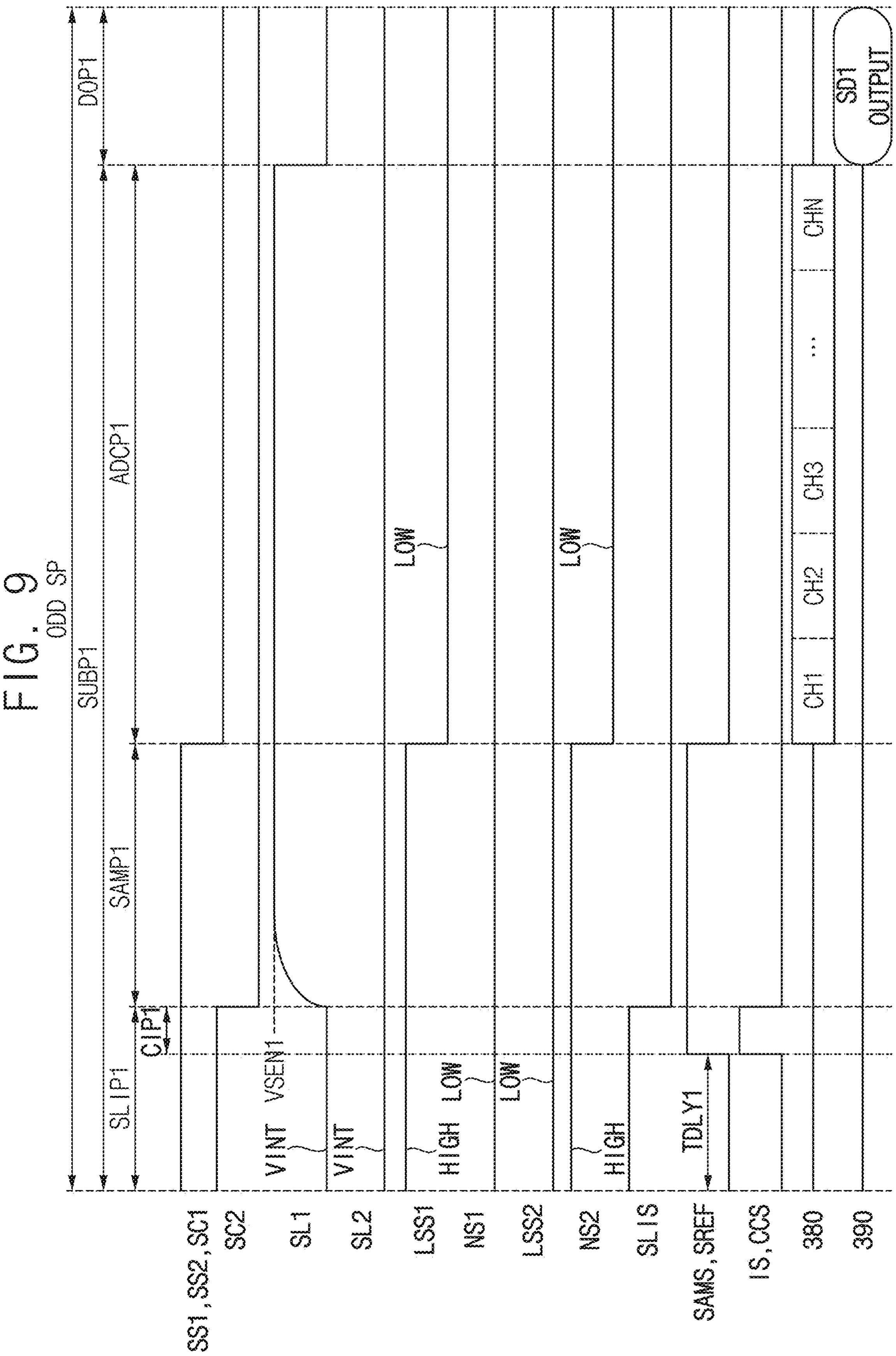
FIGS. 9 and 10 are timing diagrams for describing an operation of the sensing circuit in FIG. 8.
Figure 10:
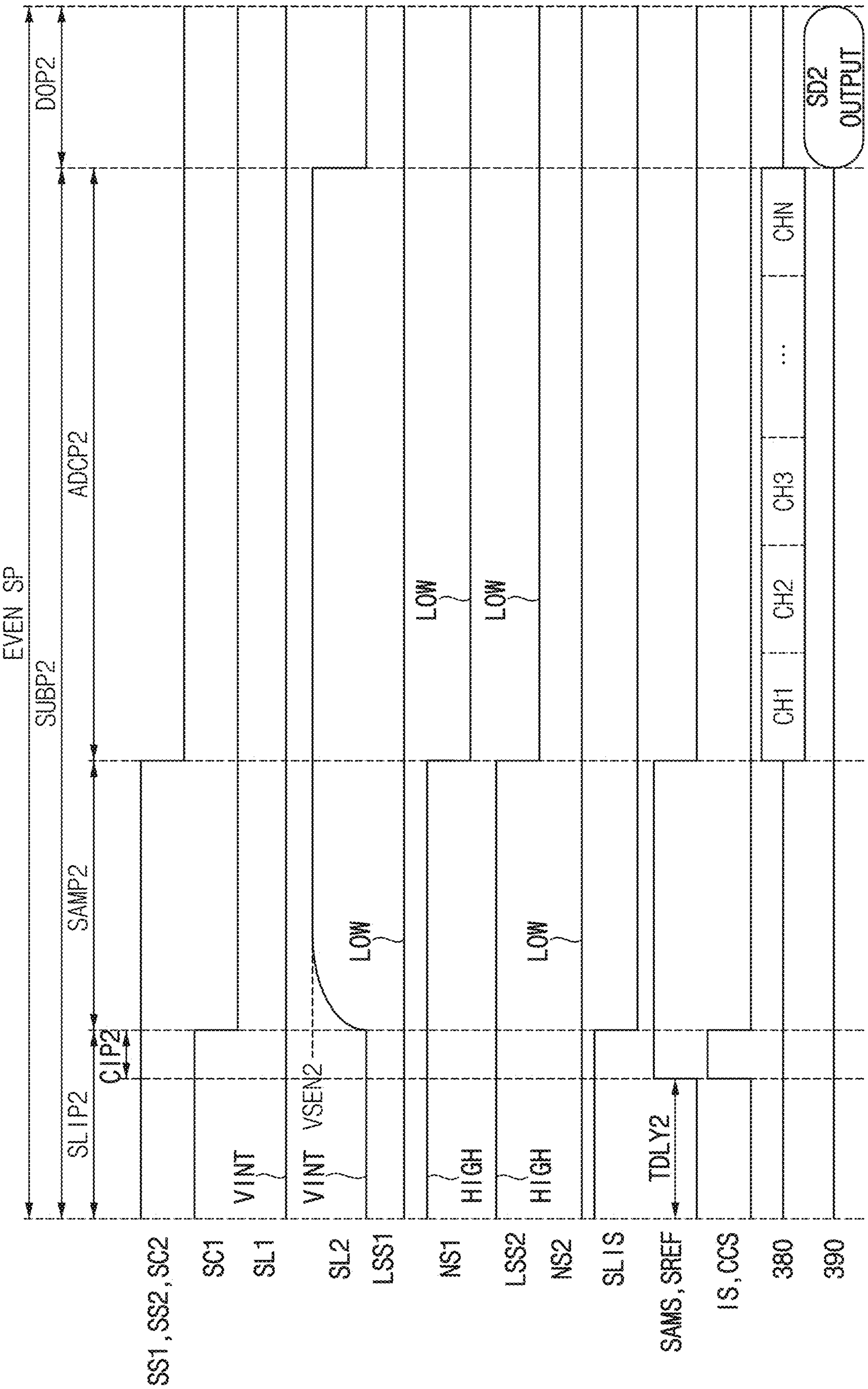
Figure 11:
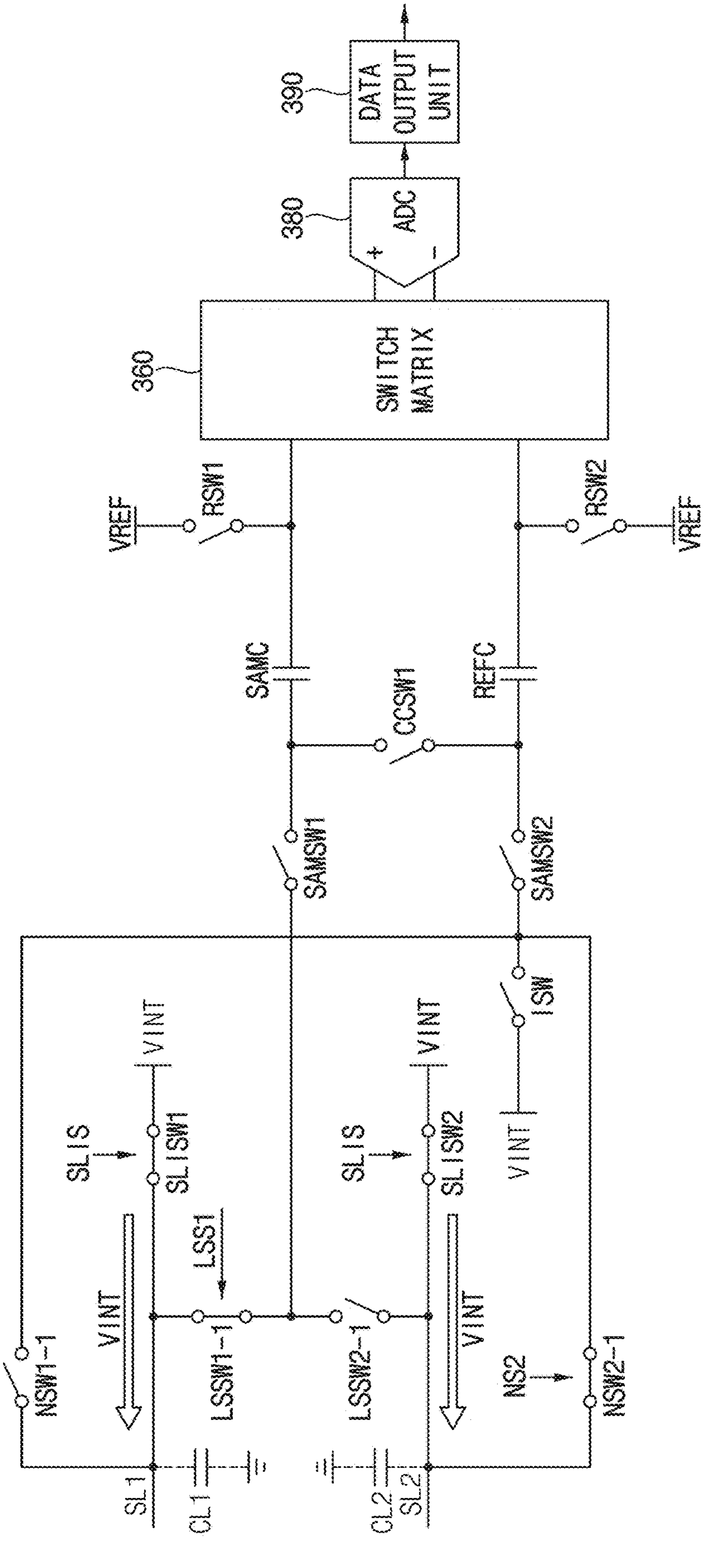
FIG. 11 is a diagram for describing an operation of the sensing circuit in a first sensing line initialization period in FIG. 9.
Figure 12:
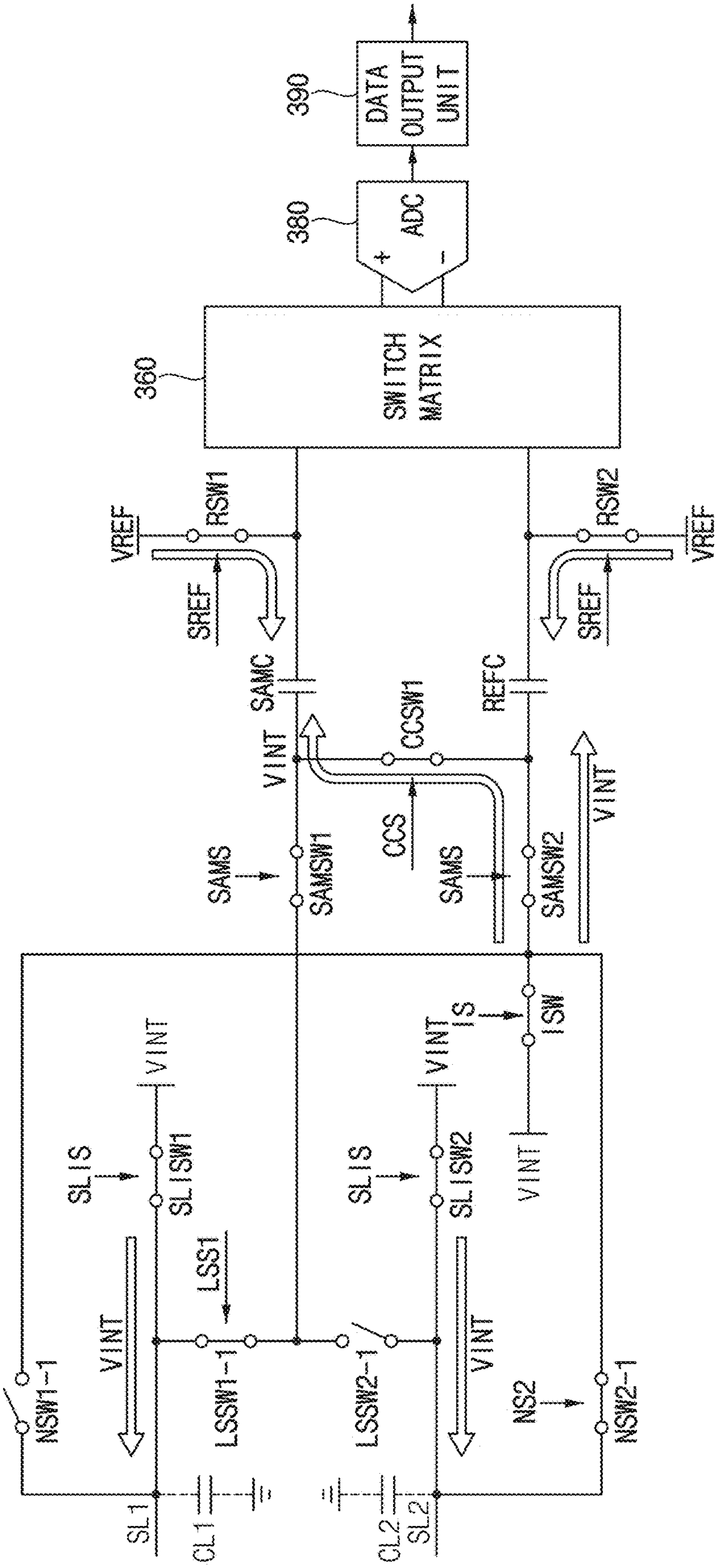
FIG. 12 is a diagram for describing an operation of the sensing circuit in a first capacitor initialization period in FIG. 9.
Figure 13:
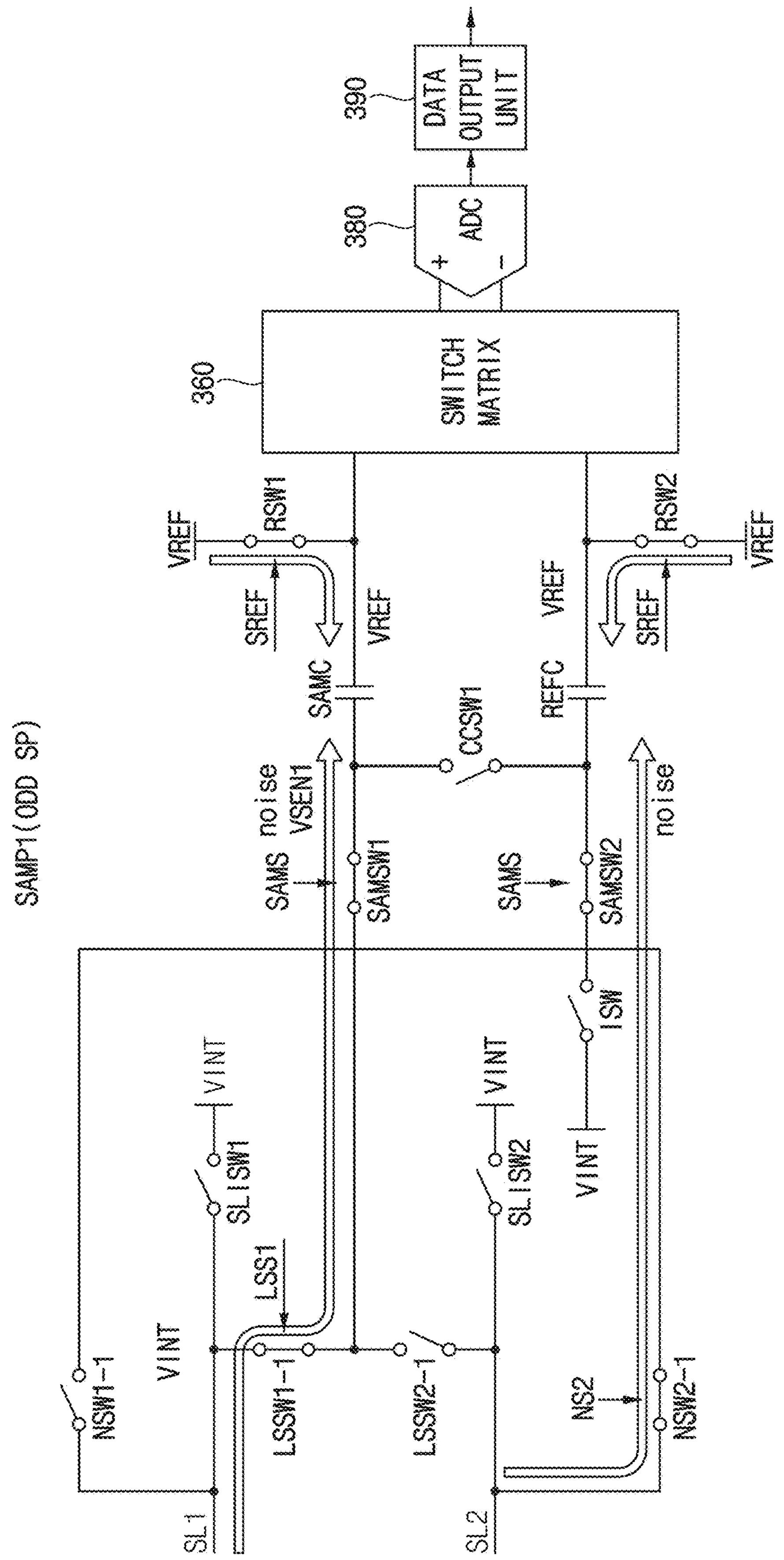
FIG. 13 is a diagram for describing an operation of the sensing circuit in a first sampling period in FIG. 9.
Figure 14:
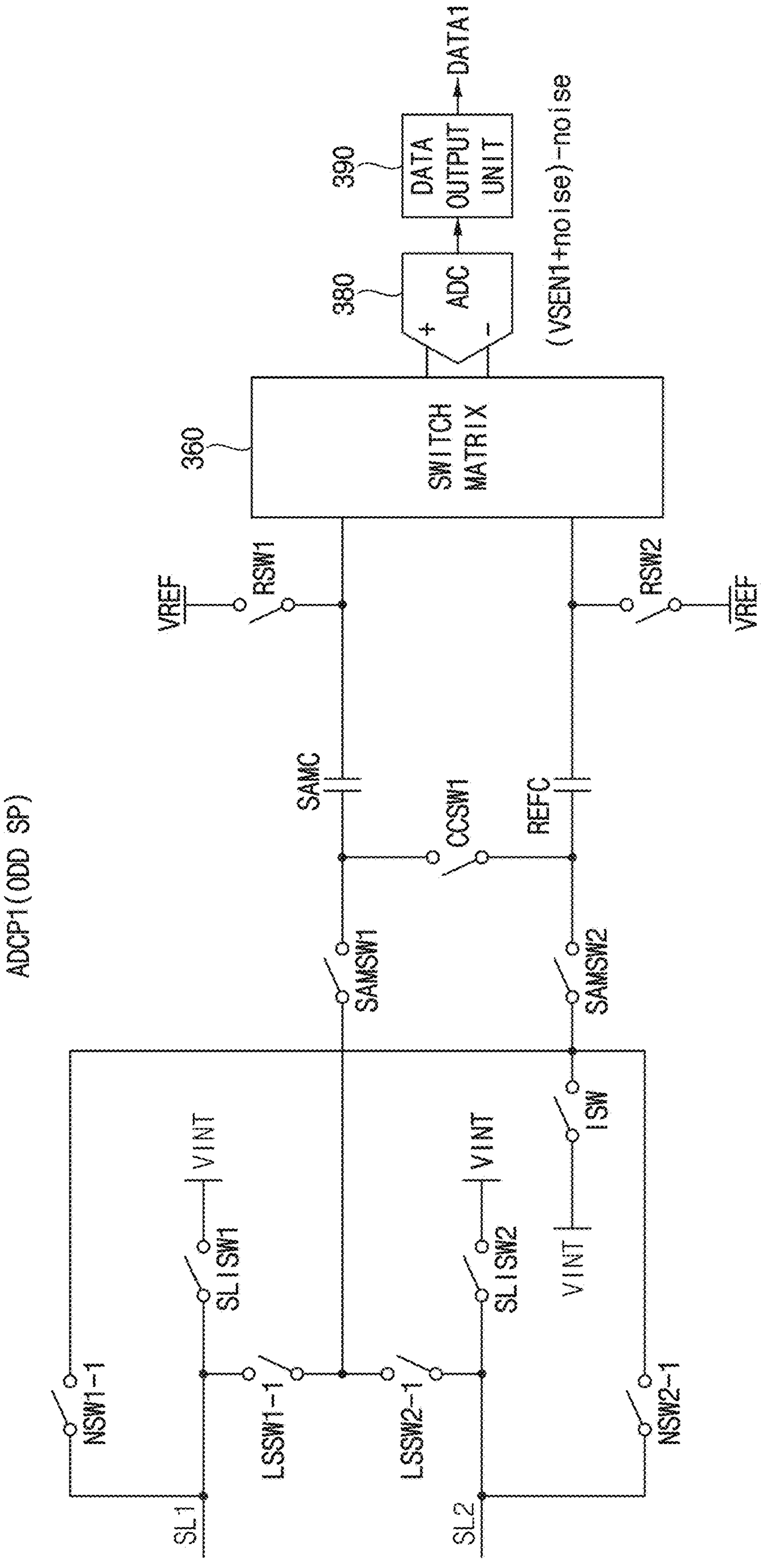
FIG. 14 is a diagram for describing an operation of the sensing circuit in a first analog-to-digital conversion period in FIG. 9.
Figure 15:
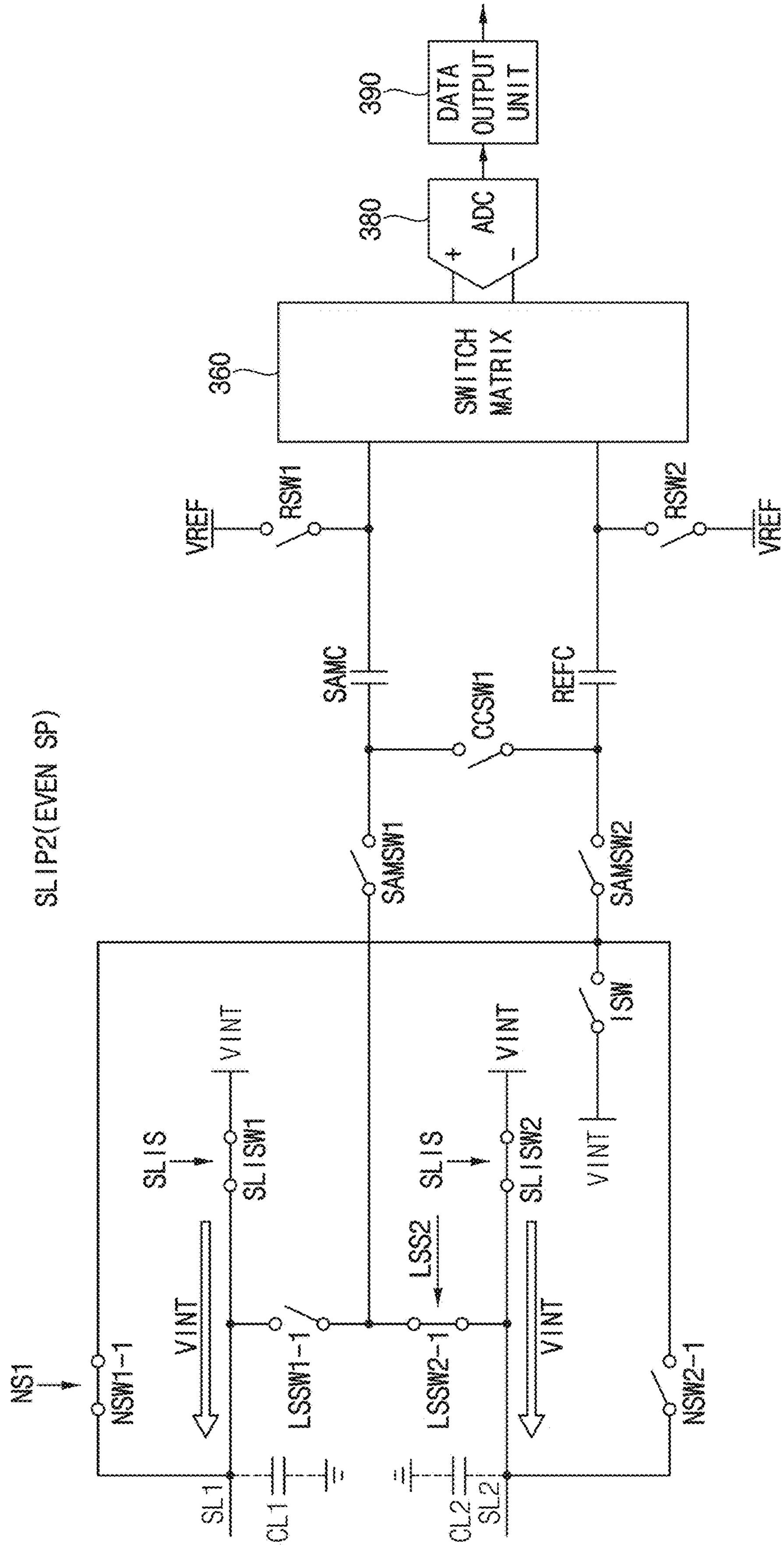
FIG. 15 is a diagram for describing an operation of the sensing circuit in a second sensing line initialization period in FIG. 10.
Figure 16:
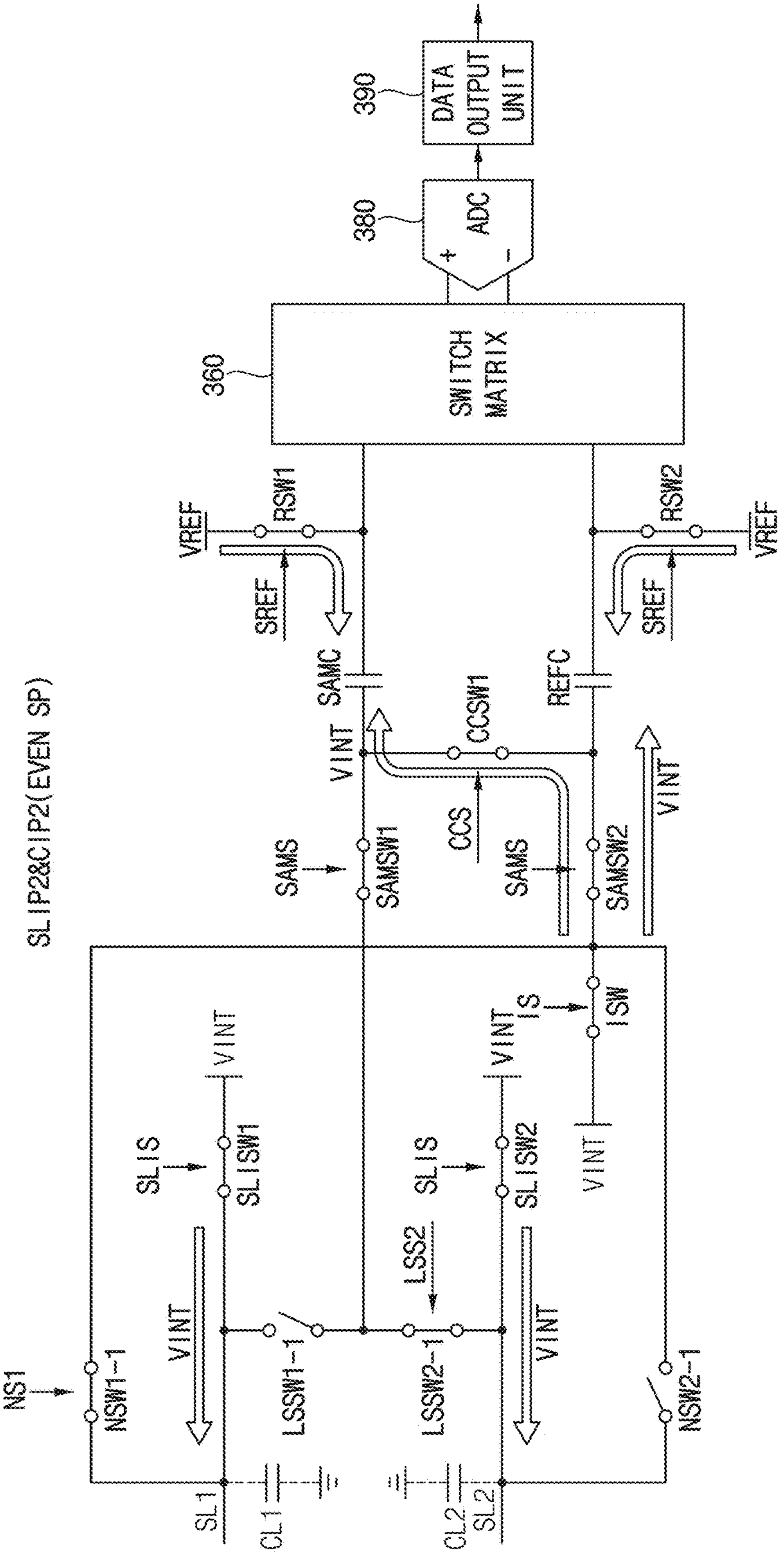
FIG. 16 is a diagram for describing an operation of the sensing circuit in a second capacitor initialization period in FIG. 10.
Figure 17:
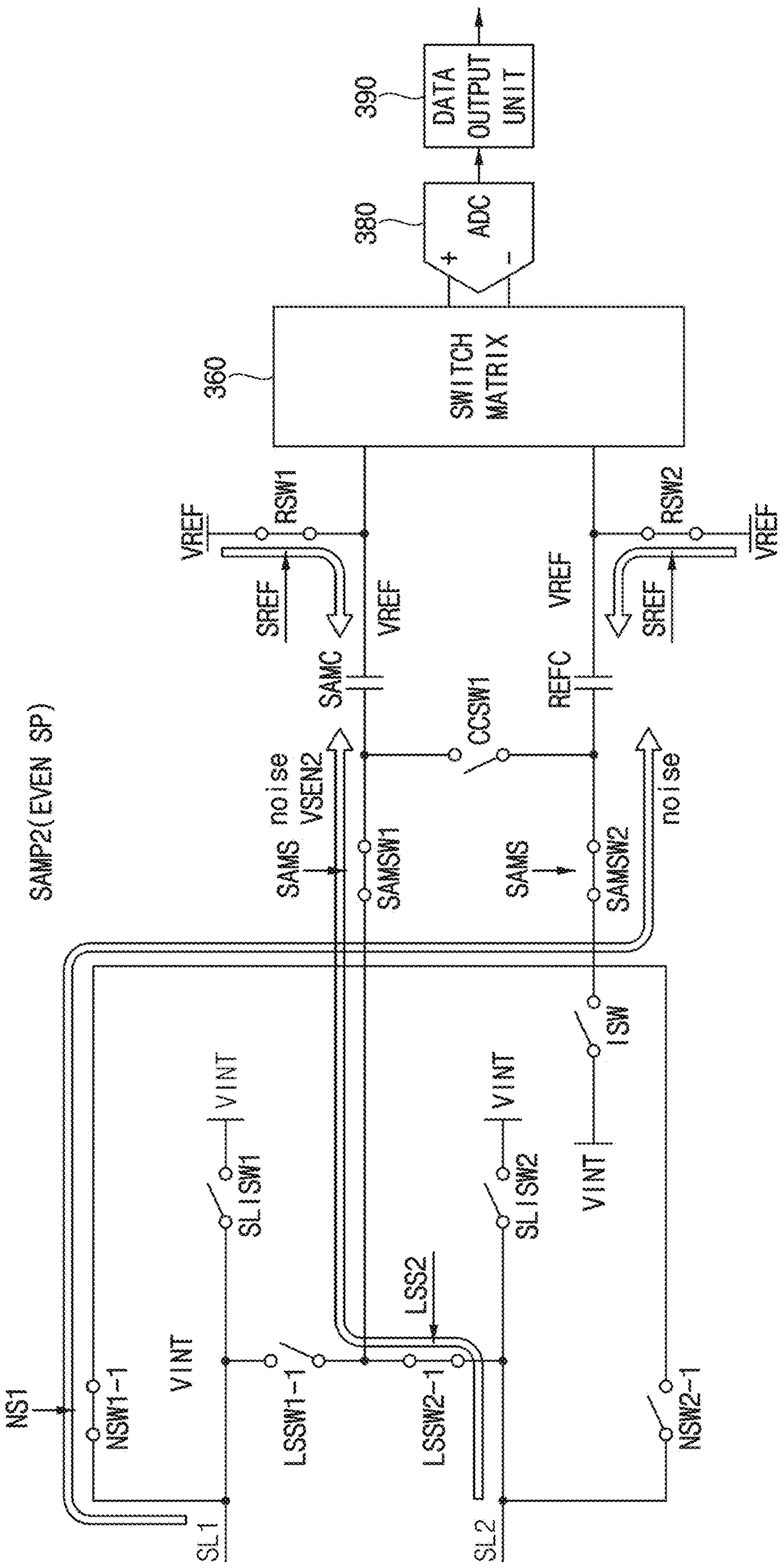
FIG. 17 is a diagram for describing an operation of the sensing circuit in a second sampling period in FIG. 10.
Figure 18:
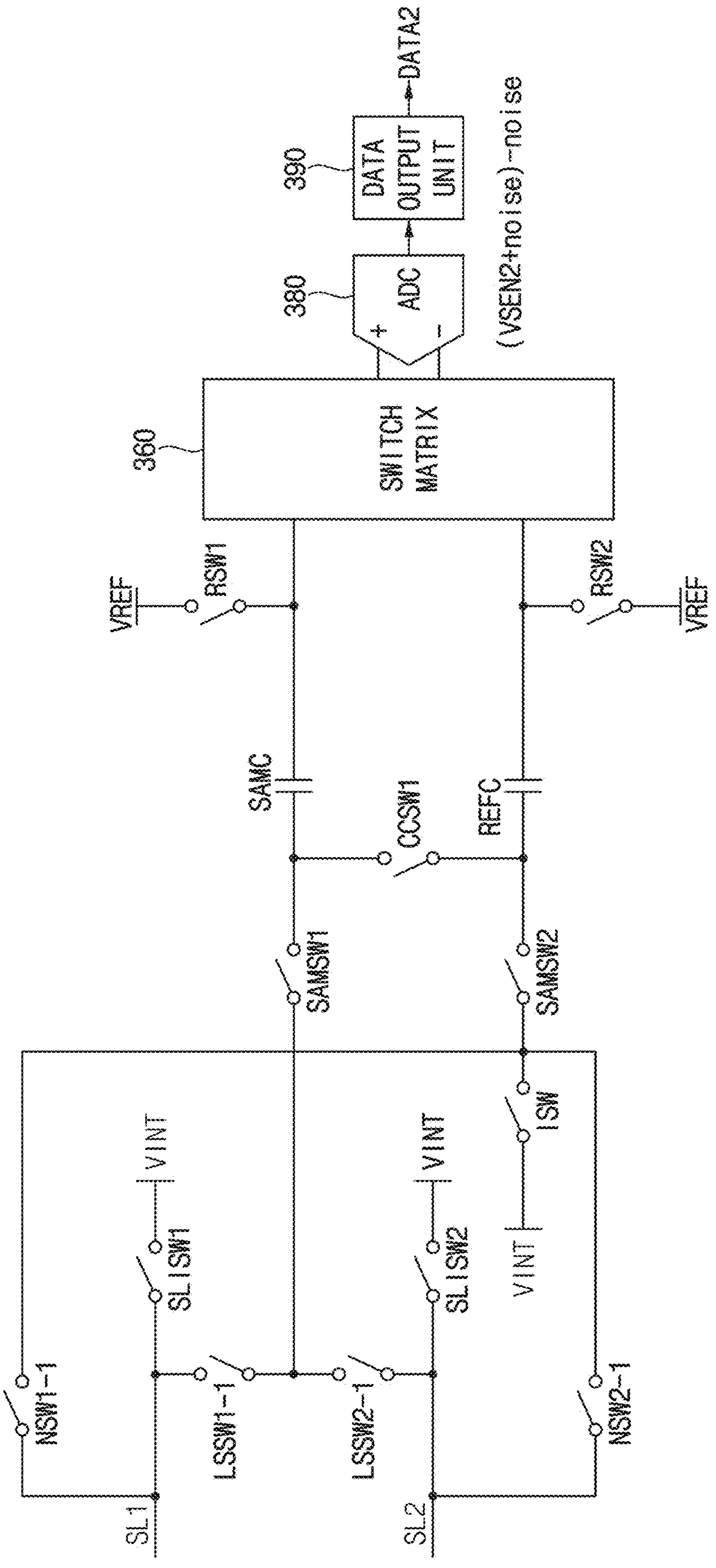
FIG. 18 is a diagram for describing an operation of the sensing circuit in a second analog-to-digital conversion period in FIG. 10.
Figure 19:
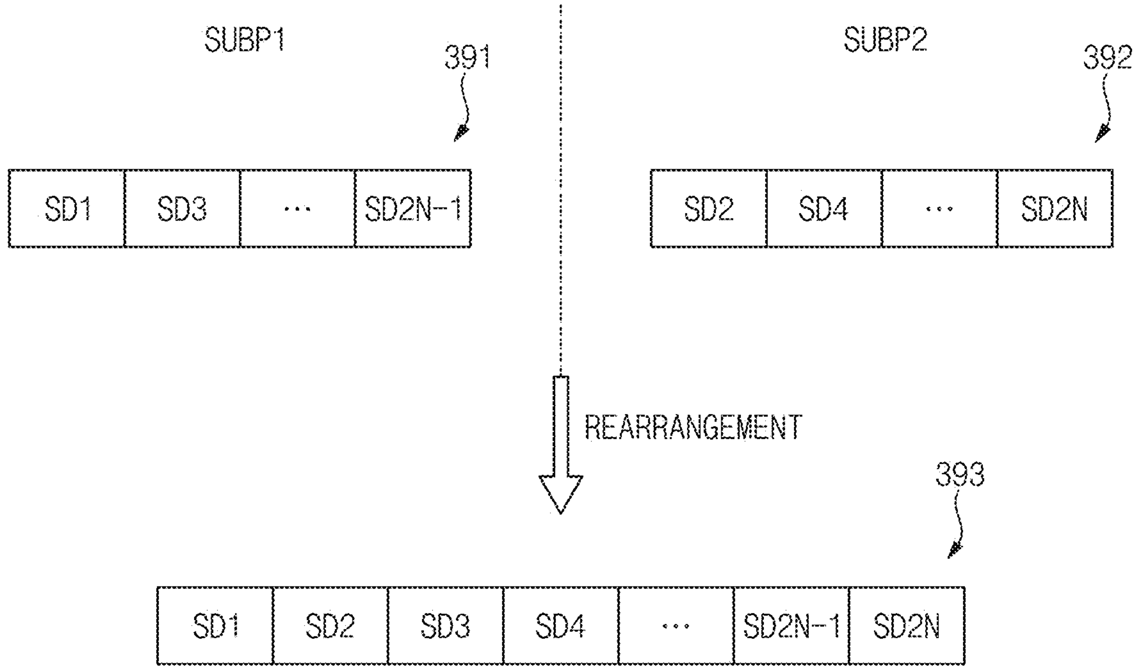
FIG. 19 is a diagram for describing an example in which first sensing data and second sensing data in FIGS. 9 and 10 are rearranged.

FIGS. 9 and 10 are timing diagrams for describing an operation of the sensing circuit in FIG. 8. FIG. 11 is a diagram for describing an operation of the sensing circuit in a first sensing line initialization period in FIG. 9. FIG. 12 is a diagram for describing an operation of the sensing circuit in a first capacitor initialization period in FIG. 9. FIG. 13 is a diagram for describing an operation of the sensing circuit in a first sampling period in FIG. 9. FIG. 14 is a diagram for describing an operation of the sensing circuit in a first analog-to-digital conversion period in FIG. 9. FIG. 15 is a diagram for describing an operation of the sensing circuit in a second sensing line initialization period in FIG. 10. FIG. 16 is a diagram for describing an operation of the sensing circuit in a second capacitor initialization period in FIG. 10. FIG. 17 is a diagram for describing an operation of the sensing circuit in a second sampling period in FIG. 10. FIG. 18 is a diagram for describing an operation of the sensing circuit in a second analog-to-digital conversion period in FIG. 10. FIG. 19 is a diagram for describing an example in which first sensing data and second sensing data in FIGS. 9 and 10 are rearranged.

Referring to FIGS. 8 and 9, the first sensing period ODD SP for pixels of a selected row of the display device may include a first sub-sensing period SUBP1, in which first sensing operations for the pixels connected to the N odd-numbered sensing lines SL1, . . . , SL2N−1 and second sensing operations for the pixels connected to the N even-numbered sensing lines SL2, . . . , SL2N are performed, and a first data output period DOP1, in which the first sensing data SD1 for all pixels of the selected row is output. Hereinafter, for convenience of description, first and second sensing operations for the first sensing line SL1 among the N odd-numbered sensing lines SL1, . . . , SL2N−1 and the second sensing line SL2 among the N even-numbered sensing lines SL2, . . . , SL2N will be described. Sensing operations for other sensing lines among the N odd-numbered sensing lines SL1, . . . , SL2N−1 may be substantially the same as the first sensing operation for the first sensing line SL1, and sensing operations for other sensing lines among the N even-numbered sensing lines SL2, . . . , SL2N may be substantially the same as the second sensing operation for the second sensing line SL2.

Referring to FIGS. 8, 9, and 11, the first sub-sensing period SUBP1 may include a first sensing line initialization period SLIP1, a first capacitor initialization period CIP1, a first sampling period SAMP1, and a first analog-to-digital conversion period ADCP1. In an embodiment, as illustrated in FIG. 9, the first capacitor initialization period CIP1 may overlap (or be defined in) the first sensing line initialization period SLIP1.

In the first sensing line initialization period SLIP1, the sensing line initialization circuit 320 may substantially simultaneously initialize the first sensing line SL1 and the second sensing line SL2. In an embodiment, for example, in the first sensing line initialization period SLIP1, the sensing line initialization signal SLIS may have an activation level, the first sensing line initialization switch SLISW1 may apply the initialization voltage VINT to the first sensing line SL1 in response to the sensing line initialization signal SLIS having the activation level, the second sensing line initialization switch SLISW2 may apply the initialization voltage VINT to the second sensing line SL2 in response to the sensing line initialization signal SLIS having the activation level, and the first sensing line SL1 and the second sensing line SL2 may be initialized based on the initialization voltage VINT.

Referring to FIGS. 8, 9, and 12, in the first capacitor initialization period CIP1, the sampling capacitor SAMC and the reference capacitor REFC may be initialized. In an embodiment, the first capacitor initialization period CIP1 may overlap a portion of the first sensing line initialization period SLIP1, for example, an end portion of the first sensing line initialization period SLIP1. In an embodiment, for example, in the first capacitor initialization period CIP1, each of the initialization signal IS, the sampling signal SAMS, the reference signal SREF, and the channel connection signal CCS may have an activation level.

The initialization switch ISW may be turned-on in response to the initialization signal IS having the activation level, the second sampling switch SAMSW2 may be turned-on in response to the sampling signal SAMS having the activation level, and the channel connection switch CCSW1 may be turned-on in response to the channel connection signal CCS having the activation level. Accordingly, the initialization voltage VINT may be applied to the first electrode of the reference capacitor REFC through the initialization switch ISW and the second sampling switch SAMSW2, and may be applied to the first electrode of the sampling capacitor SAMC through the initialization switch ISW, the second sampling switch SAMSW2, and the channel connection switch CCSW1. Further, the first reference switch RSW1 and the second reference switch RSW2 may be turned-on in response to the reference signal SREF having the activation level, and the reference voltage VREF may be applied to the second electrode of the sampling capacitor SAMC through the first reference switch RSW1, and may be applied to the second electrode of the reference capacitor REFC through the second reference switch RSW2. Accordingly, the sampling capacitor SAMC and the reference capacitor REFC may be initialized or discharged based on the initialization voltage VINT and the reference voltage VREF. In an embodiment, the reference voltage VREF may have a voltage level equal to the initialization voltage VINT, but is not limited thereto. In an embodiment, the sampling signal SAMS may have an activation level after a first delay time TDLY1 from the start of the first sub-sensing period SUBP1. Since the activation time of the sampling signal SAMS is delayed by the first delay time TDLY1, the first and second sensing operations may be more stably performed.

Further, in an embodiment, in the first capacitor initialization period CIP1, each of the sensing line initialization signal SLIS, the first line selection signal LSS1, and the second noise selection signal NS2 may also have an activation level, the initialization voltage VINT may be further applied to the first electrode of the sampling capacitor SAMC through the first sensing line initialization switch SLISW1, the first line selection switch LSSW1-1, and the first sampling switch SAMSW1, and the initialization voltage VINT may be further applied to the first electrode of the reference capacitor REFC through the first sensing line initialization switch SLISW1, the first line selection switch LSSW1-1, the first sampling switch SAMSW1, and the channel connection switch CCSW1. Similarly, the initialization voltage VINT may be further applied to the first electrode of the sampling capacitor SAMC through the second sensing line initialization switch SLISW2, the second noise selection switch NSW2-1, the second sampling switch SAMSW2, and the channel connection switch CCSW1, and the initialization voltage VINT may be further applied to the first electrode of the reference capacitor REFC through the second sensing line initialization switch SLISW2, the second noise selection switch NSW2-1, and the second sampling switch SAMSW2.

Referring to FIGS. 8, 9, and 13, in the first sampling period SAMP1, the voltage of the first sensing line SL1 may be saturated with the first sensing voltage VSEN1, the sensing channel 340-1 may sample the first sensing voltage VSEN1 and the noise of the first sensing line SL1, and the reference channel 350-1 may sample the noise of the second sensing line SL2. In an embodiment, for example, in the first sampling period SAMP1, each of the second noise selection signal NS2, the first line selection signal LSS1, the sampling signal SAMS, and the reference signal SREF may have an activation level, and each of the second line selection signal LSS2 and the channel connection signal CCS may have an inactivation level. During the first sampling period SAMP1, the first switching transistor TSW1 and the second switching transistor TSW2 included in the first pixel PX1 connected to the first sensing line SL1 may be turned-on in response to the scan signal SC1 and the sensing signal SS1, and the first switching transistor TSW1 included in the second pixel PX2 connected to the second sensing line SL2 may be turned-off.

The second noise selection switch NSW2 may be turned-on in response to the second noise selection signal NS2 having the activation level, the first line selection switch LSSW1-1 may be turned-on in response to the first line selection signal LSS1 having the activation level, and the first sampling switch SAMSW1 and the second sampling switch SAMSW2 may be turned-on in response to the sampling signal SAMS having the activation level. Accordingly, the first sensing voltage VSEN1 and the noise of the first sensing line SL1 may be applied to the first electrode of the sampling capacitor SAMC through the first line selection switch LSSW1-1 and the first sampling switch SAMSW1, and the noise of the second sensing line SL2 may be applied to the first electrode of the reference capacitor REFC through the second noise selection switch NSW2 and the second sampling switch SAMSW2. Further, the first reference switch RSW1 and the second reference switch RSW2 may be turned-on in response to the reference signal SREF having the activation level. Accordingly, the reference voltage VREF may be applied to the second electrode of the sampling capacitor SAMC through the first reference switch RSW1, and may be applied to the second electrode of the reference capacitor REFC through the second reference switch RSW2.

Referring to FIGS. 8, 9, and 14, in the first analog-to-digital conversion period ADCP1, the switch matrix 360 and the ADC 380 may sequentially convert the N first sensing voltages VSEN1 and the noises of the N odd-numbered sensing lines SL1, . . . , SL2N−1 sampled by the N sensing channels 340-1, . . . , 340-N and the N noises of the N even-numbered sensing lines SL2, SL2N sampled by the N reference channels 350-1, . . . , 350-N to the N first sensing data. In an embodiment, for example, the channel connection signal CCS may have an inactivation level. The switch matrix 360 may connect the second electrode of the sampling capacitor SAMC and the second electrode of the reference capacitor REFC to the first input terminal and the second input terminal of the ADC 380, respectively, and the ADC 380 may convert a first voltage difference ((VSEN1+noise)-noise) (i.e., the first sensing voltage VSEN1) to the first sensing data. The analog-to-digital conversion operations by the switch matrix 360 and the ADC 380 may be sequentially performed from the first sensing channel 340-1 and the first reference channel 350-1 (i.e., CH1) to the $N^{th}$ sensing channel 340-N and the $N^{th}$ reference channel 350-N (i.e., CHN).

The data output unit 390 may sequentially store the N first sensing data generated by the ADC 380 in the first analog-to-digital conversion period ADCP1.

Referring to FIGS. 8 and 10, the second sensing period EVEN SP for pixels of a selected row of the display device may include a second sub-sensing period SUBP2 in which first sensing operations for the pixels connected to the N even-numbered sensing lines SL2, . . . , SL2N and second sensing operations for the pixels connected to the N odd-numbered sensing lines SL1, . . . , SL2N−1 are performed and a second data output period DOP2 in which the second sensing data SD2 for all pixels of the selected row is output. Hereinafter, for convenience of description, first and second sensing operations for the first sensing line SL1 among the N odd-numbered sensing lines SL1, . . . , SL2N−1 and the second sensing line SL2 among the N even-numbered sensing lines SL2, . . . , SL2N will be described. Sensing operations for other sensing lines among the N odd-numbered sensing lines SL1, SL2N-1 may be substantially the same as the first sensing operation for the first sensing line SL1, and sensing operations for other sensing lines among the N even-numbered sensing lines SL2, . . . , SL2N may be substantially the same as the second sensing operation for the second sensing line SL2.

Referring to FIGS. 8, 10, and 15, the second sub-sensing period SUBP2 may include a second sensing line initialization period SLIP2, a second capacitor initialization period CIP2, a second sampling period SAMP2, and a second analog-to-digital conversion period ADCP2. In an embodiment, as illustrated in FIG. 10, the second capacitor initialization period CIP2 may overlap (or be defined in) the second sensing line initialization period SLIP2.

In the second sensing line initialization period SLIP2, the sensing line initialization circuit 320 may substantially simultaneously initialize the first sensing line SL1 and the second sensing line SL2. In an embodiment, for example, in the second sensing line initialization period SLIP2, the sensing line initialization signal SLIS may have an activation level, the first sensing line initialization switch SLISW1 may apply the initialization voltage VINT to the first sensing line SL1 in response to the sensing line initialization signal SLIS having the activation level, the second sensing line initialization switch SLISW2 may apply the initialization voltage VINT to the second sensing line SL2 in response to the sensing line initialization signal SLIS having the activation level, and the first sensing line SL1 and the second sensing line SL2 may be initialized based on the initialization voltage VINT.

Referring to FIGS. 8, 10, and 16, in the second capacitor initialization period CIP2, the sampling capacitor SAMC and the reference capacitor REFC may be initialized. In an embodiment, the second capacitor initialization period CIP2 may overlap a portion of the second sensing line initialization period SLIP2, for example, an end portion of the second sensing line initialization period SLIP2. In an embodiment, for example, in the second capacitor initialization period CIP2, each of the initialization signal IS, the sampling signal SAMS, the reference signal SREF, and the channel connection signal CCS may have an activation level.

The initialization switch ISW may be turned-on in response to the initialization signal IS having the activation level, the second sampling switch SAMSW2 may be turned-on in response to the sampling signal SAMS having the activation level, and the channel connection switch CCSW1 may be turned-on in response to the channel connection signal CCS having the activation level. Accordingly, the initialization voltage VINT may be applied to the first electrode of the reference capacitor REFC through the initialization switch ISW and the second sampling switch SAMSW2, and may be applied to the first electrode of the sampling capacitor SAMC through the initialization switch ISW, the second sampling switch SAMSW2, and the channel connection switch CCSW1. Further, the first reference switch RSW1 and the second reference switch RSW2 may be turned-on in response to the reference signal SREF having the activation level, and the reference voltage VREF may be applied to the second electrode of the sampling capacitor SAMC through the first reference switch RSW1, and may be applied to the second electrode of the reference capacitor REFC through the second reference switch RSW2. Accordingly, the sampling capacitor SAMC and the reference capacitor REFC may be initialized or discharged based on the initialization voltage VINT and the reference voltage VREF. In an embodiment, the reference voltage VREF may have a voltage level equal to the initialization voltage VINT, but is not limited thereto. In an embodiment, the sampling signal SAMS may have an activation level after a second delay time TDLY2 from the start of the second sub-sensing period SUBP2. Since the activation time of the sampling signal SAMS is delayed by the second delay time TDLY2, the first and second sensing operations may be more stably performed.

Further, in an embodiment, in the second capacitor initialization period CIP2, each of the sensing line initialization signal SLIS, the second line selection signal LSS2, and the first noise selection signal NS1 may also have an activation level, the initialization voltage VINT may be further applied to the first electrode of the sampling capacitor SAMC through the second sensing line initialization switch SLISW2, the second line selection switch LSSW2-1, and the first sampling switch SAMSW1, and the initialization voltage VINT may be further applied to the first electrode of the reference capacitor REFC through the second sensing line initialization switch SLISW2, the first line selection switch LSSW1-1, the first sampling switch SAMSW1, and the channel connection switch CCSW1. Similarly, the initialization voltage VINT may be further applied to the first electrode of the sampling capacitor SAMC through the first sensing line initialization switch SLISW1, the first noise selection switch NSW1-1, the second sampling switch SAMSW2, and the channel connection switch CCSW1, and the initialization voltage VINT may be further applied to the first electrode of the reference capacitor REFC through the first sensing line initialization switch SLISW1, the first noise selection switch NSW1-1, and the second sampling switch SAMSW2.

Referring to FIGS. 8, 10, and 17, in the second sampling period SAMP2, the voltage of the second sensing line SL2 may be saturated with the second sensing voltage VSEN2, the sensing channel 340-1 may sample the second sensing voltage VSEN2 and the noise of the second sensing line SL2, and the reference channel 350-1 may sample the noise of the first sensing line SL1. In an embodiment, for example, in the second sampling period SAMP2, each of the first noise selection signal NS1, the second line selection signal LSS2, the sampling signal SAMS, and the reference signal SREF may have an activation level, and each of the first line selection signal LSS1 and the channel connection signal CCS may have an inactivation level. During the second sampling period SAMP2, the first switching transistor TSW1 and the second switching transistor TSW2 included in the second pixel PX2 connected to the second sensing line SL2 may be turned-on in response to the scan signal SC1 and the sensing signal SS1, and the first switching transistor TSW1 included in the first pixel PX1 connected to the first sensing line SL1 may be turned-off.

The first noise selection switch NSW1 may be turned-on in response to the first noise selection signal NS1 having the activation level, the second line selection switch LSSW2-1 may be turned-on in response to the second line selection signal LSS2 having the activation level, and the first sampling switch SAMSW1 and the second sampling switch SAMSW2 may be turned-on in response to the sampling signal SAMS having the activation level. Accordingly, the second sensing voltage VSEN2 and the noise of the second sensing line SL2 may be applied to the first electrode of the sampling capacitor SAMC through the second line selection switch LSSW2-1 and the first sampling switch SAMSW1, and the noise of the first sensing line SL1 may be applied to the first electrode of the reference capacitor REFC through the first noise selection switch NSW1 and the second sampling switch SAMSW2. Further, the first reference switch RSW1 and the second reference switch RSW2 may be turned-on in response to the reference signal SREF having the activation level. Accordingly, the reference voltage VREF may be applied to the second electrode of the sampling capacitor SAMC through the first reference switch RSW1, and may be applied to the second electrode of the reference capacitor REFC through the second reference switch RSW2.

Referring to FIGS. 8, 10, and 18, in the second analog-to-digital conversion period ADCP2, the switch matrix 360 and the ADC 380 may sequentially convert the N second sensing voltages VSEN2 and the noises of the N even-numbered sensing lines SL2, SL2N sampled by the N sensing channels 340-1, . . . , 340-N and the N noises of the N odd-numbered sensing lines SL1, . . . , SL2N−1 sampled by the N reference channels 350-1, . . . , 350-N to the N second sensing data. In an embodiment, for example, the channel connection signal CCS may have an inactivation level. The switch matrix 360 may connect the second electrode of the sampling capacitor SAMC and the second electrode of the reference capacitor REFC to the first input terminal and the second input terminal of the ADC 380, respectively, and the ADC 380 may convert a second voltage difference ((VSEN2+noise)-noise) (i.e., the second sensing voltage VSEN2) to the second sensing data. The analog-to-digital conversion operations by the switch matrix 360 and the ADC 380 may be sequentially performed from the first sensing channel 340-1 and the first reference channel 350-1 (i.e., CH1) to the $N^{th}$ sensing channel 340-N and the $N^{th}$ reference channel 350-N (i.e., CHN).

The data output unit 390 may sequentially store the N second sensing data generated by the ADC 380 in the second analog-to-digital conversion period ADCP2.

Referring to FIGS. 8, 9, 10, and 19, in the first and second data output periods DOP1 and DOP2, the data output unit 390 may output the N first sensing data generated in the first sub-sensing period SUBP1 and the N second sensing data generated in the second sub-sensing period SUBP2. In an embodiment, for example, the first sensing data 391 or SD1, SD3, . . . , SD2N−1 for the N odd-numbered sensing lines SL1, . . . , SL2N−1 may be generated in the first sub-sensing period SUBP1, and the second sensing data 392 or SD2, SD4, . . . , SD2N for the N even-numbered sensing lines SL2, . . . , SL2N may be generated in the second sub-sensing period SUBP2. In an embodiment, the data output unit 390 may rearrange the first sensing data 391 and the second sensing data 392, and may output the rearranged sensing data 393. In an embodiment, for example, the data output unit 390 may output the sensing data 393 rearranged in the order of sensing data SD1 for the first sensing line SL1, sensing data SD2 for the second sensing line SL2, sensing data SD3 for the third sensing line, sensing data SD4 for the fourth sensing line, . . . , sensing data SD2N−1 for the $2N-1^{st}$ sensing line SL2N−1, and sensing data SD2N for the $2N^{th}$ sensing line SL2N.

In the sensing circuit 300 according to an embodiment, in the first sensing period ODD SP, the sensing channel 340-1 may sense the first sensing voltage VSEN1 and the noise of the first sensing line SL1, the reference channel 350-1 may sense the noise of the second sensing line SL2 adjacent to the first sensing line SL1, and the noises may be offset through the ADC 380. Accordingly, the sensing circuit 300 may output the first sensing data SD1 that does not include noise.

In such an embodiment, in the second sensing period EVEN SP, the sensing channel 340-1 may sense the second sensing voltage VSEN2 and the noise of the second sensing line SL2, the reference channel 350-1 may sense the noise of the first sensing line SL1 adjacent to the second sensing line SL2, and the noises may be offset through the ADC 380. Accordingly, the sensing circuit 300 may output the second sensing data SD2 that does not include noise.

Figure 20:
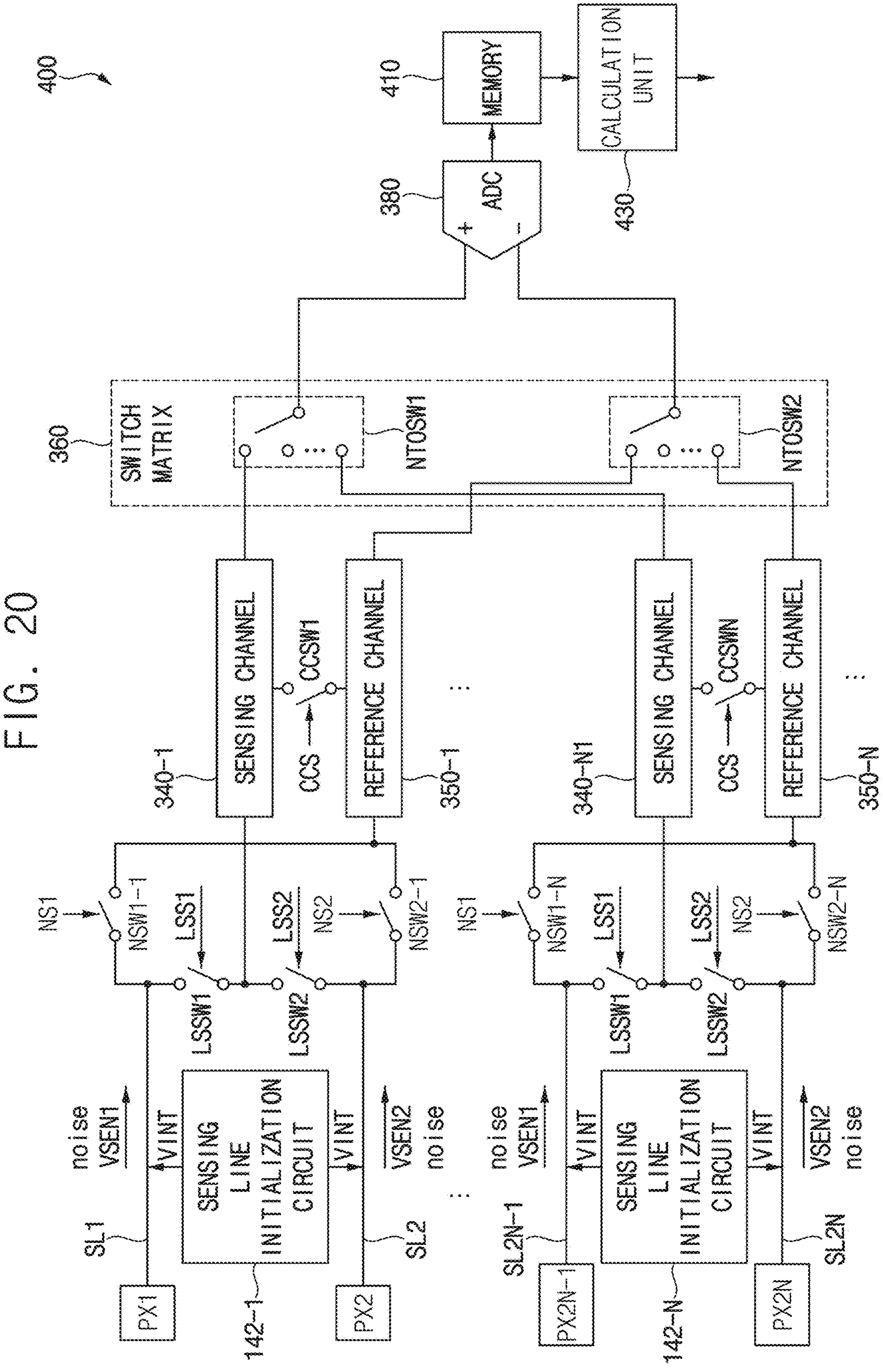
FIGS. 20 and 21 are diagrams illustrating a sensing circuit according to an alternative embodiment.
Figure 21:
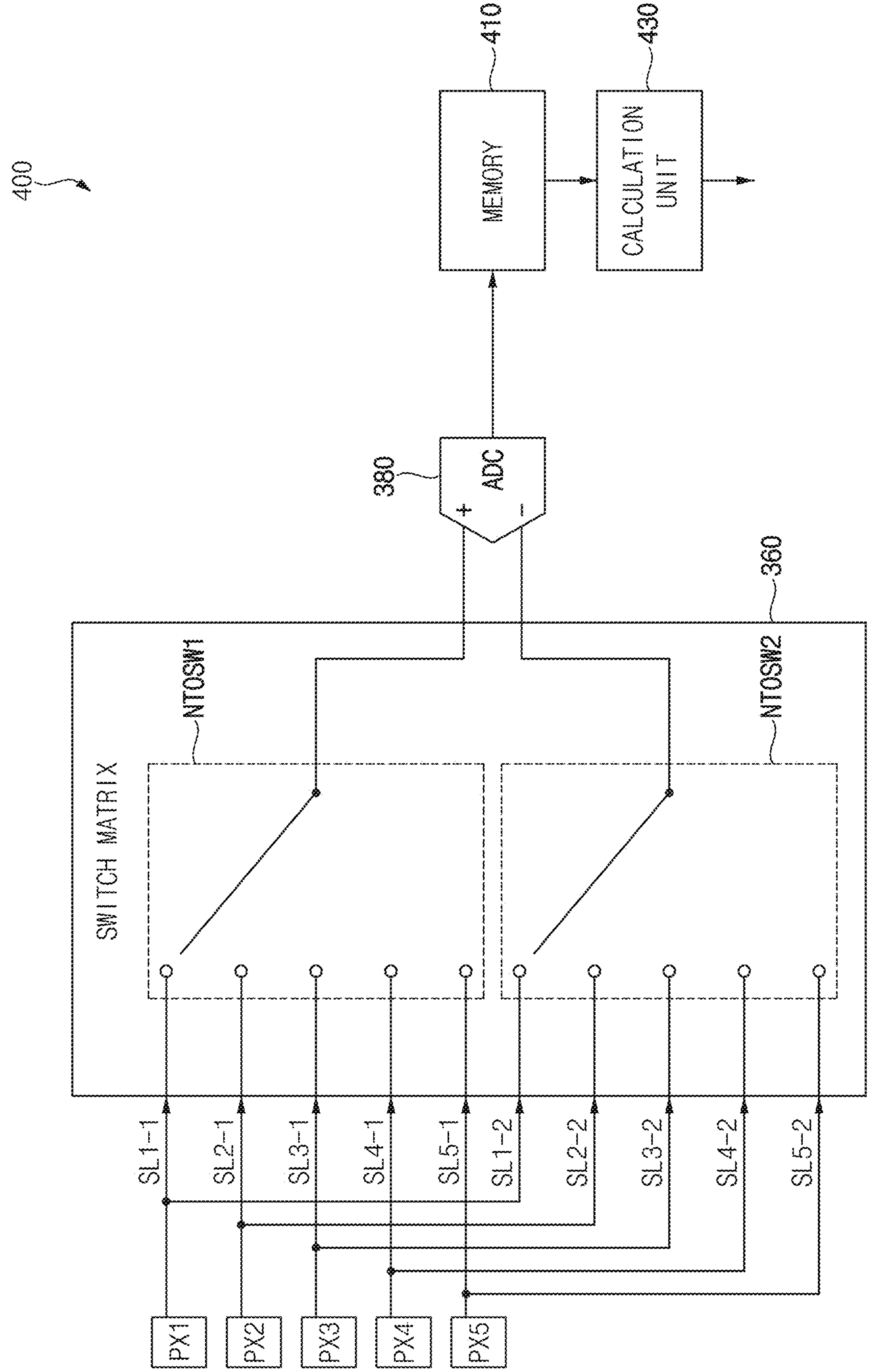

FIGS. 20 and 21 are diagrams illustrating a sensing circuit according to an alternative embodiment. A sensing circuit 400 illustrated in FIGS. 20 and 21 may have components substantially the same as or similar to those of the sensing circuit 300 described with reference to FIGS. 8 to 19 except for a memory 410 and a calculation unit 430. Any repetitive detailed descriptions of components in FIGS. 20 and 21, which are substantially the same as or similar to those described with reference to FIGS. 8 to 19, will be omitted or simplified. In an embodiment, for example, in FIG. 21, some components illustrated in FIG. 20 are omitted for convenience of description.

Referring to FIGS. 20 and 21, an embodiment of a display device including a sensing circuit 400 may include 2N sensing lines SL1, SL2, . . . , SL2N−1, SL2N (N is an integer greater than or equal to 1), and the sensing circuit 400 may include N first line selection switches LSSW1-1, . . . , LSSW1-N, N second line selection switches LSSW2-1, . . . , LSSW2-N, N first noise selection switches NSW1-1, . . . , NSW1-N, N second noise selection switches NSW2-1, . . . , NSW2-N, N sensing line initialization circuits 142-1, . . . , 142-N, N sensing channels 340-1, . . . , 340-N, N reference channels 350-1, . . . , 350-N, N channel connection switches CCSW1, . . . , CCSWN, a switch matrix 360, an ADC 380, a memory 410, and a calculation unit 430.

The switch matrix 360 may include a first multiplexer NTOSW1 and a second multiplexer NTOSW2.

The N sensing channels 340-1, . . . , 340-N may sense N first sensing voltages VSEN1 and noises of the N odd-numbered sensing lines SL1, . . . , SL2N−1, or may sense N second sensing voltages VSEN2 and noises of the N even-numbered sensing lines SL2, SL2N. The N sensing channels 340-1, . . . , 340-N may transmit the N first sensing voltages VSEN1 and the noises or the N second sensing voltages VSEN2 and the noises to the first multiplexer NTOSW1.

The N reference channels 350-1, . . . , 350-N may sense N noises of the N odd-numbered sensing lines SL1, . . . , SL2N−1, or may sense N noises of the N even-numbered sensing lines SL2, . . . , SL2N. The N reference channels 350-1, . . . , 350-N may transmit the N noises to the second multiplexer NTOSW2.

The first sensing voltages VSEN1 and the noises or the second sensing voltages VSEN2 and the noises transmitted to the first multiplexer NTOSW1 may be provided to a first terminal (e.g., a positive input terminal) of the ADC 380, and the noises transmitted to the second multiplexer NTOSW2 may be provided to a second terminal of the ADC 380.

In an embodiment, for example, as illustrated in FIG. 21, a first sensing line (hereinafter, will be referred to as $1\text{-}1^{st}$ sensing line) SL1-1 may correspond to a line connected to the first pixel PX1, the sensing line SL1, and the sensing channel 340-1, and the $1\text{-}1^{st}$ sensing line SL1-1 may be connected to the first multiplexer NTOSW1. Further, a second first sensing line (hereinafter, will be referred to as "$1\text{-}2^{nd}$ sensing line") SL1-2 may correspond to a line connected to the first pixel PX1, the sensing line SL1, and the reference channel 350-1, and the $1\text{-}2^{nd}$ sensing line SL1-2 may be connected to the second multiplexer NTOSW2.

A first second sensing line (hereinafter, will be referred to as "$2\text{-}1^{st}$ sensing line") SL2-1 may correspond to a line connected to the second pixel PX2, the sensing line SL2, and the sensing channel 340-2, and the $2\text{-}1^{st}$ sensing line SL2-1 may be connected to the first multiplexer NTOSW1. Further, a second sensing line (hereinafter, will be referred to as "$2\text{-}2^{nd}$ sensing line") SL2-2 may correspond to a line connected to the second pixel PX2, the sensing line SL2, and the reference channel 350-2, and the $2\text{-}2^{nd}$ sensing line SL2-2 may be connected to the second multiplexer NTOSW2.

A first third sensing line (hereinafter, will be referred to as "$3\text{-}1^{st}$ sensing line") SL3-1 may correspond to a line connected to the third pixel PX3, the sensing line SL3, and the sensing channel 340-3, and the $3\text{-}1^{st}$ sensing line SL3-1 may be connected to the first multiplexer NTOSW1. Further, a second third sensing line (hereinafter, will be referred to as "3-2$^{nd}$ sensing line") SL3-2 may correspond to a line connected to the third pixel PX3, the sensing line SL3, and the reference channel 350-3, and the 3-2$^{nd}$ sensing line SL3-2 may be connected to the second multiplexer NTOSW2.

A first fourth sensing line (hereinafter, will be referred to as "4-1$^{st}$ sensing line") SL4-1 may correspond to a line connected to the fourth pixel PX4, the sensing line SL4, and the sensing channel 340-4, and the 4-1$^{st}$ sensing line SL4-1 may be connected to the first multiplexer NTOSW1. Further, a second fourth sensing line (hereinafter, will be referred to as "4-2$^{nd}$ sensing line") SL4-2 may correspond to a line connected to the fourth pixel PX4, the sensing line SL4, and the reference channel 350-4, and the 4-2$^{nd}$ sensing line SL4-2 may be connected to the second multiplexer NTOSW2.

A first fifth sensing line (hereinafter, will be referred to as "5-1$^{st}$ sensing line") SL5-1 may correspond to a line connected to the fifth pixel PX5, the sensing line SL5, and the sensing channel 340-5, and the 5-1$^{st}$ sensing line SL5-1 may be connected to the first multiplexer NTOSW1. Further, a second fifth sensing line (hereinafter, will be referred to as "5-2$^{nd}$ sensing line") SL5-2 may correspond to a line connected to the fifth pixel PX5, the sensing line SL5, and the reference channel 350-5, and the 5-2$^{nd}$ sensing line SL5-2 may be connected to the second multiplexer NTOSW2.

The first terminal of the ADC 380 may receive the first sensing voltages VSEN1 and the noises or the second sensing voltages VSEN2 and the noises provided to the first multiplexer NTOSW1, and the second terminal of the ADC 380 may receive the noises provided to the second multiplexer NTOSW2.

The ADC 380 may generate sensing data corresponding to a value obtained by subtracting the noise received at the second terminal from the first sensing voltage VSEN1 and the noise received at the first terminal.

The memory 410 may store the sensing data, and the calculation unit 430 may generate average sensing data based on the sensing data stored in the memory 410.

In the sensing circuit 400 according to an embodiment, after sensing noises in pixels positioned adjacent to a pixel to be sensed for a sensing voltage, a plurality of sensing data may be generated, and the calculation unit 430 may obtain the average sensing data that is an average of the plurality of sensing data. Accordingly, the sensing circuit 400 may obtain the relatively more accurate average sensing data, and the display device including the sensing circuit 400 may more accurately compensate the image data.

Figure 22:
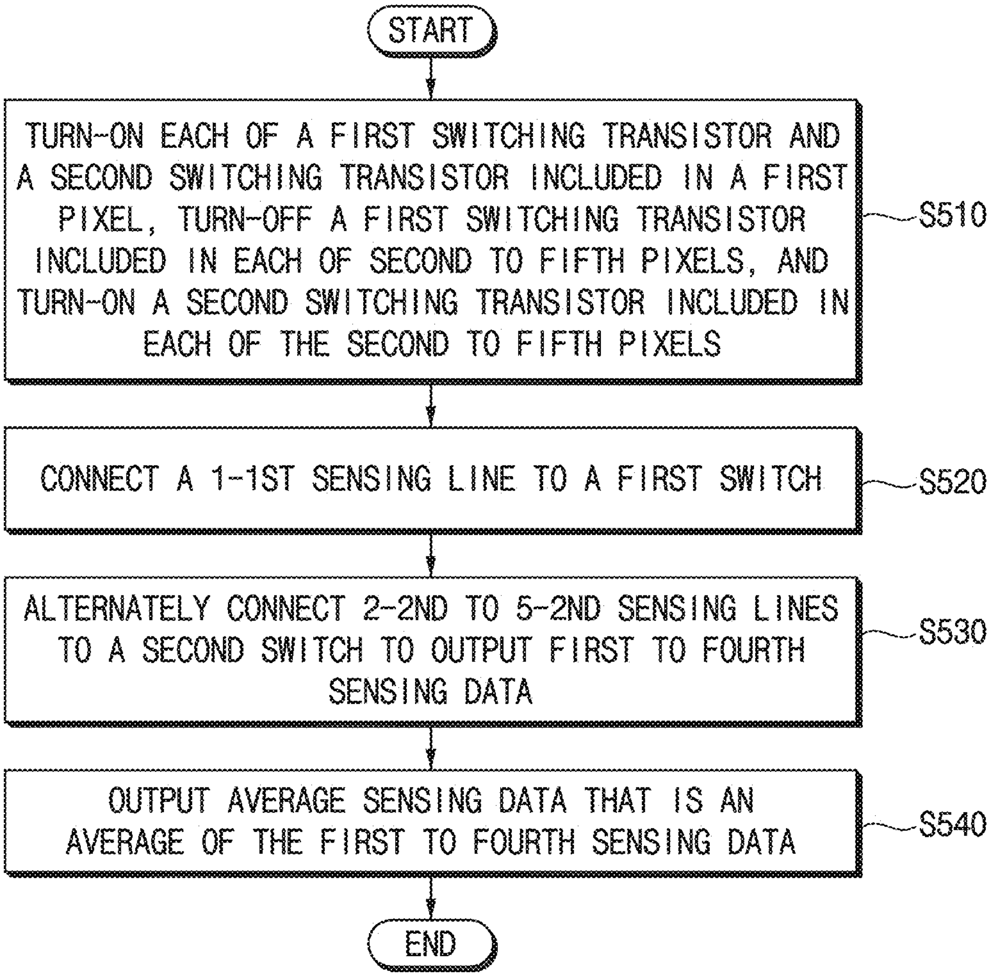
FIG. 22 is a flowchart illustrating a method of driving the sensing circuit in FIG.

FIG. 22 is a flowchart illustrating a method of driving the sensing circuit in FIG. FIGS. 23 to 26 are diagrams for describing an operation of the sensing circuit in FIG. 20.

Referring to FIGS. 22 to 26, a method of driving the sensing circuit 400 according to an embodiment may include turning-on each of the first switching transistor TSW1 and the second switching transistor TSW2 included in the first pixel PX1, turning-off the first switching transistor TSW1 included in each of the second to fifth pixels PX2, PX3, PX4, and PX5, and turning-on the second switching transistor TSW2 included in each of the second to fifth pixels PX2, PX3, PX4, and PX5 (S510), connecting the 1-1$^{st}$ sensing line SL1-1 to the first multiplexer NTOSW1 (e.g., a first switch) (S520), alternately connecting the 2-2$^{nd}$, 3-2$^{nd}$, 4-2$^{nd}$, and 5-2$^{nd}$ sensing lines SL2-2, SL3-2, SL4-2, and SL5-2 to the second multiplexer NTOSW2 (e.g., a second switch) to output the first to fourth sensing data DATA1, DATA2, DATA3, and DATA4 (e.g., first to fourth data) (S530), and outputting the average sensing data ADATA (e.g., average data) that is an average of the first to fourth sensing data DATA1, DATA2, and DATA3, DATA4 (S540).

Figure 23:
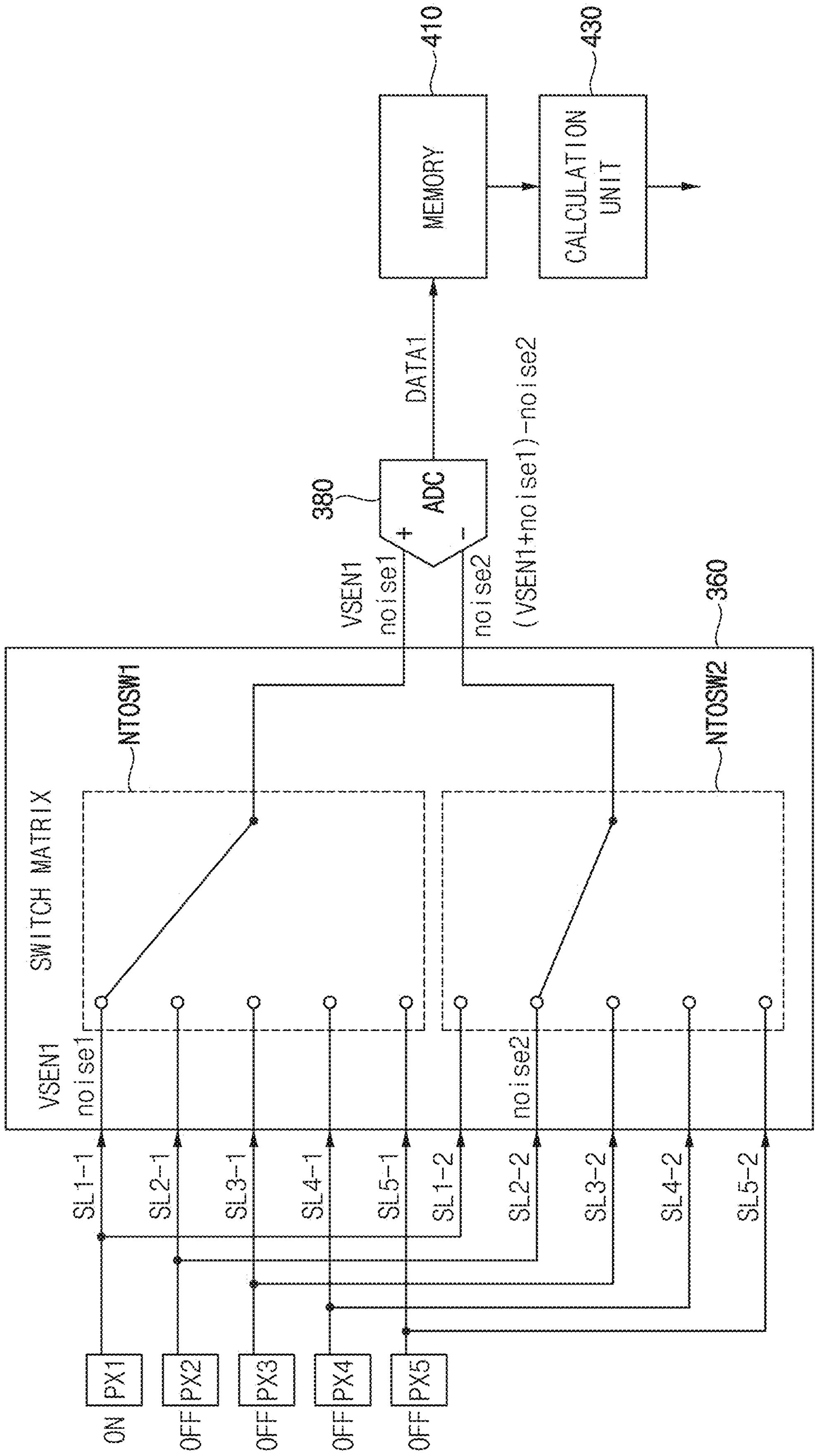
FIGS. 23 to 26 are diagrams for describing an operation of the sensing circuit in FIG. 20.

Referring to FIGS. 22 and 23, in a state in which each of the first switching transistor TSW1 and the second switching transistor TSW2 included in the first pixel PX1 is turned-on, the first switching transistor TSW1 included in each of the second to fifth pixels PX2, PX3, PX4, and PX5 is turned-off, and the second switching transistor TSW2 included in each of the second to fifth pixels PX2, PX3, PX4, and PX5 is turned-on, the first multiplexer NTOSW1 may be connected to the 1-1$^{st}$ sensing line SL1-1, and a first sensing voltage VSEN1 and a first noise noise1 provided to the 1-1$^{st}$ sensing line SL1-1 may be provided to the first terminal of the ADC 380. Further, the second multiplexer NTOSW2 may be connected to the 2-2$^{nd}$ sensing line SL2-2, and a second noise noise2 provided to the 2-2$^{nd}$ sensing line SL2-2 may be provided to the second terminal of the ADC 380.

The ADC 380 may generate first sensing data DATA1 corresponding to a value obtained by subtracting the second noise noise2 provided to the second terminal from the first sensing voltage VSEN1 and the first noise noise1 provided to the first terminal.

The memory 410 may store the first sensing data DATA1.

Figure 24:
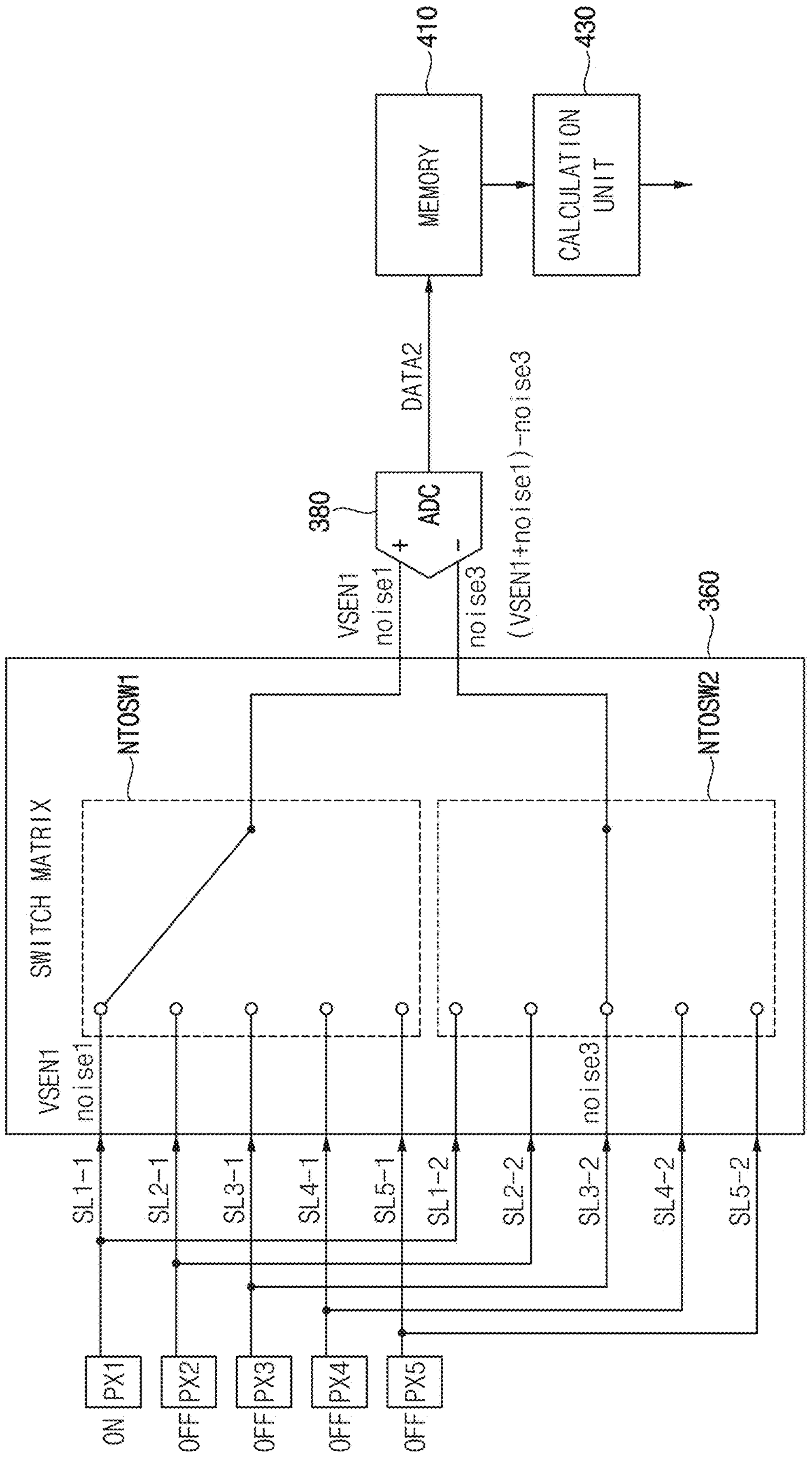

Referring to FIGS. 22 and 24, in a state in which each of the first switching transistor TSW1 and the second switching transistor TSW2 included in the first pixel PX1 is turned-on, the first switching transistor TSW1 included in each of the second to fifth pixels PX2, PX3, PX4, and PX5 is turned-off, and the second switching transistor TSW2 included in each of the second to fifth pixels PX2, PX3, PX4, and PX5 is turned-on, the first multiplexer NTOSW1 may be connected to the 1-1$^{st}$ sensing line SL1-1, and a first sensing voltage VSEN1 and a first noise noise1 provided to the 1-1$^{st}$ sensing line SL1-1 may be provided to the first terminal of the ADC 380. Further, the second multiplexer NTOSW2 may be connected to the 3-2$^{nd}$ sensing line SL3-2, and a third noise noise3 provided to the 3-2$^{nd}$ sensing line SL3-2 may be provided to the second terminal of the ADC 380.

The ADC 380 may generate second sensing data DATA2 corresponding to a value obtained by subtracting the third noise noise3 provided to the second terminal from the first sensing voltage VSEN1 and the first noise noise1 provided to the first terminal.

The memory 410 may store the second sensing data DATA2.

Figure 25:
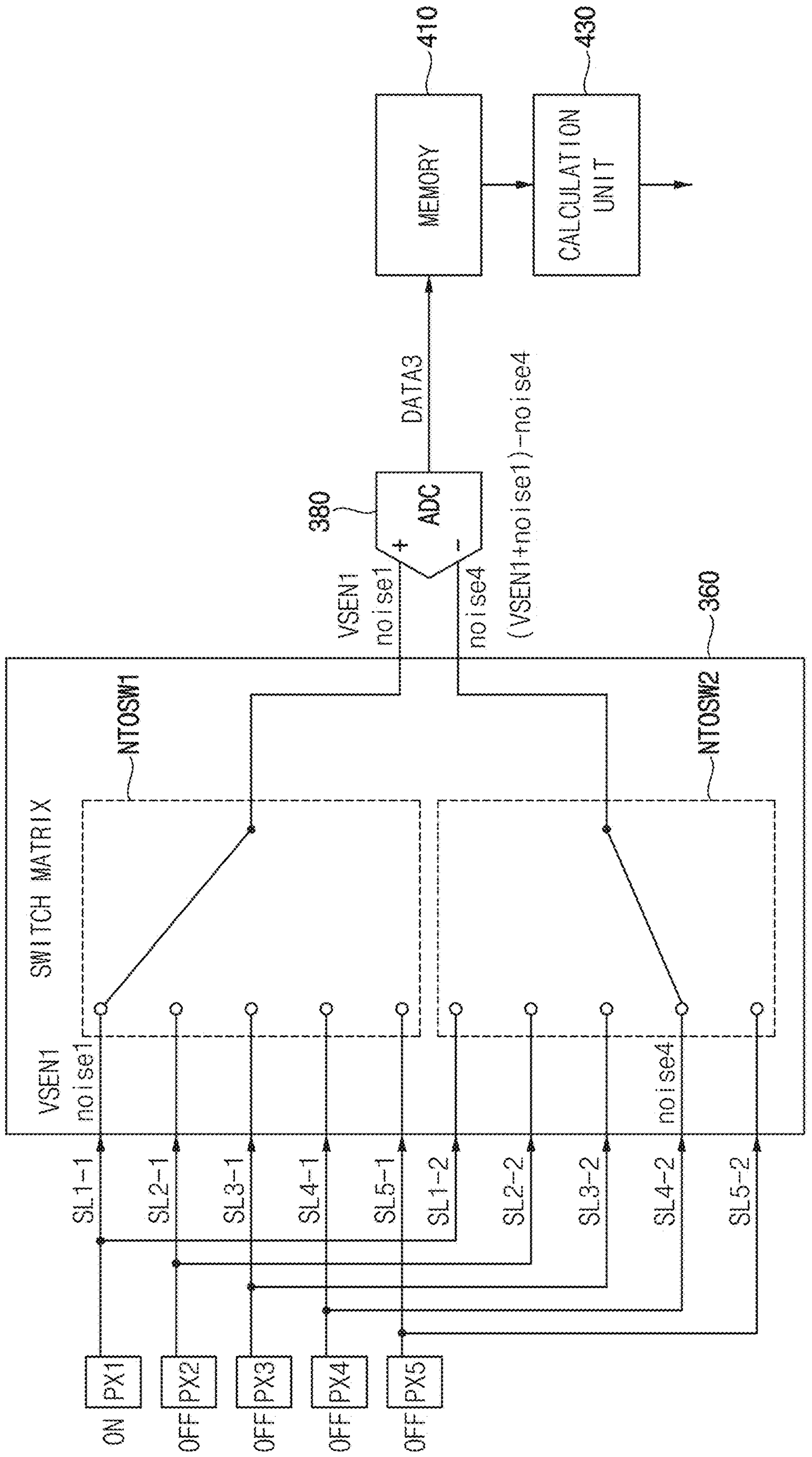

Referring to FIGS. 22 and 25, in a state in which each of the first switching transistor TSW1 and the second switching transistor TSW2 included in the first pixel PX1 is turned-on, the first switching transistor TSW1 included in each of the second to fifth pixels PX2, PX3, PX4, and PX5 is turned-off, and the second switching transistor TSW2 included in each of the second to fifth pixels PX2, PX3, PX4, and PX5 is turned-on, the first multiplexer NTOSW1 may be connected to the 1-1$^{st}$ sensing line SL1-1, and a first sensing voltage VSEN1 and a first noise noise1 provided to the 1-1$^{st}$ sensing line SL1-1 may be provided to the first terminal of the ADC 380. Further, the second multiplexer NTOSW2 may be connected to the 4-2$^{nd}$ sensing line SL4-2, and a fourth noise noise4 provided to the 4-2$^{nd}$ sensing line SL4-2 may be provided to the second terminal of the ADC 380.

The ADC 380 may generate third sensing data DATA3 corresponding to a value obtained by subtracting the fourth noise noise4 provided to the second terminal from the first sensing voltage VSEN1 and the first noise noise1 provided to the first terminal.

The memory 410 may store the third sensing data DATA3.

Figure 26:
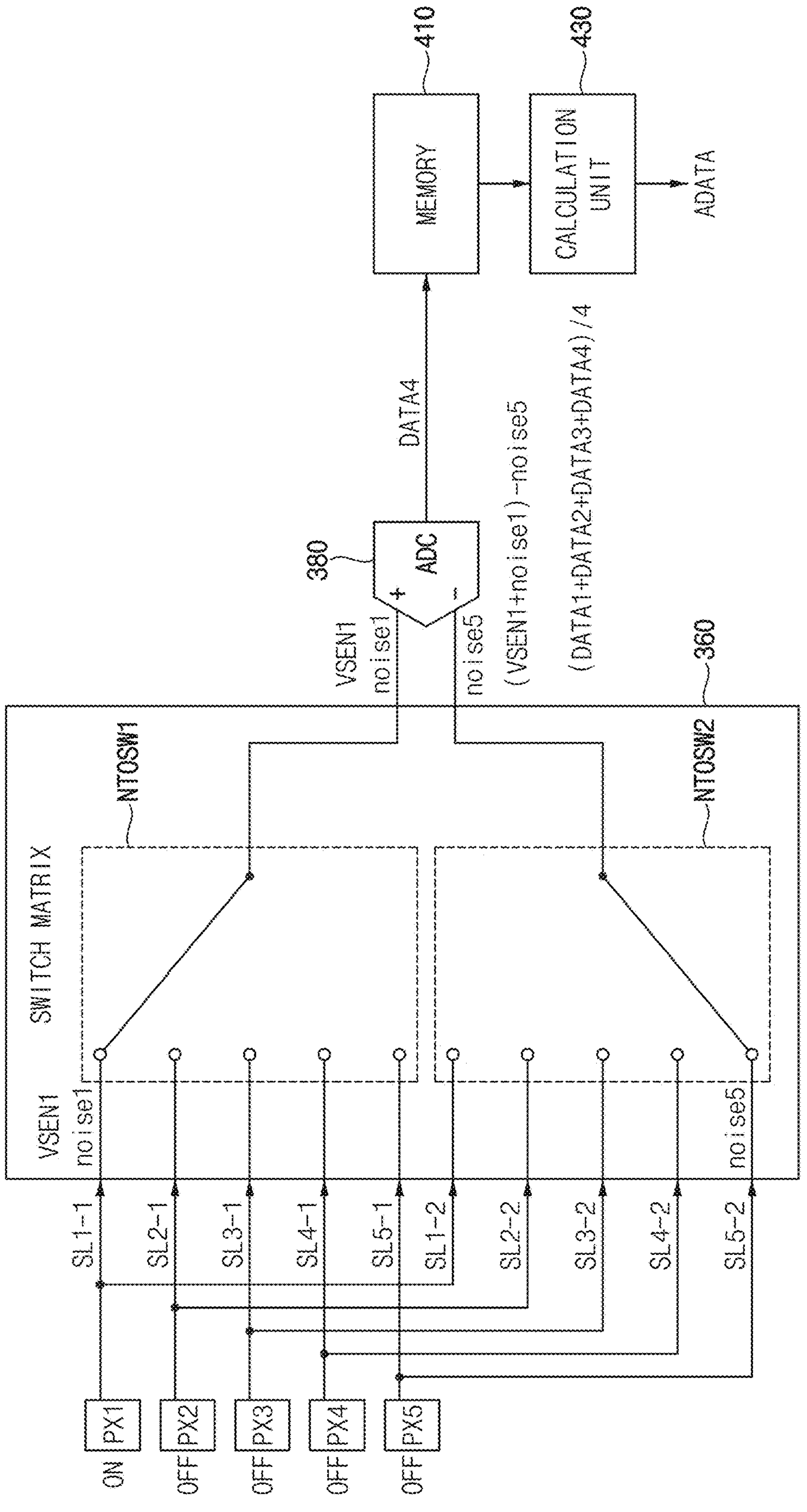

Referring to FIGS. 22 and 26, in a state in which each of the first switching transistor TSW1 and the second switching transistor TSW2 included in the first pixel PX1 is turned-on, the first switching transistor TSW1 included in each of the second to fifth pixels PX2, PX3, PX4, and PX5 is turned-off, and the second switching transistor TSW2 included in each of the second to fifth pixels PX2, PX3, PX4, and PX5 is turned-on, the first multiplexer NTOSW1 may be connected to the 1-1$^{st}$ sensing line SL1-1, and a first sensing voltage VSEN1 and a first noise noise1 provided to the 1-1$^{st}$ sensing line SL1-1 may be provided to the first terminal of the ADC 380. Further, the second multiplexer NTOSW2 may be connected to the 5-2$^{nd}$ sensing line SL5-2, and a fifth noise noise5 provided to the 5-2$^{nd}$ sensing line SL5-2 may be provided to the second terminal of the ADC 380.

The ADC 380 may generate fourth sensing data DATA4 corresponding to a value obtained by subtracting the fifth noise noise5 provided to the second terminal from the first sensing voltage VSEN1 and the first noise noise1 provided to the first terminal.

The memory 410 may store the fourth sensing data DATA4.

The calculation unit 430 may generate the average sensing data ADATA based on the first to fourth sensing data DATA1, DATA2, DATA3, and DATA4 stored in the memory 410. In an embodiment, for example, as shown in FIG. 26, the average sensing data ADATA may be obtained by dividing a sum of the first to fourth sensing data DATA1, DATA2, DATA3, and DATA4 by 4.

In the method of driving the sensing circuit 400 according to an embodiment, after sensing noises in pixels positioned adjacent to a pixel to be sensed for a sensing voltage, a plurality of sensing data may be generated, the calculation unit 430 may obtain the average sensing data ADATA that is an average of the plurality of sensing data. Accordingly, the sensing circuit 400 may obtain the relatively more accurate average sensing data ADATA, and the display device including the sensing circuit 400 may more accurately compensate the image data.

Although an embodiment where the sensing circuit 400 senses five pixels PX are described above, however, the number of pixels PX sensed by the sensing circuit 400 is not limited thereto. In an embodiment, for example, the sensing circuit 400 may sense at least three pixels PX.

Further, although an embodiment where the sensing circuit 400 senses the first sensing voltage VSEN1 and the first noise noise1 from the sensing line SL1 connected to the first pixel PX1, and senses the second to fifth noises noise2, noise3, noise4, and noises from the sensing lines SL2, SL3, SL4, and SL5 connected to the second to fifth pixels PX2, PX3, PX4, and PX5 are described above, however, the configuration of the present embodiment is not limited thereto. In an embodiment, for example, the sensing circuit 400 may sense a sensing voltage and noise from a sensing line connected to one of the first to 2N$^{th}$ pixels PX1, PX2N (hereinafter, will referred to as "a sensing pixel"), and may sense noises from sensing lines connected to pixels positioned adjacent to the sensing pixel.

Figure 27:
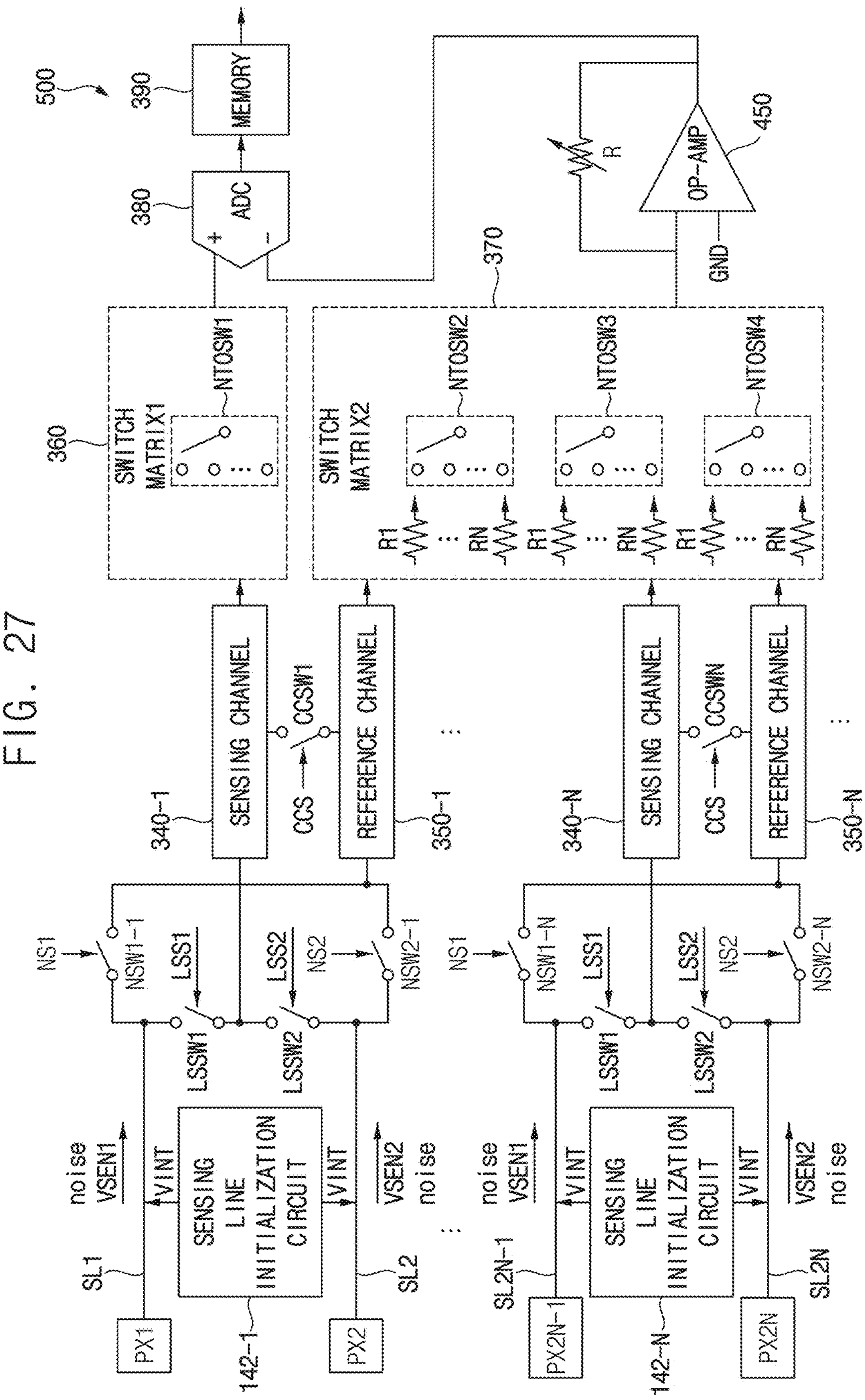
FIGS. 27, 28, and 29 are diagrams illustrating a sensing circuit according to an alternative embodiment.
Figure 28:
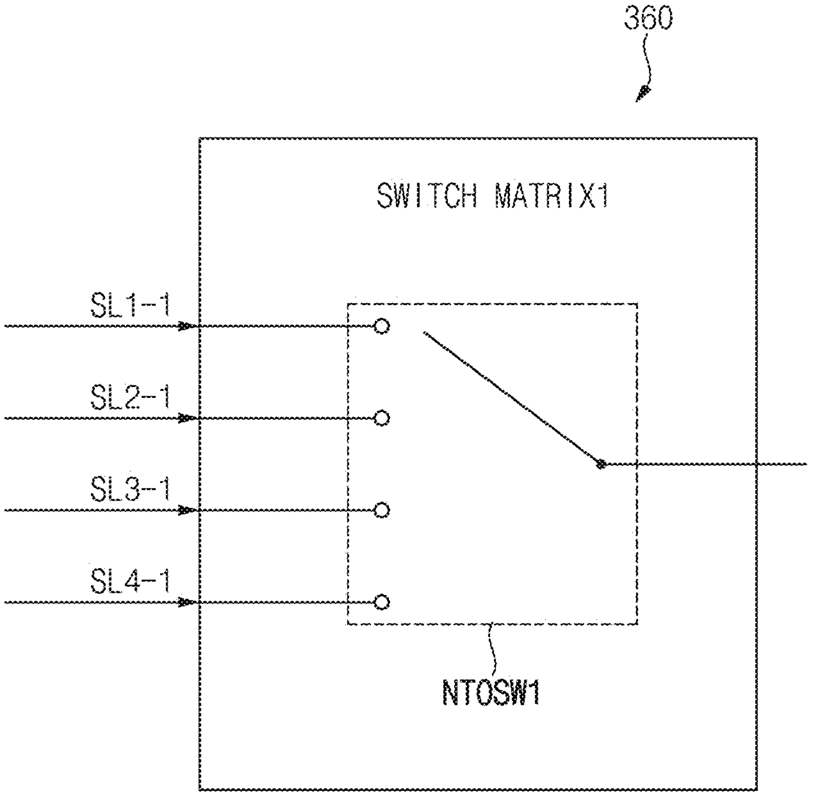
Figure 29:
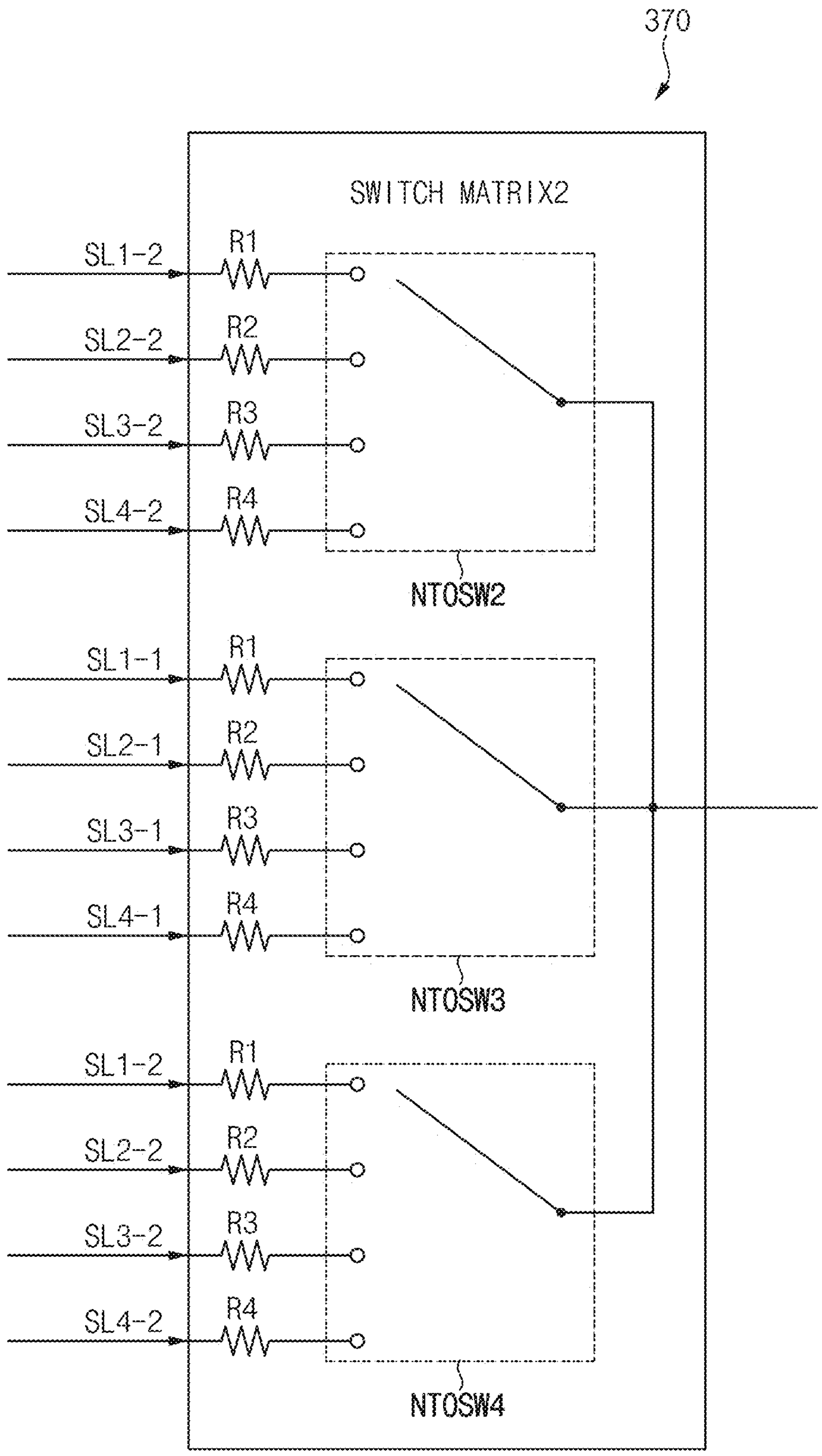

FIGS. 27, 28, and 29 are diagrams illustrating a sensing circuit according to an alternative embodiment.

Components of a sensing circuit 500 illustrated in FIGS. 27, 28, and 29 may be substantially the same as or similar to those of the sensing circuit 300 described with reference to FIGS. 8 to 19 except for a first switch matrix 360, a second switch matrix 370, and a summing amplifier 450. Any repetitive detailed descriptions of components in FIGS. 27, 28, and 29, which are substantially the same as or similar to those described with reference to FIGS. 8 to 19, will be omitted or simplified.

Referring to FIGS. 27, 28 and 29, an embodiment of a display device including a sensing circuit 500 may include 2N sensing lines SL1, SL2, . . . , SL2N−1, SL2N (N is an integer greater than or equal to 1), and the sensing circuit 500 may includes N first line selection switches LSSW1-1, . . . , LSSW1-N, N second line selection switches LSSW2-1, . . . , LSSW2-N, N first noise selection switches NSW1-1, . . . , NSW1-N, N second noise selection switches NSW2-1, . . . , NSW2-N, N sensing line initialization circuits 142-1, . . . , 142-N, N sensing channels 340-1, . . . , 340-N, N reference channels 350-1, . . . , 350-N, N channel connection switches CCSW1, . . . , CCSWN, a first switch matrix 360, a second switch matrix 370, a summing amplifier 450, an ADC 380, and a data output unit 390.

The first switch matrix 360 may include a first multiplexer NTOSW1, and the second switch matrix 370 may include a second multiplexer NTOSW2, a third multiplexer NTOSW3, and a fourth multiplexer NTOSW4.

The N sensing channels 340-1, . . . , 340-N may sense N first sensing voltages VSEN1 and noises of the N odd-numbered sensing lines SL1, . . . , SL2N−1, or may sense N second sensing voltages VSEN2 and noises of the N even-numbered sensing lines SL2, . . . , SL2N, and the N sensing channels 340-1, . . . , 340-N may transmit the N first sensing voltages VSEN1 and the noises or the N second sensing voltages VSEN2 and the noises to the first multiplexer NTOSW1.

The N reference channels 350-1, . . . , 350-N may sense N noises of the N odd-numbered sensing lines SL1, . . . , SL2N−1, or may sense N noises of the N even-numbered sensing lines SL2, . . . , SL2N, and the N reference channels 350-1, . . . , 350-N may transmit the N noises to the second multiplexer NTOSW2.

The N sensing channels 340-1, . . . , 340-N may sense N noises of the N odd-numbered sensing lines SL1, . . . , SL2N−1, or may sense N noises of the N even-numbered sensing lines SL2, . . . , SL2N, and the N sensing channels 340-1, . . . , 340-N may transmit the N noises to the third multiplexer NTOSW3.

The N reference channels 350-1, . . . , 350-N may sense N noises of the N odd-numbered sensing lines SL1, . . . , SL2N−1, or may sense N noises of the N even-numbered sensing lines SL2, . . . , SL2N, and the N reference channels 350-1, . . . , 350-N may transmit the N noises to the fourth multiplexer NTOSW4.

The first sensing voltages VSEN1 and the noises or the second sensing voltages VSEN2 and the noises transmitted to the first multiplexer NTOSW1 may be provided to a first terminal (e.g., a positive input terminal) of the ADC 380, the noises transmitted to the second multiplexer NTOSW2, the noises transmitted to the third multiplexer NTOSW3, and the noises transmitted to the fourth multiplexer NTOSW4 may be provided to a first terminal of the summing amplifier 450. Here, the second multiplexer NTOSW2 and the N reference channels 350-1, . . . , 350-N may be connected by first to N$^{th}$ resistors R1, . . . , RN, the third multiplexer NTOSW3 and the N sensing channels 340-1, . . . , 340-N may be connected by first to N$^{th}$ resistors R1, . . . , RN, and the fourth multiplexer NTOSW4 and the N reference channels 350-1, . . . , 350-N may be connected by first to N$^{th}$ resistors R1, . . . , RN.

In an embodiment, for example, as illustrated in FIGS. 28 and 29, a 1-1$^{st}$ sensing line SL1-1 may correspond to a line connected to the first pixel PX1, the sensing line SL1, and the sensing channel 340-1, and the 1-1$^{st}$ sensing line SL1-1 may be connected to the third multiplexer NTOSW3 through the first multiplexer NTOSW1 and the first resistor R1. Further, a 1-2$^{nd}$ sensing line SL1-2 may correspond to a line connected to the first pixel PX1, the sensing line SL1, and the reference channel 350-1, and the 1-2$^{nd}$ sensing line SL1-2 may be connected to the second multiplexer NTOSW2 and the fourth multiplexer NTOSW4 through the first resistor R1.

A 2-1$^{st}$ sensing line SL2-1 may correspond to a line connected to the second pixel PX2, the sensing line SL2, and the sensing channel 340-2, and the 2-1$^{st}$ sensing line SL2-1 may be connected to the third multiplexer NTOSW3 through the first multiplexer NTOSW1 and the second resistor R2. Further, a 2-2$^{nd}$ sensing line SL2-2 may correspond to a line connected to the second pixel PX2, the sensing line SL2, and the reference channel 350-2, and the 2-2$^{nd}$ sensing line SL2-2 may be connected to the second multiplexer NTOSW2 and the fourth multiplexer NTOSW4 through the second resistor R2.

A 3-1$^{st}$ sensing line SL3-1 may correspond to a line connected to the third pixel PX3, the sensing line SL3, and the sensing channel 340-3, and the 3-1$^{st}$ sensing line SL3-1 may be connected to the third multiplexer NTOSW3 through the first multiplexer NTOSW1 and the third resistor R3. Further, a 3-2$^{nd}$ sensing line SL3-2 may correspond to a line connected to the third pixel PX3, the sensing line SL3, and the reference channel 350-3, and the 3-2$^{nd}$ sensing line SL3-2 may be connected to the second multiplexer NTOSW2 and the fourth multiplexer NTOSW4 through the third resistor R3.

A 4-1$^{st}$ sensing line SL4-1 may correspond to a line connected to the fourth pixel PX4, the sensing line SL4, and the sensing channel 340-4, and the 4-1$^{st}$ sensing line SL4-1 may be connected to the third multiplexer NTOSW3 through the first multiplexer NTOSW1 and the third resistor R3. Further, a 4-2$^{nd}$ sensing line SL4-2 may correspond to a line connected to the fourth pixel PX4, the sensing line SL4, and the reference channel 350-4, and the 4-2$^{nd}$ sensing line SL4-2 may be connected to the second multiplexer NTOSW2 and the fourth multiplexer NTOSW4 through the fourth resistor R4.

In such an embodiment, the first multiplexer NTOSW1 may receive a first sensing voltage and a first noise from a sensing channel selected from the N sensing channels, and the second multiplexer NTOSW2 may receive a second noise from a reference channel selected from the N reference channels, the third multiplexer NTOSW3 may receive a third noise from a sensing channel selected from the N sensing channels, and the fourth multiplexer NTOSW4 may receive a fourth noise from a reference channel selected from the N reference channels.

The first terminal of the summing amplifier 450 may receive the noises provided to the second to fourth multiplexers NTOSW2, NTOSW3, and NTOSW4, and a ground voltage GND may be applied to a second terminal of the summing amplifier 450. A variable resistor R may connect between the first terminal of the summing amplifier 450 and an output terminal of the summing amplifier 450. In an embodiment, for example, a resistance of the variable resistor R may be determined based on a sensing line connected to the second to fourth multiplexers NTOSW2, NTOSW3, and NTOSW4. In such an embodiment, the sum of resistances of resistors connected to the sensing line and included in the second to fourth multiplexers NTOSW2, NTOSW3, and NTOSW4 may be set to be equal to a resistance controlling a gain of the summing amplifier 450. The summing amplifier 450 may generate a summed noise (or an average noise) based on the noises provided from the second switch matrix 370. In an embodiment, for example, the summing amplifier 450 may generate the summed noise (snoise in FIG. 31) by removing noise components of the noises. In such an embodiment, the summed noise (snoise in FIG. 31) may correspond to an average of the noises provided from the second switch matrix 370.

The first terminal of the ADC 380 may receive the first sensing voltage VSEN1 and the noise or the second sensing voltages VSEN2 and the noises provided to the first switch matrix 360 (or the first multiplexer NTOSW1), and a second terminal of the ADC 380 may receive the summed noise from the output terminal of the summing amplifier 450. The ADC 380 may generate sensing data corresponding to a value ((VSEN1+noise1)−snoise) in FIG. 31) obtained by subtracting the summed noise (snoise in FIG. 31) provided to the second terminal from the first sensing voltage VSEN1 and the noise (noise1) provided to the first terminal.

The data output unit 390 may output the sensing data.

In the sensing circuit 500 according to an embodiment, after sensing noises in pixels positioned adjacent to a pixel to be sensed for a sensing voltage, the summed noise (or the average noise) for the noises may be generated using the summing amplifier 450, and the ADC 380 may obtain the sensing data based on the summed noise. Accordingly, the sensing circuit 500 may obtain the relatively more precise sensing data, and the display device including the sensing circuit 500 may more precisely compensate the image data.

Figure 30:
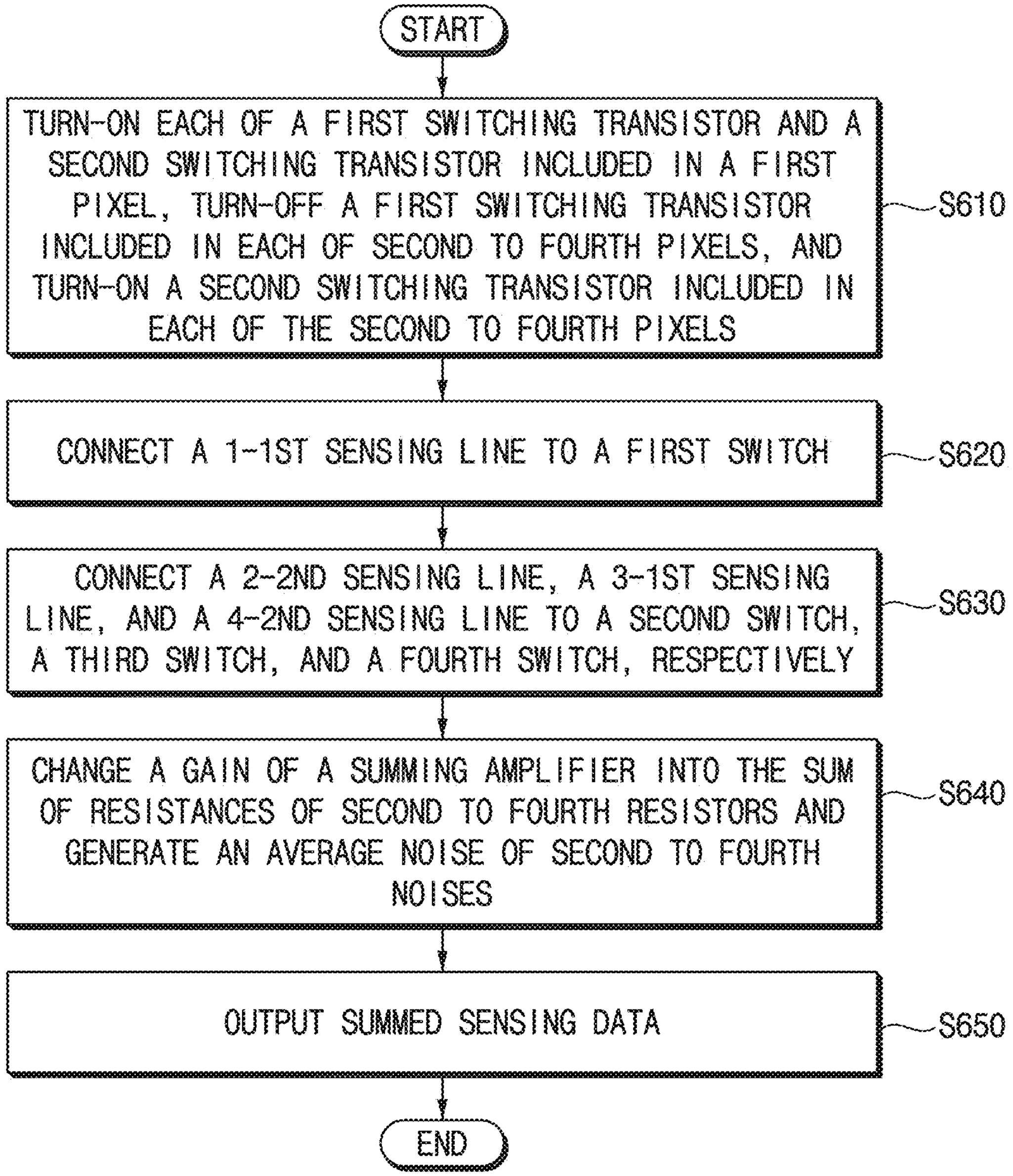
FIG. 30 is a flowchart illustrating a method of driving the sensing circuit in FIG. 27.
Figure 31:
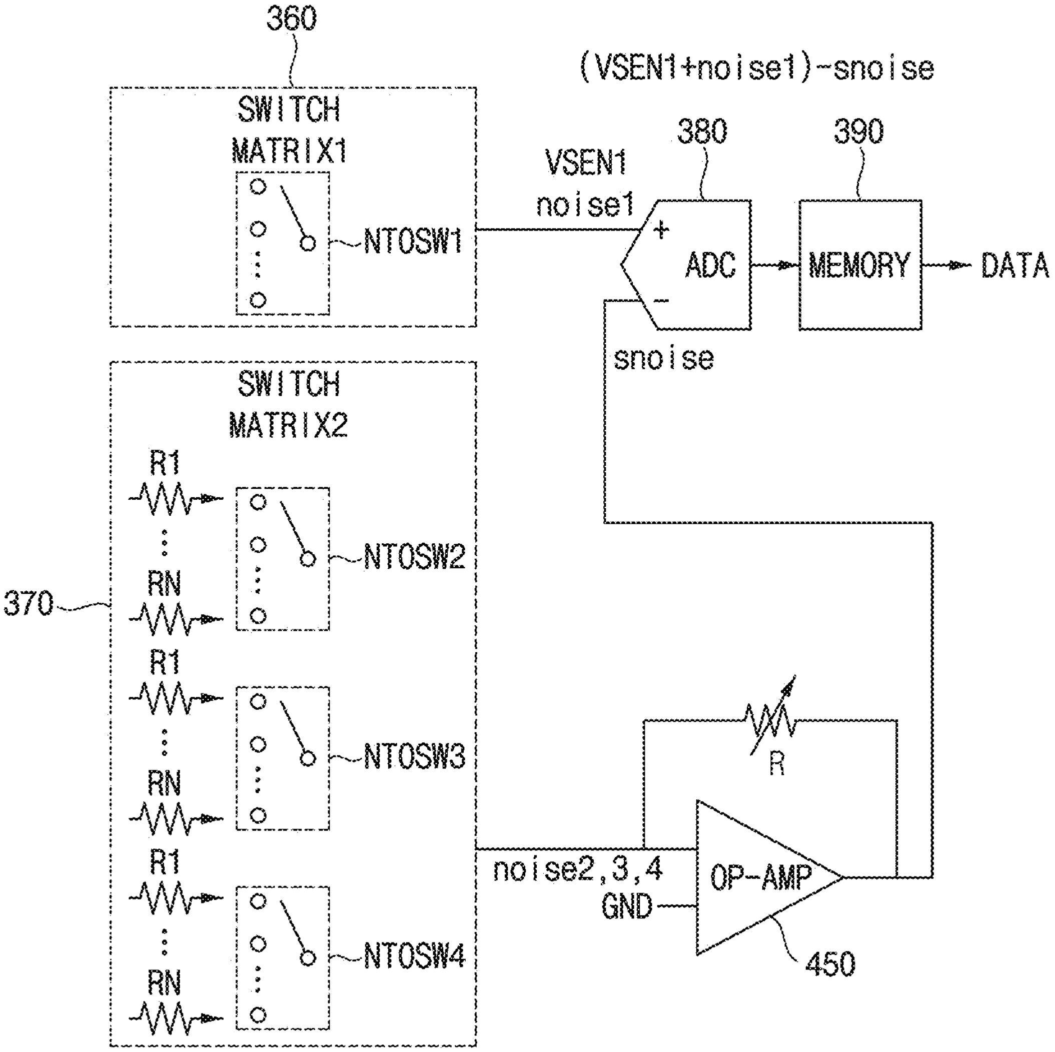
FIGS. 31 to 33 are diagrams for describing an operation of the sensing circuit in FIG. 27.
Figure 32:
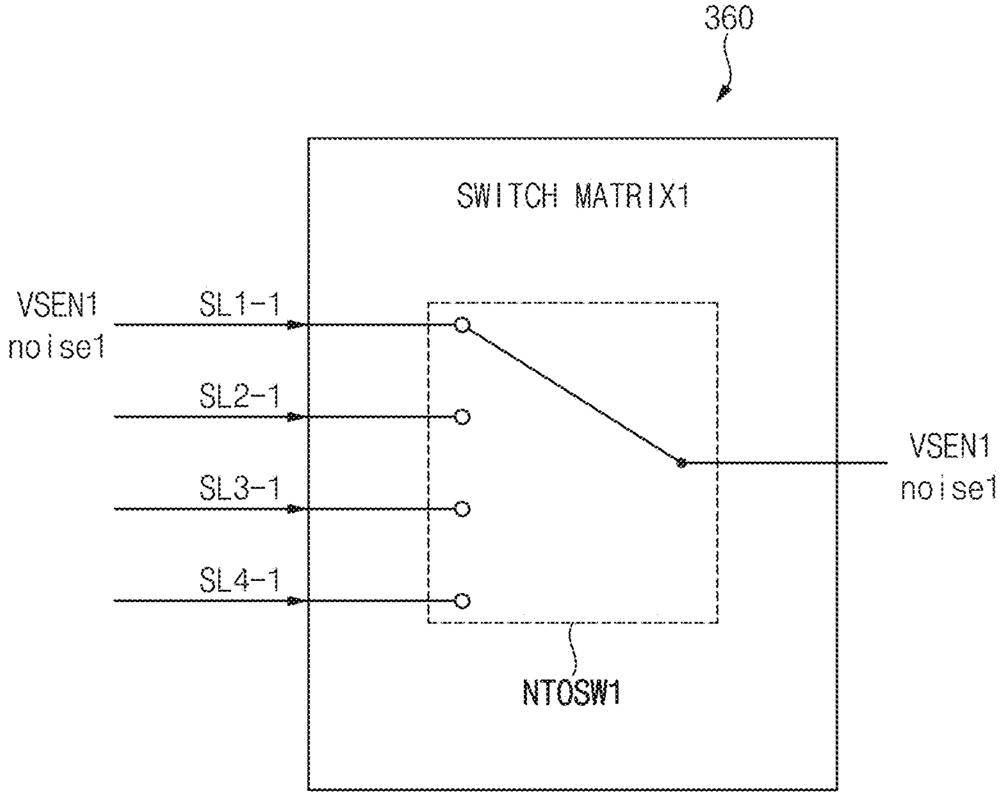
Figure 33:
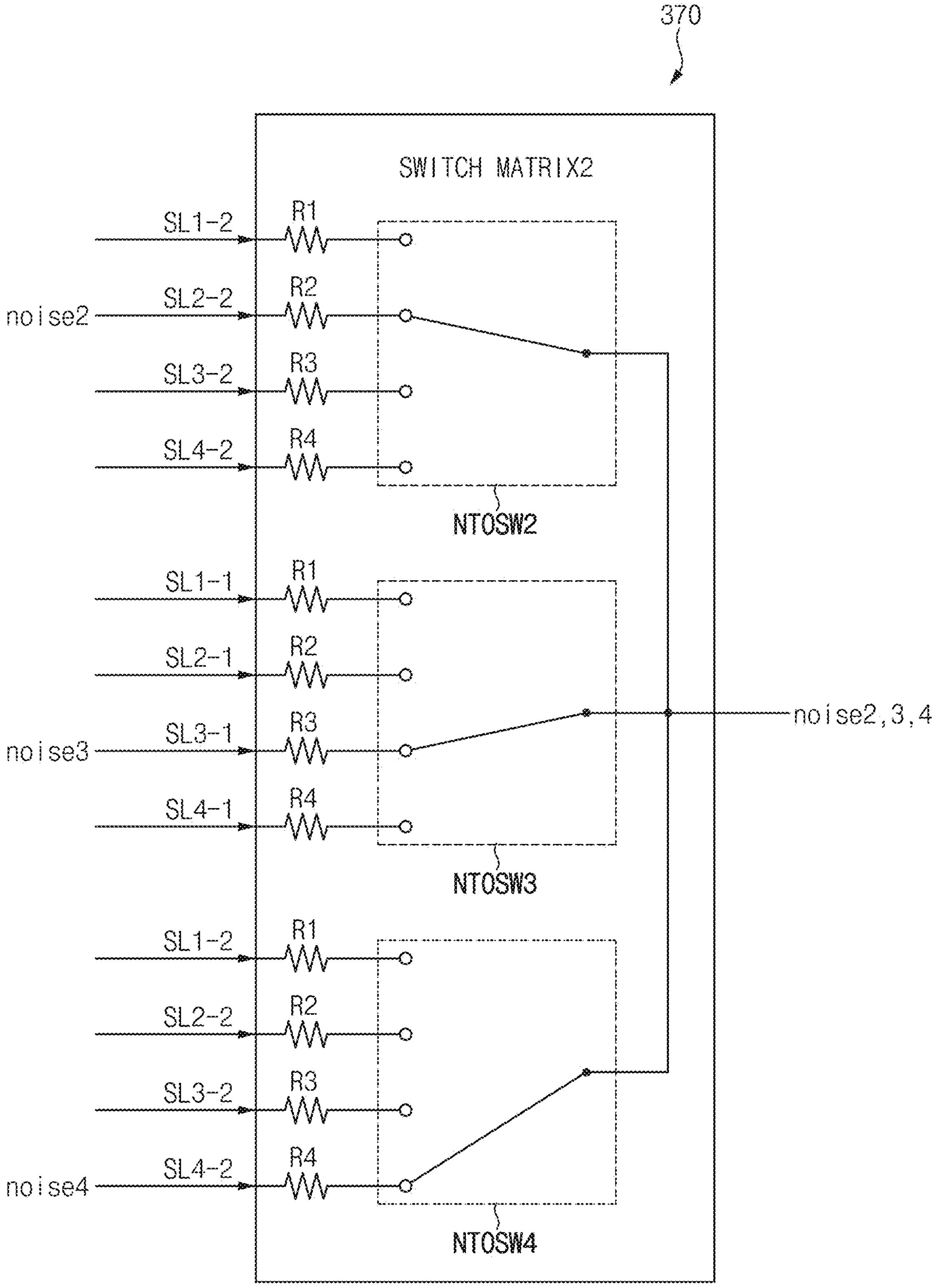

FIG. 30 is a flowchart illustrating a method of driving the sensing circuit in FIG. 27. FIGS. 31 to 33 are diagrams for describing an operation of the sensing circuit in FIG. 27.

Referring to FIGS. 30 to 33, a method of driving the sensing circuit 500 according to an embodiment may include turning-on each of the first switching transistor TSW1 and the second switching transistor TSW2 included in the first pixel PX1, turning-off the first switching transistor TSW1 included in each of the second to fourth pixels PX2, PX3, and PX4, and turning-on the second switching transistor TSW2 included in each of the second to fourth pixels PX2, PX3, and PX4 (S610), connecting the 1-1$^{st}$ sensing line SL1-1 to the first multiplexer NTOSW1 (e.g., a first switch) (S620), connecting the 2-2$^{nd}$ sensing line SL2-2, the 3-2$^{nd}$ sensing line SL3-2, and the 4-2$^{nd}$ sensing line SL4-2 to the second multiplexer NTOSW2 (e.g., a second switch), the third multiplexer NTOSW3 (e.g., a third switch), and the fourth multiplexer NTOSW4 (e.g., a fourth switch), respectively (S630), changing the gain of the summing amplifier 450 to be equal to the sum of resistances of the second to fourth resistors R2, R3, and R4 and generating an average noise of the second, third, and fourth noises noise2, noise3, and noise4 (S640), and outputting summed sensing data SDATA (e.g., summed data) (S650).

Referring to FIGS. 30, 31, and 32, in a state in which each of the first switching transistor TSW1 and the second switching transistor TSW2 included in the first pixel PX1 is turned-on, the first switching transistor TSW1 included in each of the second to fourth pixels PX2, PX3, and PX4 is turned-off, and the second switching transistor TSW2 included in each of the second to fourth pixels PX2, PX3, and PX4 is turned-on, the first multiplexer may be connected to the 1-1$^{st}$ sensing line SL1-1, and the first sensing voltage VSEN1 and the first noise noise1 provided to the 1-1$^{st}$ sensing line SL1-1 may be provided to the first terminal of the ADC 380.

Referring to FIGS. 30, 31, and 33, the second multiplexer NTOSW2 may be connected to the 2-2$^{nd}$ sensing line SL2-2, the third multiplexer NTOSW3 may be connected to the 3-1$^{st}$ sensing line SL3-2, and the fourth multiplexer NTOSW4 may be connected to the 4-2$^{nd}$ sensing line SL4-2. In an embodiment, the second multiplexer NTOSW2 and the 2-2$^{nd}$ sensing line SL2-2, the third multiplexer NTOSW3 and the 3-1$^{st}$ sensing line SL3-1, and the fourth multiplexer NTOSW4 and the 4-2$^{nd}$ sensing line SL4-2 may be simultaneously connected to each other, and the second noise noise2 provided to the 2-2$^{nd}$ sensing line SL2-2, the third noise noise3 provided to the 3-2$^{nd}$ sensing line SL3-2, and the fourth noise noise4 provided to the 4-2$^{nd}$ sensing line SL4-2 may be provided to the first terminal of the summing amplifier 450.

Further, since the 2-2$^{nd}$ sensing line SL2-2 is connected to the second multiplexer NTOSW2, the 3-1$^{st}$ sensing line SL3-1 is connected to the third multiplexer NTOSW3, and the 4-2$^{nd}$ sensing line SL4-2 is connected to the fourth multiplexer NTOSW4, the resistance of the variable resistor R controlling the gain of the summing amplifier 450 may become equal to the sum of resistances of the second, third, and fourth resistors R2, R3, and R4.

Referring to FIGS. 30 and 31, the summing amplifier 450 may generate the summed noise (snoise in FIG. 31) based on the second to fourth noises noise2, 3, and 4 output from the second switch matrix 370.

The first sensing voltage VSEN1 and the first noise noise1 output from the first switch matrix 360 may be provided to the first terminal of the ADC 380, and the summed noise (snoise in FIG. 31) may be provided from the summing amplifier 450 to the second terminal the ADC 380. The ADC 380 may generate the sensing data DATA corresponding to a value obtained by subtracting the summed noise (snoise in FIG. 31) provided to the second terminal from the first sensing voltage VSEN1 and the first noise noise1 provided to the first terminal.

The data output unit 390 may output the sensing data DATA.

In the method of driving the sensing circuit 500 according to an embodiment, after sensing noises in pixels positioned adjacent to a pixel to be sensed for a sensing voltage, the summed noise for the noises may be generated using the summing amplifier 450, and the ADC 380 may obtain the sensing data DATA based on the summed noise. Accordingly, the sensing circuit 500 may obtain the relatively more precise sensing data DATA, and the display device including the sensing circuit 500 may more precisely compensate the image data.

Although an embodiment where the sensing circuit 500 senses four pixels PX is described above, however, the number of pixels PX sensed by the sensing circuit 500 is not limited thereto. In an embodiment, for example, the sensing circuit 500 may sense at least three pixels PX.

Further, although an embodiment where the sensing circuit 500 senses the first sensing voltage VSEN1 and the first noise noise1 from the sensing line SL1 connected to the first pixel PX1, and senses the second to fourth noises noise2, noise3, and noise4 from the sensing lines SL2, SL3, and SL4 connected to the second to fourth pixels PX2, PX3, and PX4 is described above, however, the configuration of the present embodiment is not limited thereto. In an embodiment, for example, the sensing circuit 500 may sense a sensing voltage and noise from a sensing line connected to one of the first to 2N$^{th}$ pixels PX1, . . . , PX2N (hereinafter, referred to as a sensing pixel), and may sense noises from sensing lines connected to pixels positioned adjacent to the sensing pixel.

Figure 34:
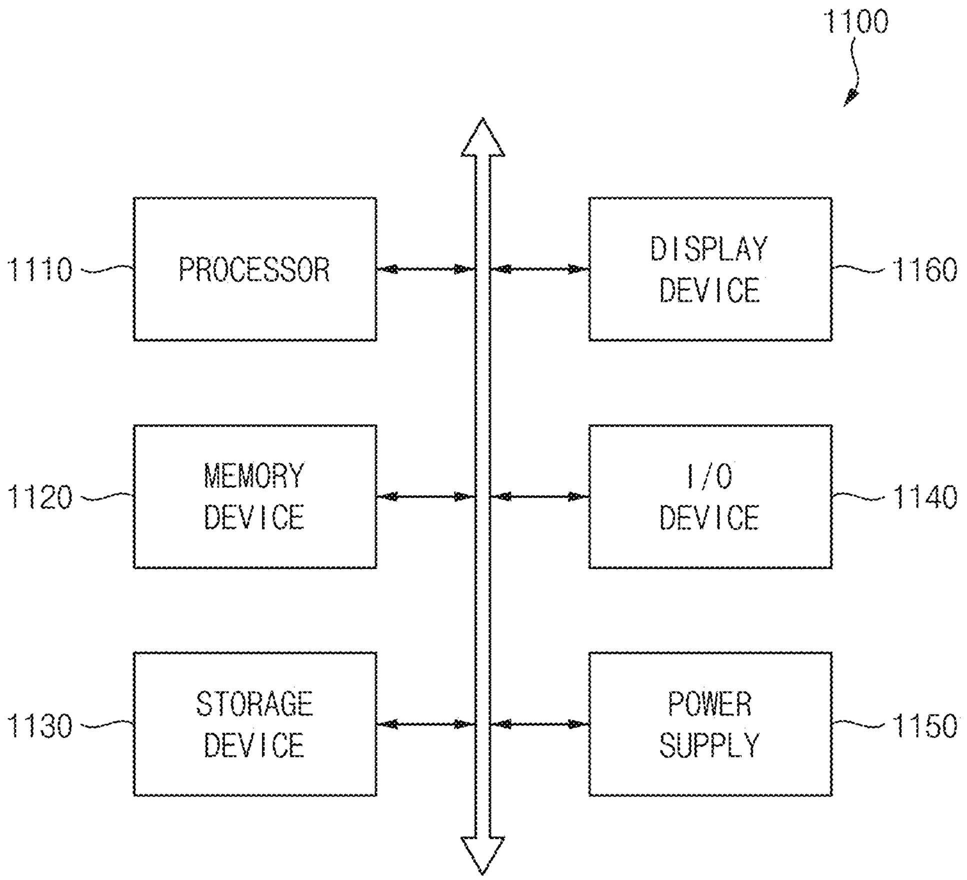
FIG. 34 is a block diagram illustrating an electronic apparatus including a display device according to an embodiment.

FIG. 34 is a block diagram illustrating an electronic apparatus including a display device according to an embodiment.

Referring to FIG. 34, an electronic apparatus 1100 may include a processor 1110, a memory device 1120, a storage device 1130, an input/output ("I/O") device 1140, a power supply 1150, and a display device 1160. The electronic apparatus 1100 may further include a plurality of ports for communicating with a video card, a sound card, a memory card, a universal serial bus ("USB") device, etc.

The processor 1110 may perform particular calculations or tasks. In an embodiment, the processor 1110 may be an application processor ("AP"), a graphic processing unit ("GPU"), a microprocessor, a central processing unit ("CPU"), or the like. The processor 1110 may be coupled to other components via an address bus, a control bus, a data bus, or the like. In an embodiment, the processor 1110 may be coupled to an extended bus such as a peripheral component interconnection ("PCI") bus.

The memory device 1120 may store data for operations of the electronic apparatus 1100. In an embodiment, for example, the memory device 1120 may include a non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may include a solid state drive ("SSD") device, a hard disk drive ("HDD") device, a CD-ROM device, or the like. The I/O device 1140 may include an input device such as a keyboard, a keypad, a touchpad, a touch-screen, a mouse device, etc., and an output device such as a speaker, a printer, etc. The power supply 1150 may supply a power required for the operation of the electronic apparatus 1100. The display device 1160 may be coupled to other components via the buses or other communication links.

The display device 1160 may include a display panel including a plurality of pixels, a scan driver which provides a scan signal and a sensing signal to each of the plurality of pixels, a data driver which provides a data signal to each of the plurality of pixels, a sensing circuit connected to the plurality of pixels through a plurality of sensing lines, and a controller which controls the scan driver, the data driver, and the sensing circuit. In the sensing circuit according to an embodiment, in a first sensing period, a sensing channel may sense a first sensing voltage and noise of a first sensing line, a reference channel may sense noise of a second sensing line adjacent to the first sensing line, and the noises may be offset through an ADC. Accordingly, the sensing circuit may output first sensing data that does not include noise. Further, in a second sensing period, the sensing channel may sense a second sensing voltage and noise of the second sensing line, the reference channel may sense noise of the first sensing line adjacent to the second sensing line, and the noises may be offset through the analog-to-digital converter.

Accordingly, the sensing circuit may output second sensing data that does not include noise.

According to embodiments, the electronic apparatus 1100 may be any electronic apparatus including the display device 1160 such as a mobile phone, a smart phone, a tablet computer, a digital television, a three-dimensional ("3D") television ("TV"), a virtual reality ("VR") device, a personal computer, a household electronic device, a laptop computer, a personal digital assistant, a portable multimedia player, a digital camera, a music player, a portable game console, a navigation, or the like.

The invention should not be construed as being limited to the embodiments set forth herein. Rather, these embodiments are provided so that this disclosure will be thorough and complete and will fully convey the concept of the invention to those skilled in the art.

The embodiments may be applied to various electronic apparatuses including a display device. For example, the embodiments may be applied to various electronic apparatuses such as vehicle display devices, ship display devices, aircraft display devices, portable communication devices, exhibition display devices, information transmission display devices, medical display devices, or the like.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A sensing circuit of a display device, comprising:

a first line selection switch which connects a first sensing line to a sensing channel in a first sub-sensing period in a first sensing period;

a first noise selection switch which connects the first sensing line to a reference channel in a second sub-sensing period in a second sensing period;

a second line selection switch which connects a second sensing line to the sensing channel in the second sub-sensing period; and a second noise selection switch which connects the second sensing line to the reference channel in the first sub-sensing period, wherein, in a first sampling period in the first sub-sensing period, the sensing channel samples a first sensing voltage and a noise of the first sensing line, and the reference channel samples a noise of the second sensing line, wherein, in a second sampling period in the second sub-sensing period, the sensing channel samples a second sensing voltage and a noise of the second sensing line, and the reference channel samples a noise of the first sensing line, and wherein the first sensing line and the second sensing line are connected to different pixels, each including a first switching transistor connected to a data line and a second switching transistor connected to a corresponding one of the first sensing line and the second sensing line.

2. The sensing circuit of claim 1, wherein the first sensing line and the second sensing line are connected to a first pixel and a second pixel, respectively, wherein the first switching transistor of each of the first and second pixels is turned-on in response to a scan signal and the second switching transistor of each of the first and second pixels is turned-on in response to a sensing signal, wherein, in the first sampling period, each of the first and second switching transistors included in the first pixel is turned-on, the first switching transistor included in the second pixel is turned-off, and the second switching transistor included in the second pixel is turned-on, and wherein, in the second sampling period, the first switching transistor included in the first pixel is turned-off, the second switching transistor included in the first pixel is turned-on, and each of the first and second switching transistors included in the second pixel is turned-on.

3. The sensing circuit of claim 1, further comprising:

a sensing line initialization circuit which simultaneously initializes the first sensing line and the second sensing line in the first sub-sensing period and the second sub-sensing period.

4. The sensing circuit of claim 3, wherein the sensing line initialization circuit includes:

a first sensing line initialization switch which applies an initialization voltage to the first sensing line in response to a sensing line initialization signal; and a second sensing line initialization switch which applies the initialization voltage to the second sensing line in response to the sensing line initialization signal.

5. The sensing circuit of claim 4, wherein the sensing channel includes:

a sampling capacitor including a first electrode and a second electrode;

a first sampling switch which connects the first and second line selection switches to the first electrode of the sampling capacitor in response to a sampling signal; and a first reference switch which applies a reference voltage to the second electrode of the sampling capacitor in response to a reference signal.

6. The sensing circuit of claim 5, wherein the reference channel includes:

a reference capacitor including a first electrode and a second electrode;

an initialization switch which provides the initialization voltage to a first node in response to an initialization signal;

a second sampling switch which connects the first node to the first electrode of the reference capacitor and applies the initialization voltage to the first electrode of the reference capacitor in response to the sampling signal; and a second reference switch which applies the reference voltage to the second electrode of the reference capacitor in response to the reference signal.

7. The sensing circuit of claim 6, further comprising:

a channel connection switch which connects the sensing channel to the reference channel, wherein the channel connection switch connects the first electrode of the sampling capacitor to the first electrode of the reference capacitor in response to a channel connection signal.

8. The sensing circuit of claim 7, further comprising:

an analog-to-digital converter; and a switch matrix which connects the sensing channel and the reference channel to the analog-to-digital converter.

9. The sensing circuit of claim 8, wherein the first sensing period includes:

the first sub-sensing period in which a sensing operation on a first pixel connected to the first sensing line is performed by the sensing channel and a sensing operation on a second pixel connected to the second sensing line is performed by the reference channel; and a first data output period in which first sensing data corresponding to the first sensing voltage is output, and wherein the second sensing period includes:

the second sub-sensing period in which a sensing operation on the second pixel connected to the second sensing line is performed by the sensing channel and a sensing operation on the first pixel connected to the first sensing line is performed by the reference channel; and a second data output period in which second sensing data corresponding to the second sensing voltage is output.

10. The sensing circuit of claim 9, wherein the first sub-sensing period includes:

a first sensing line initialization period in which the first sensing line and the second sensing line are simultaneously initialized;

a first capacitor initialization period in which the sampling capacitor and the reference capacitor are initialized;

the first sampling period in which a first sensing voltage and a noise of the first sensing line and a noise of the second sensing line are sampled; and a first analog-to-digital conversion period in which the first sensing voltage of the first sensing line is converted to the first sensing data by offsetting the noise of the first sensing line and the noise of the second sensing line, and wherein the second sub-sensing period includes:

a second sensing line initialization period in which the first sensing line and the second sensing line are simultaneously initialized;

a second capacitor initialization period in which the sampling capacitor and the reference capacitor are initialized;

the second sampling period in which a second sensing voltage and a noise of the second sensing line and a noise of the first sensing line are sampled; and a second analog-to-digital conversion period in which the second sensing voltage of the second sensing line is converted to the second sensing data by offsetting the noise of the second sensing line and the noise of the first sensing line.

11. The sensing circuit of claim 10, wherein the sensing line initialization signal has an activation level in the first and second sensing line initialization periods, and wherein the sensing line initialization circuit applies the initialization voltage to the first sensing line and the second sensing line in response to the sensing line initialization signal having the activation level.

12. The sensing circuit of claim 10, wherein each of the sampling signal, the reference signal, the initialization signal, and the channel connection signal has an activation level in the first and second capacitor initialization periods, wherein the initialization switch is turned-on in response to the initialization signal having the activation level, the second sampling switch is turned-on in response to the sampling signal having the activation level, and the channel connection switch is turned-on in response to the channel connection signal having the activation level such that the initialization voltage is applied to the first electrode of the reference capacitor through the initialization switch and the second sampling switch, and the initialization voltage is applied to the first electrode of the sampling capacitor through the initialization switch, the second sampling switch, and the channel connection switch, and wherein the first reference switch and the second reference switch are turned-on in response to the reference signal having the activation level such that the reference voltage is applied to the second electrode of the sampling capacitor through the first reference switch, and the reference voltage is applied to the second electrode of the reference capacitor through the second reference switch.

13. The sensing circuit of claim 10, wherein the first capacitor initialization period overlaps the first sensing line initialization period, and the second capacitor initialization period overlaps the second sensing line initialization period.

14. The sensing circuit of claim 10, wherein, in the first sampling period, each of a first line selection signal, a second noise selection signal, the sampling signal, and the reference signal has an activation level, and each of a second line selection signal, a first noise selection signal, the initialization signal, and the channel connection signal has an inactivation level, wherein the first line selection switch is turned-on in response to the first line selection signal having the activation level, the second noise selection switch is turned-on in response to the second noise selection signal having the activation level and the first sampling switch and the second sampling switch are turned-on in response to the sampling signal having the activation level, such that a first sensing voltage and a noise of the first sensing line is applied to the first electrode of the sampling capacitor through the first line selection switch and the first sampling switch, and a noise of the second sensing line is applied to the first electrode of the reference capacitor through the second noise selection switch and the second sampling switch, and wherein the first reference switch and the second reference switch are turned-on in response to the reference signal having the activation level, such that the reference voltage is applied to the second electrode of the sampling capacitor through the first reference switch, and the reference voltage is applied to the second electrode of the reference capacitor through the second reference switch.

15. The sensing circuit of claim 10, wherein the channel connection signal has an inactivation level in the first analog-to-digital conversion period, and wherein the switch matrix connects the second electrode of the sampling capacitor and the second electrode of the reference capacitor to the analog-to-digital converter, and the analog-to-digital converter converts the first sensing voltage obtained by subtracting the noise of the second sensing line from the first sensing voltage and the noise of the first sensing line to the first sensing data.

16. The sensing circuit of claim 10, wherein, in the second sampling period, each of a second line selection signal, a first noise selection signal, the sampling signal, and the reference signal has an activation level, and each of a first line selection signal, a second noise selection signal, the initialization signal, and the channel connection signal has an inactivation level, wherein the second line selection switch is turned-on in response to the second line selection signal having the activation level, the first noise selection switch is turned-on in response to the first noise selection signal having the activation level, the first sampling switch and the second sampling switch are turned-on in response to the sampling signal having the activation level, such that a second sensing voltage and a noise of the second sensing line is applied to the first electrode of the sampling capacitor through the second line selection switch and the second sampling switch, and a noise of the first sensing line is applied to the first electrode of the reference capacitor through the first noise selection switch and the second sampling switch, and wherein the first reference switch and the second reference switch are turned-on in response to the reference signal having the activation level, such that the reference voltage is applied to the second electrode of the sampling capacitor through the first reference switch, and the reference voltage is applied to the second electrode of the reference capacitor through the second reference switch.

17. The sensing circuit of claim 10, wherein the channel connection signal has an inactivation level in the second analog-to-digital conversion period, and wherein the switch matrix connects the second electrode of the sampling capacitor and the second electrode of the reference capacitor to the analog-to-digital converter, and the analog-to-digital converter converts the second sensing voltage obtained by subtracting the noise of the first sensing line from the second sensing voltage and the noise of the second sensing line to the second sensing data.

18. The sensing circuit of claim 1, wherein a display panel of the display device includes N odd-numbered sensing lines including the first sensing line and N even-numbered sensing lines including the second sensing line, wherein N is an integer greater than or equal to 1, wherein the sensing circuit comprises:

N sensing channels which include the sensing channel;

N reference channels which include the reference channel;

N first line selection switches which connect the N odd-numbered sensing lines to the N sensing channels in the first sub-sensing period, and include the first line selection switch;

N second noise selection switches which connect the N even-numbered sensing lines to the N reference channels in the first sub-sensing period, and include the second noise selection switch;

N second line selection switches which connect the N even-numbered sensing lines to the N sensing channels in the second sub-sensing period, and include the second line selection switch;

N first noise selection switches which connect the N odd-numbered sensing lines to the N reference channels in the second sub-sensing period, and include the first noise selection switch;

an analog-to-digital converter; and a switch matrix which sequentially connects the N sensing channels and the N reference channels to the analog-to-digital converter in a first analog-to-digital conversion period in the first sub-sensing period, and sequentially connects the N sensing channels and the N reference channels to the analog-to-digital converter in a second analog-to-digital conversion period in the second sub-sensing period, wherein the analog-to-digital converter sequentially converts N first sensing voltages of the N odd-numbered sensing lines to N first sensing data by offsetting N noises of the N odd-numbered sensing lines and N noises of the N even-numbered sensing lines in the first analog-to-digital conversion period, and sequentially converts N second sensing voltages of the N even-numbered sensing lines to N second sensing data by offsetting N noises of the N even-numbered sensing lines and N noises of the N odd-numbered sensing lines in the second analog-to-digital conversion period.

19. The sensing circuit of claim 18, further comprising:

a data output unit which sequentially stores the N first sensing data in the first analog-to-digital conversion period, sequentially stores the N second sensing data in the second analog-to-digital conversion period, and outputs the N first sensing data and the N second sensing data in a data output period in the sensing period, wherein the data output unit rearranges the N first sensing data and the N second sensing data in a way such that each of the N second sensing data is disposed between adjacent two of the N first sensing data.

20. A display device, comprising:

a display panel which includes a plurality of pixels;

a scan driver which provides a scan signal and a sensing signal to each of the plurality of pixels;

a data driver which provides a data signal to each of the plurality of pixels;

a sensing circuit connected to the plurality of pixels through a plurality of sensing lines; and a controller which controls the scan driver, the data driver, and the sensing circuit, wherein the sensing circuit includes:

a first line selection switch which connects a first sensing line to a sensing channel in a first sub-sensing period in a first sensing period;

a first noise selection switch which connects the first sensing line to a reference channel in a second sub-sensing period in a second sensing period;

a second line selection switch which connects a second sensing line to the sensing channel in the second sub-sensing period; and a second noise selection switch which connects the second sensing line to the reference channel in the first sub-sensing period, wherein, in a first sampling period in the first sub-sensing period, the sensing channel samples a first sensing voltage and a noise of the first sensing line, and the reference channel samples a noise of the second sensing line, and wherein, in a second sampling period in the second sub-sensing period, the sensing channel samples a second sensing voltage and a noise of the second sensing line, and the reference channel samples a noise of the first sensing line, wherein the first sensing line and the second sensing line are connected to a first pixel and a second pixel of the plurality of pixels, respectively, and wherein each of the first pixel and the second pixel includes a first switching transistor connected to a data line and a second switching transistor connected to a corresponding one of the first sensing line and the second sensing line.

* * * * *